US009939548B2

(12) United States Patent
Burmester et al.

(10) Patent No.: US 9,939,548 B2
(45) Date of Patent: Apr. 10, 2018

(54) SYSTEMS, METHODS, AND COMPUTER MEDIUM TO PRODUCE EFFICIENT, CONSISTENT, AND HIGH-CONFIDENCE IMAGE-BASED ELECTROFACIES ANALYSIS IN STRATIGRAPHIC INTERPRETATIONS ACROSS MULTIPLE WELLS

(71) Applicant: Saudi Arabian Oil Company, Dhahran (SA)

(72) Inventors: Gordon Burmester, Dhahran (SA); Keith A. T. MacPherson, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 896 days.

(21) Appl. No.: 14/320,032

(22) Filed: Jun. 30, 2014

(65) Prior Publication Data
US 2015/0241591 A1 Aug. 27, 2015

Related U.S. Application Data

(60) Provisional application No. 61/943,867, filed on Feb. 24, 2014, provisional application No. 61/949,558, filed on Mar. 7, 2014.

(51) Int. Cl.
*G01V 11/00* (2006.01)
*G01V 3/20* (2006.01)
(Continued)

(52) U.S. Cl.
CPC .............. *G01V 3/20* (2013.01); *G01V 3/38* (2013.01); *G01V 11/00* (2013.01); *G06K 9/6201* (2013.01); *G06K 9/64* (2013.01); *G06N 3/02* (2013.01)

(58) Field of Classification Search
CPC .......... G01V 99/005; G01V 3/20; G01V 3/38; G01V 11/00; G06K 9/64; G06K 9/6201; G06N 3/02
See application file for complete search history.

(56) References Cited

U.S. PATENT DOCUMENTS 6,477,469 B2 11/2002 Ye et al.
7,433,851 B2 10/2008 Mirowski
(Continued)

FOREIGN PATENT DOCUMENTS

CA 2869825 11/2013

OTHER PUBLICATIONS

PetroWiki, Borehole imaging, Jul. 2, 2015, retrieved Apr. 24, 2017, SPE International, pp. 1-6.*
(Continued)

*Primary Examiner* — Mischita Henson
(74) *Attorney, Agent, or Firm* — Bracewell LLP; Constance G. Rhebergen; Brian H. Tompkins

(57) ABSTRACT

Embodiments of systems, computer-implemented methods, and non-transitory computer-readable medium having one or more computer programs stored therein are provided to enhance borehole image analysis associated with a hydrocarbon reservoir. A neural network mapping process can first be performed, responsive to openhole log data and core data, to thereby generate a material-type scheme. Then, an image-based petrophysical analysis process can distribute and calibrate borehole image data, responsive to the core data and material-type scheme. Consequently, an approximated material type and an approximated grain size can be produced for each borehole image reading. The openhole log data, the core data, the material-type scheme, and the approximated material types and grain sizes, for example, can then be displayed to thereby increase consistency in
(Continued)

categorizing subsurface material associated with hydrocarbon wells by material type and enhance interpretation of subsurface material texture, fabric, and features to predict subsurface material composition of the hydrocarbon reservoir.

33 Claims, 25 Drawing Sheets

(51) Int. Cl.
*G01V 3/38* (2006.01)
*G06K 9/62* (2006.01)
*G06K 9/64* (2006.01)
*G06N 3/02* (2006.01)

(56) References Cited

U.S. PATENT DOCUMENTS

| | | | |
|---|---|---|---|
| 8,311,788 B2 | 11/2012 | Hurley et al. | |
| 8,374,974 B2 | 2/2013 | Chen et al. | |
| 2002/0013687 A1* | 1/2002 | Ortoleva | E21B 41/0064 703/10 |
| 2005/0171697 A1 | 4/2005 | Heliot et al. | |
| 2009/0259446 A1 | 10/2009 | Zhang et al. | |
| 2009/0262603 A1* | 10/2009 | Hurley | G01V 11/00 367/86 |
| 2010/0198638 A1 | 8/2010 | Deffenbaugh et al. | |
| 2011/0208431 A1* | 8/2011 | Skelt | G01V 99/005 702/7 |
| 2011/0257944 A1 | 10/2011 | Du et al. | |
| 2012/0221306 A1 | 8/2012 | Hurley et al. | |
| 2013/0080133 A1 | 3/2013 | Sung et al. | |
| 2013/0297272 A1 | 11/2013 | Sung et al. | |

OTHER PUBLICATIONS

Denis Saussus et al., Facies as the key to using seismic inversion for modelling reservoir properties, Jul. 30, 2012, EAGE, pp. 45-52.*
International Search Report and Written Opinion for PCT/US15/17060 dated Jun. 3, 2015.
Dubois, "Comparison of four approaches to a rock facies classification problem" Computers & Geosciences, 33 (2007), pp. 599-617.
Basu, "Facies analysis: Integration of core and log data using a neural network as input for reservoir modeling in Betty Field, Malaysia" The Leading Edge, Aug. 2004, pp. 1-4.
Caers et al. "Stochastic Reservoir Simulation Using Neural Networks Trained on Outcrop Data" SPE 49026, SPE Annual Technical Conference and Exhibition, New Orleans, Louisiana, Sep. 27-30, 1998, pp. 321-336.
Crain, E. "Invaded Zone Water Saturation" Crain's Petrophysical Handbook, retrieved at htip://www.spec2000.net/14-sxo.htm, 2009, 3 pages.
Davatzes, N. "Borehole Geophysics—Image Logs" Temple University, retrieved at http://astro.temple.edu/~davatzes/Methods/Methods/Borehole_Tools.html, Nov. 2009, 5 pages.
Newberry et al. "A Method for Analyzing Textural Changes Within Clastic Environments Utilizing Electrical Borehole Images" Gulf Coast Association of Geological Societies Transactions, vol. 54, 2004, pp. 531-539.
Samantray et al. "Interpretation and Application of Borehole Image Logs in a New Generation of Reservoir Models for a Cluster of Fields in Southern Oman" AAPG Memoir 92, 2010, pp. 343-357.
Schlumberger "SandSpect (Resistivity Spectrum Analysis)" help file, Techlog 2013.2.0, retrieved Nov. 8, 2013, 6 pages.
Stright, L. "Multiscale Modeling of Deep-Water Channel Deposits: An Interdisciplinary Study Integrating Geostatistics, Geology and Geophysics" Dissertation, Appendix A, Stanford University, California, Apr. 2011, pp. 140-148.
Weatherford "Open-Hole Services" retrieved at http://www.weatherford.com/Products/Evaluation/OpenHoleServices, 2010, 2 pages.

* cited by examiner

FIG. 16

SYSTEMS, METHODS, AND COMPUTER MEDIUM TO PRODUCE EFFICIENT, CONSISTENT, AND HIGH-CONFIDENCE IMAGE-BASED ELECTROFACIES ANALYSIS IN STRATIGRAPHIC INTERPRETATIONS ACROSS MULTIPLE WELLS

RELATED APPLICATIONS

This application is related and claims priority to U.S. Provisional Patent Application No. 61/943,867, filed Feb. 24, 2014, titled "Systems, Methods, and Computer Medium to Produce Efficient, Consistent, and High-Confidence Image-Based Electrofacies Analysis in Stratigraphic Interpretations Across Multiple Wells," and U.S. Provisional Patent Application No. 61/949,558, filed Mar. 7, 2014, titled "Systems, Methods, and Computer Medium to Produce Efficient, Consistent, and High-Confidence Image-Based Electrofacies Analysis in Stratigraphic Interpretations Across Multiple Wells," the contents both of which are hereby incorporated herein by reference in their entireties.

BACKGROUND OF THE INVENTION

Field of the Invention

Embodiments of the invention relate to hydrocarbon industries and, more particularly, systems, methods, and non-transitory computer-readable medium having computer program stored therein for borehole image analysis.

Description of the Related Art

An understanding of the subsurface material within a hydrocarbon reservoir may play an important role in development of the hydrocarbon reservoir to produce hydrocarbons, such as oil and gas. More specifically, an ability to identify types and their associated properties—sometimes called "lithotype" or, in some circumstances "facies"—of subsurface material may significantly enhance development of the hydrocarbon reservoir. At least one reason that such an understanding may be important is that the types and properties of subsurface material, as well as the orientation and position of different types of material, may affect how hydrocarbons flow through the reservoir. For example, an individual material type may be associated with porosity and permeability ranges that differ greatly from those of another material type. An ability to identify the material types and characteristics within a hydrocarbon reservoir may consequently enhance models of the hydrocarbon reservoir that are used to simulate fluid flow within the hydrocarbon reservoir, for example. Numerous approaches to identifying subsurface material types and properties may exist, including analysis of borehole images.

Borehole images—representations of walls of a hydrocarbon well borehole—may be analyzed to help identify subsurface material types and characteristics. Borehole images may be acquired, for example, by measuring material resistivity along uncased borehole walls. For example, one or more pads containing electrodes and sensors ("buttons") may be positioned against a borehole wall. The one or more sensor pads may apply an electrical current into the borehole wall to measure the resistivity of the subsurface material surrounding the borehole. This procedure may be repeated with the one or more pads oriented in other directions within the borehole, as well as at a plurality of depths within the borehole. That is, measurements or readings of material resistivity may be taken at various depths along the length of a borehole, and they may further be taken in a plurality of directions at each depth. Consequently, material resistivity may be measured for a significant portion of the subsurface material surrounding the borehole. The measured resistivity data may then be used to develop a "picture" of the subsurface material through which the borehole passes. As a result, borehole image (BHI) data—sometimes called borehole image log (BHI) data or simply BHI—may include resistivity measurements from within a borehole.

Borehole image data may sometimes be analyzed in conjunction with other data, including, for example, openhole log data (sometimes described as "openhole data," "open hole log data," "open hole data," or "well logs") and core data. Openhole log data may include measured data from within an uncased borehole such as, for example, density measurement data, neutron measurement data, gamma ray (GR) measurement data, induction log data, lateral log ("laterlog" or "laterolog") data, porosity log data, photoelectric (PE) curve data, and petrophysical calculations (e.g., water saturation). Core data, on the other hand, may include data measured, observed, or derived from a core sample associated with a hydrocarbon well. A core sample can include, for example, a piece of subsurface material that has been removed from a hydrocarbon wellbore, at a substantially known depth, during or after drilling. A core sample may be analyzed to identify, for example, one or more types of subsurface material within the core sample, presence and location of pores and vugs within the core sample, and grain size of subsurface material within the core sample. As will be understood by those skilled in the art, grain size may include, for instance, particle size of individual components that make up subsurface material, such as, for example, clastic material. Although a core sample may be related to subsurface material properties only at one interval of the wellbore from which the core sample originated, information garnered from the core sample may be used—with openhole log data and borehole image data—to predict and model subsurface material at other depths, i.e., at uncored intervals of the wellbore. For example, subsurface material type, orientation, fabric, and texture may be modeled. Texture may include, for example, the size, shape, and arrangement of grains and spaces between grains of subsurface material, such as rock, as will be understood by those skilled in the art. Furthermore, fabric may include the pervasive internal structure and arrangement of subsurface material, such as the preferred orientations of grains or fragments, related to the primary depositional or secondary diagenetic processes. A model of subsurface material surrounding a wellbore may itself be used to enhance a model of the hydrocarbon reservoir associated with the wellbore.

Also, for example, as described in U.S. Patent Application Publication No. 2012/0221306 (Hurley et al.), core samples first may be described to identify facies, fabrics, and material types 271, for example, as depicted in FIG. 1a. Facies may include a body or unit of, typically, sedimentary rock or subsurface material with specified characteristics from which an inference may be drawn that the subsurface material was formed by a particular geological process or within a particular geological environment. Porosity and permeability of a core sample then may be analyzed 272. Existing core analyses, core descriptions, and material types then may be integrated 273 before well logs are analyzed 274. Finally, borehole images and openhole log data may be interpreted and compared to facies as identified from a core sample 275 as part of a "core calibration" process. That is, an interpreter may integrate grain size, lithology, and texture simultaneously on a well-by-well basis to produce electrofacies 264, given openhole log data sets 261, core data sets 262, and borehole image reading sets 263, as depicted, for example, in FIG. 1b. Electrofacies, as will be understood by those skilled in the art, may include facies that are determined from analysis of a diagnostics or individual set of wire-line log responses that characterize the physical properties of subsurface material and fluids contained within or related to a volume and depth of investigation by a wire-line logging tool. Electrofacies may usually be confirmed in the first instance by calibration to core data.

Manual interpretation of borehole image log (BHI) fabrics and textures, in conjunction with openhole logs and core calibration, is an established industry methodology for extrapolating into uncored intervals. This manual methodology, although often utilized, may usually only be detailed in internal company reports, e.g., in Ajay Samantray, Martin Kraaijveld, Waleed Bulushi & Laurent Spring, *Interpretation and Application of Borehole Image Logs in a New Generation of Reservoir Models for a Cluster of Fields in Southern Oman*, AAPG Memoir 92, Spring 2010, at 343, 343-57 (hereinafter Samantray). It may be a time-intensive method that relies heavily on the experience of the BHI interpreter for consistency. Typically, during manual interpretation when multiple wells and reservoir intervals are involved, spurious variations in reservoirs' rock properties from similar facies may be generated due to the introduction of minor inconsistencies in "lithotype" classes. Lithotype, as will be understood by those skilled in the art, may include subsurface material or a geological unit characterized on the basis of a combination of selected physical, textural, or stratigraphic parameters.

Manual interpretation of facies from borehole images has been applied to many reservoirs over the last twenty years. It is an established industry method for creating geologically-based facies utilizing borehole image logs (BHI) in conjunction with open hole logs and core calibration to extrapolate into uncored intervals. The methodology may rely heavily on the experience of the BHI interpreter to correctly identify the image features, textures, and orientation data. It is an established technique, but the methodology may largely be concealed and only occasionally elucidated through reference to specialist internal company reports or one-off papers, e.g., in Samantray. In Samantray, the borehole image log facies interpretation scheme by MacPherson et al., (2005) from a company report was reproduced. This scheme, now widely used, may be an amalgamation of previous works, but what may make it particularly unique, as displayed in Samantray, is its simplicity. On a single page it may summarize open hole logs with image log textures.

For example, an image facies scheme for clastic rocks after MacPherson may be illustrated, for example, in FIG. 1e(i). In FIG. 1e(i), an experienced geologist may have created a field-specific image facies scheme from a geological image interpretation of borehole image features with a petrophysical interpretation of open hole logs. Characteristic log cutoff values for certain rock types (e.g., argillaceous sandstones) may have been determined depending on formation log responses, log data availability, and data quality in the field. These image log rock facies types may be calibrated against core data in initial phases of projects and combined with geological fabrics interpreted from the image log and core, as illustrated, for example, in FIG. 1e(ii). That is, image facies for clastic rocks after MacPherson may be illustrated in FIG. 1e(ii), for example. This integration of geological textures identified from the borehole images, core, and the open hole logs may create a geological facies (e.g., bedded argillaceous sandstone). The method may rely heavily on the experience of the BHI interpreter to correctly identify the image features, texture, and orientation data. The developed facies may then be used to identify depositional environments and sediment dispersal directions within the geological reservoir models. Finally, the facies may be combined into facies associations to assess reservoir property groups rather than geological facies, as illustrated, for example, in FIG. 1e(iii). A facies association, as will be understood by those skilled in the art, may include a group of individual facies that are considered to have been in a particular sedimentological environment or by particular depositional processes. More specifically, an image facies association scheme for clastic rocks after MacPherson may be illustrated in FIG. 1e(iii), for example. This may help to distinguish between good and poor reservoirs for the simulation of the reservoir, e.g., a cross-bedded clean sandstone (Sx) is seen to have a better reservoir quality than a laminated clean sandstone.

The manual interpretation of borehole image log (BHI) fabrics and textures, in conjunction with open hole logs and core calibration, is an established industry methodology for extrapolating into uncored intervals. This manual methodology, although often utilized, may usually only be detailed in internal company reports, e.g., in Samantray. It was only recently fully reproduced by the inventors. It may be a time intensive method that relies heavily on the experience of the BHI interpreter for consistency. Typically, during manual interpretation when multiple wells and reservoir intervals are involved, spurious variations in reservoirs' rock properties from similar facies may be generated due to the introduction of minor inconsistencies in "lithotype" classes.

For example, a project utilized a borehole image log facies interpretation scheme developed by MacPherson et al., (2005) as reported in Samantray. This methodology may be frequently applied in the industry but seldom detailed outside of company reports. It may be only occasionally elucidated through reference to specialist internal company reports or one-off papers, as in Samantray. This scheme, now widely used, may be an amalgamation of previous works, but what makes it particularly unique, as displayed in Samantray, is its simplicity. On a single page it may summarize openhole logs with image log textures. For example, in FIG. 1c(i), an experienced geologist may have created a field-specific electrofacies scheme from a geological image interpretation of borehole image features with a petrophysical interpretation of openhole logs. That is, an example of an electrofacies scheme for clastic rocks after MacPherson in Samantray, for example, may be illustrated in FIG. 1c(i). An electrofacies scheme may include wireline response data 221 and borehole image response data 222, for example. As illustrated, wireline response data 221 (i.e., openlog data) may include measurements of gamma ray radioactivity in API 227, including a mean gamma ray measurement 223. Wireline response data 221 may also include measurements of density/neutron porosity 224, measurements of sand separation 225, and measurements of shale separation 226, as will be understood by those skilled in the art. Further, borehole image response data 222 (i.e., BHI data) may include indications of bedding types 228. Borehole image response data 222 may further include indications of often conductive mottled 229 and indications of conductivity of image character (in hydrocarbon leg) 230. Borehole image response data 222 may still further include indications of where a subsurface material falls on a scale between finely speckled image character 232 and flat/matte image character 231. An electrofacies scheme, as depicted, may include data related to heterolithics, such as an indication of how regular laminae are 233 and an indication of caliper enlargement 234 (i.e., increasing caliber size). Characteristic log cutoff values for certain rock types (e.g., argillaceous sandstones) may have been determined depending on formation log responses, log data availability, and data quality in the field. These image log rock facies types may be calibrated against core data in initial phases of projects and combined with geological fabrics interpreted from the image log and core, as illustrated in FIG. 1c(ii), for example. That is, an example of electrofacies for clastic rocks after MacPherson in Samantray, for example, may be illustrated in FIG. 1c(ii). For each of the image associations 235, electrofacies may include an image facies code 236, an image facies 237, and possible alternatives 238. This integration of geological textures identified from the borehole images, core, and the openhole logs may create a geological facies (e.g., bedded argillaceous sandstone). The method may rely heavily on the experience of the BHI interpreter to correctly identify the image features, texture, and orientation data. The developed facies may then be used to identify depositional environments and sediment dispersal directions within the geological reservoir models. For example, electrofacies (old workflow) used for a depositional environment and sediment dispersal analysis in Oman by MacPherson in Samantray is illustrated, for instance, in FIG. 1d. As depicted, recordings and observations may include (1) wireline caliper, GR, PE, density, and neutron porosity recordings and observations; (2) static and dynamic images recordings and observations; (3) manual picks, bedding, and fractures/faults recordings and observations; and (4) stratigraphy and relative porosity difference (RPD) recordings and observations. More specifically, wireline caliper, GR, PE, density, and neutron porosity recordings and observations may include hole shape measurements/representations 278, gamma ray (GR) and photoelectric (PE) measurements 279, density and neutron porosity measurements 280, and depth in meters 281. Static and dynamic images recordings and observations may include static normalized resistivity image data 282 and dynamic normalized resistivity image data 283. Additionally, manual picks, bedding, and fractures/faults recordings and observations may include manual dips 284, bedding azimuth frequency histograms by structural zone 285, and strike frequency histograms and poles by structural zone 286. Further, stratigraphy and RPD recordings and observations may include uncorrected fracture density measurements 287, structural dip and fault position measurements 288, stratigraphy 289, and SW, porosity, density, and RPD measurements 290. In addition to recordings and observations, electrofacies and sediment dispersal analysis may include interpretation, which in turn may include borehole image facies, facies association, and depositional sub-environment. More specifically, interpretation may include indications of image facies 291, indications of gross facies association 292, indications of depositional environment and cross bedding 293, and indications of gross depositional environment 294. Interpretation may also include residual dip azimuth histograms by gross depositional environment polar plots of low angle sandstones and heterolithics with residual dip greater than three degrees 295. Residual dip azimuth histograms 295 may in turn include indications of residual dip of cross beddings, sandstone bedding, and erosional surfaces 296. Sediment dispersal analysis, as will be understood by those skilled in the art, may be determined as an overall general direction of movement of grains that constitute facies. For example, different mechanical or biological mechanisms—e.g., wind (saltation), water (traction), and mass movement (land slips)—may physically move grains that make up a formation. But the sum of and recognition of the individual directions of movement from interpretation of image log fabrics are sediment dispersal and sediment transport trend analysis. Finally, the facies may be combined into facies associations to assess reservoir property groups rather than geological facies, as illustrated in FIG. 1c(iii), for example. An electrofacies association scheme for clastic rocks after MacPherson in Samantray may be depicted, for example, in FIG. 1c(iii). An electrofacies association scheme may include, for instance, image association names 239, dominant facies 240, subordinate facies 241, and common sub-environments of occurrence 242. As depicted, image facies codes are represented by different colors and patterns, although the colors or patterns may vary. This may help to distinguish between good and poor reservoirs for the simulation of the reservoir, e.g., a cross-bedded clean sandstone (Sx) is seen to have a better reservoir quality than a laminated clean sandstone.

SUMMARY OF THE INVENTION

Applicants have recognized problems, sources of the problems, and solutions to problems identified in the prior art. For example, manual analysis and interpretation of borehole images can be a time-intensive process, and it can rely heavily on the experience of the borehole interpreter to ensure consistency. Furthermore, consistency in borehole image interpretation can be particularly elusive when more than one borehole image interpreter analyzes borehole images associated with a single hydrocarbon reservoir. At least one source of inconsistency in borehole image interpretation, for example, is that subsurface material type can be mischaracterized. To address at least these identified problems and sources of problems, among others, embodiments of systems, computer-implemented methods, and non-transitory computer-readable medium having computer program stored therein to enhance borehole image analysis are disclosed.

Embodiments can include, for example, a new approach of combining neural networks and image-based petrophysics with manual image texture interpretation in a unified workflow to provide an efficient, consistent, and high confidence image-based electrofacies analysis for stratigraphic interpretations across multiple wells in clastic successions. Consequently, a combination of neural networks and image-based petrophysics with a manual image texture interpretation to build high resolution electrofacies in stratigraphic interpretations across multiple wells in clastic successions, for example, is disclosed herein.

A system to enhance borehole image analysis, according to an embodiment, for example, can include one or more processors, one or more input and output units in communication with the one or more processors, and one or more displays in communication with the one or more processors. The one or more input and output units can also be positioned to receive as input a plurality of different openhole log data sets, a plurality of different core data sets, and a plurality of different borehole image reading sets, for example. Each of the plurality of different openhole log data sets can be associated with one or more of a plurality of hydrocarbon wells. The plurality of hydrocarbon wells, for instance, can be associated with a hydrocarbon reservoir. Each of the plurality of different core data sets can also be associated with one or more of the plurality of hydrocarbon wells. Core data, for example, can include core grain size. Further, each of the plurality of different borehole image reading sets can also be associated with one or more of the plurality of hydrocarbon wells. More specifically, one or more of the plurality of different borehole image reading sets can be associated with each of the plurality of hydrocarbon wells. In addition, each of the plurality of different borehole image reading sets can include a plurality of borehole image readings. The one or more input and output units can further be positioned to output an approximated grain size and an approximated material type for each borehole image reading. A system can also include non-transitory memory medium in communication with the one or more processors. The memory medium, in turn, can include a neural network mapping module and an image-based petrophysical analysis module, for example.

The neural network mapping module, for example, can include computer-readable instructions stored therein that when executed cause the system to perform a series of steps. The steps can include, for example, comparing the plurality of different openhole log data sets to the plurality of different core data sets. The steps can also include performing iteratively an unsupervised neural network map, responsive to the plurality of different openhole log data sets and the plurality of different core data sets. Performing iteratively an unsupervised neural network map can thereby identify one or more material types associated with the plurality of hydrocarbon wells, for example. Further, the steps can include generating, responsive to the neural network map, a material-type scheme. The material-type scheme can associate each of the identified one or more material types with a plurality of material characteristics, including one or more of the following: material resistivity value and material grain size.

The image-based petrophysical analysis module, for example, can also include computer-readable instructions stored therein that when executed cause the system to perform a series of steps. The steps, for example, can include distributing each of the plurality of borehole image readings of each of the plurality of different borehole image reading sets into one of a plurality of resistivity classes, responsive to the material-type scheme. Each of the plurality of resistivity classes can have one or more predetermined associated material resistivity values, for example. Consequently, distributing each borehole image reading can thereby associate each borehole image reading with an approximated material type. The steps can also include calibrating each borehole image reading responsive to the plurality of different core data sets and the material-type scheme. Calibrating each borehole image reading can thus produce an approximated grain size associated with each borehole image reading. The steps can further include, for example, depicting information on the one or more displays, for each hydrocarbon well. The depicted information can include, for instance, the associated one or more of the plurality of different borehole image reading sets, the approximated material type for each borehole image reading of the associated one or more of the plurality of different borehole image reading sets, and the approximated grain size for each borehole image reading of the associated one or more of the plurality of different borehole image reading sets. Depicting this data can thereby increase consistency in categorizing subsurface material associated with the plurality of hydrocarbon wells by material type. Further, depicting this data can enhance interpretation of subsurface material texture, fabric, and features to predict subsurface material composition of the hydrocarbon reservoir.

In addition, in some circumstances, one or more approximated grain sizes each associated with a borehole image reading can have a core-equivalent resolution, for example. The memory medium of a system according to an embodiment can further include computer-readable instructions stored therein that when executed cause the system to perform the step of generating a high resolution electrofacies, responsive to the approximated material types, the approximated grain sizes, and user identification of one or more of the following: image texture data, image feature data, image fabric data, and image orientation data. Generating a high resolution electrofacies can thereby enhance characterization of subsurface material composition of the hydrocarbon reservoir.

Furthermore, the petrophysical analysis module, in a system according to an embodiment, can also include computer-readable instructions stored therein that when executed cause the system to perform additional steps. The steps can include, for example, identifying one or more zones of fluid phase change, responsive to the plurality of different openhole log data sets and the plurality of different borehole image reading sets. The steps can further include modifying the plurality of resistivity classes responsive to the identified one or more zones of fluid phase change, a plurality of measurements of water saturation associated with one or more of the plurality of hydrocarbon wells, the material-type scheme, the approximated material types, and the approximated grain sizes. Modifying the plurality of resistivity classes can thereby compensate for fluid phase changes associated with the identified one or more zones of fluid phase change.

In addition to systems, a computer-implemented method to enhance borehole image analysis, according to an embodiment, can include comparing a plurality of different openhole log data sets to a plurality of different core data sets, for example. Each of the plurality of different openhole log data sets can be associated with one or more of a plurality of hydrocarbon wells. The plurality of hydrocarbon wells, in turn, can be associated with a hydrocarbon reservoir. Further, each of the plurality of different core data sets can also be associated with one or more of the plurality of hydrocarbon wells. Core data can include core grain size, for example. A method can also include performing iteratively an unsupervised neural network map, responsive to the plurality of different openhole log data sets and the plurality of different core data sets. Performing iteratively an unsupervised neural network map can thereby identify one or more material types associated with the plurality of hydrocarbon wells, for example. A method can further include, for instance, generating a material-type scheme, responsive to the neural network map. The material-type scheme can associate each of the identified one or more material types with a plurality of material characteristics, including one or more of the following: material resistivity value and material grain size.

A method can also include distributing each of a plurality of borehole image readings of each of a plurality of different borehole image reading sets into one of a plurality of resistivity classes, responsive to the material-type scheme. Each of the plurality of different borehole image reading sets can include a plurality of borehole image readings and can further be associated with one or more of the plurality of hydrocarbon wells. Additionally, one or more of the plurality of different borehole image reading sets can be associated with each of the plurality of hydrocarbon wells. Each of the plurality of resistivity classes can have one or more predetermined associated material resistivity values, for example. As a result, distributing the borehole image readings can thereby associate each borehole image reading with an approximated material type. A method can also include calibrating each borehole image reading, responsive to the plurality of different core data sets and the material-type scheme. Calibrating each borehole image reading can produce an approximated grain size associated with each borehole image reading. A method can further include, for example, depicting—for each hydrocarbon well—the associated one or more of the plurality of different borehole image reading sets, the approximated material type for each borehole image reading of the associated one or more of the plurality of different borehole image reading sets, and the approximated grain size for each borehole image reading of the associated one or more of the plurality of different borehole image reading sets. Depicting this data can thereby increase consistency in categorizing subsurface material associated with the plurality of hydrocarbon wells by material type. Further, depicting this data can enhance interpretation of subsurface material texture, fabric, and features to predict subsurface material composition of the hydrocarbon reservoir.

In some circumstances, one or more approximated grain sizes each associated with a borehole image reading can have a core-equivalent resolution, for example. A method according to an embodiment can also include generating a high resolution electrofacies, responsive to the approximated material types, the approximated grain sizes, and user identification of one or more of the following: image texture data, image feature data, image fabric data, and image orientation data. Generating a high resolution electrofacies can thereby enhance characterization of subsurface material composition of the hydrocarbon reservoir.

A method can also include identifying one or more zones of fluid phase change, responsive to the plurality of different openhole log data sets and the plurality of different borehole image reading sets. A method can then include modifying the plurality of resistivity classes responsive to the identified one or more zones of fluid phase change, a plurality of measurements of water saturation associated with one or more of the plurality of hydrocarbon wells, the material-type scheme, the approximated material types, and the approximated grain sizes. Modifying the plurality of resistivity classes can thereby compensate for fluid phase changes associated with the identified one or more zones of fluid phase change.

An embodiment can also include non-transitory computer-readable medium having one or more computer programs stored therein operable by one or more processors to enhance borehole image analysis, for example. The one or more computer programs can include a set of instructions that, when executed by the one or more processors, cause the one or more processors to perform a series of operations. For example, the operations can include comparing a plurality of different openhole log data sets to a plurality of different core data sets. Each of the plurality of different openhole log data sets can be associated with one or more of a plurality of hydrocarbon wells. The plurality of hydrocarbon wells, in turn, can be associated with a hydrocarbon reservoir. In addition, each of the plurality of different core data sets can be associated with one or more of the plurality of hydrocarbon wells, and core data can include core grain size, for example. The operations can further include performing iteratively an unsupervised neural network map, responsive to the plurality of different openhole log data sets and the plurality of different core data sets. Performing iteratively an unsupervised neural network map can thereby identify one or more material types associated with the plurality of hydrocarbon wells, for example. The operations can also include generating a material-type scheme, responsive to the neural network map. The material-type scheme can associate each of the identified one or more material types with a plurality of material characteristics, including, for example, one or more of the following: material resistivity value and material grain size.

The operations can further include, for example, distributing each of a plurality of borehole image readings of each of a plurality of different borehole image reading sets into one of a plurality of resistivity classes, responsive to the material-type scheme. Each of the plurality of different borehole image reading sets can include a plurality of borehole image readings and be associated with one or more of the plurality of hydrocarbon wells. Further, one or more of the plurality of different borehole image reading sets can be associated with each of the plurality of hydrocarbon wells. In addition, each of the plurality of resistivity classes can have one or more predetermined associated material resistivity values. Consequently, distributing the borehole image readings can thereby associate each borehole image reading with an approximated material type. The operations can further include calibrating each borehole image reading, responsive to the plurality of different core data sets and the material-type scheme. Calibrating each borehole image reading can consequently produce an approximated grain size associated with each borehole image reading. The operations can also include depicting on one or more displays—for each hydrocarbon well—the associated one or more of the plurality of different borehole image reading sets, the approximated material type for each borehole image reading of the associated one or more of the plurality of different borehole image reading sets, and the approximated grain size for each borehole image reading of the associated one or more of the plurality of different borehole image reading sets. Depicting this information can thereby increase consistency in categorizing subsurface material associated with the plurality of hydrocarbon wells by material type. Further, depicting the information can enhance interpretation of subsurface material texture, fabric, and features to predict subsurface material composition of the hydrocarbon reservoir.

In some circumstances, one or more approximated grain sizes, each associated with a borehole image reading, can each have a core-equivalent resolution. In some non-transitory computer-readable medium having one or more computer programs stored therein, according to an embodiment, the set of instructions, when executed by the one or more processors, can further cause the one or more processors to perform additional operations. The operations can include, for example, generating a high resolution electrofacies, responsive to the approximated material types, the approximated grain sizes, and user identification of one or more of the following: image texture data, image feature data, image fabric data, and image orientation data. Generating a high resolution electrofacies can thereby enhance characterization of subsurface material composition of the hydrocarbon reservoir.

The operations can also include identifying, responsive to the plurality of different openhole log data sets and the plurality of different borehole image reading sets, one or more zones of fluid phase change. The operations can then include modifying the plurality of resistivity classes responsive to the identified one or more zones of fluid phase change, a plurality of measurements of water saturation associated with one or more of the plurality of hydrocarbon wells, the material-type scheme, the approximated material types, and the approximated grain sizes. Modifying the plurality of resistivity classes can thereby compensate for fluid phase changes associated with the identified one or more zones of fluid phase change.

BRIEF DESCRIPTION OF THE DRAWINGS

The application file contains at least one drawing executed in color. Copies of this patent application publication with color drawings will be provided by the Patent and Trademark Office upon request and payment of the necessary fee.

These and other features, aspects, and advantages of the present invention will become better understood with regard to the following descriptions, claims, and accompanying drawings. It is to be noted, however, that the drawings illustrate only several embodiments of the invention and are therefore not to be considered limiting of the invention's scope as it can admit to other equally effective embodiments.

FIG. 1c(ii) is a schematic diagram of electrofacies according to the prior art.

FIG. 1c(iii) a schematic diagram of an electrofacies association scheme according to the prior art.

FIG. 1e(ii) is a schematic diagram of electrofacies according to the prior art.

FIG. 1e(iii) a schematic diagram of an electrofacies association scheme according to the prior art.

FIG. 16 is a schematic diagram of an electrofacies scheme according to an embodiment of the invention.

DETAILED DESCRIPTION OF THE INVENTION

So that the manner in which the features and advantages of the embodiments of methods, systems, and non-transitory computer-readable medium having computer program stored therein of the present invention, as well as others, which will become apparent, may be understood in more detail, a more particular description of the embodiments of methods, systems, and non-transitory computer-readable medium having computer program stored therein of the present invention briefly summarized above may be had by reference to the embodiments thereof, which are illustrated in the appended drawings, which form a part of this specification. It is to be noted, however, that the drawings illustrate only various embodiments of the embodiments of methods, systems, and non-transitory computer-readable medium having computer program stored therein of the present invention and are therefore not to be considered limiting of the embodiments of methods, systems, and non-transitory computer-readable medium having computer program stored therein of the present invention's scope as it may include other effective embodiments as well.

Embodiments of Systems

Figure 2:
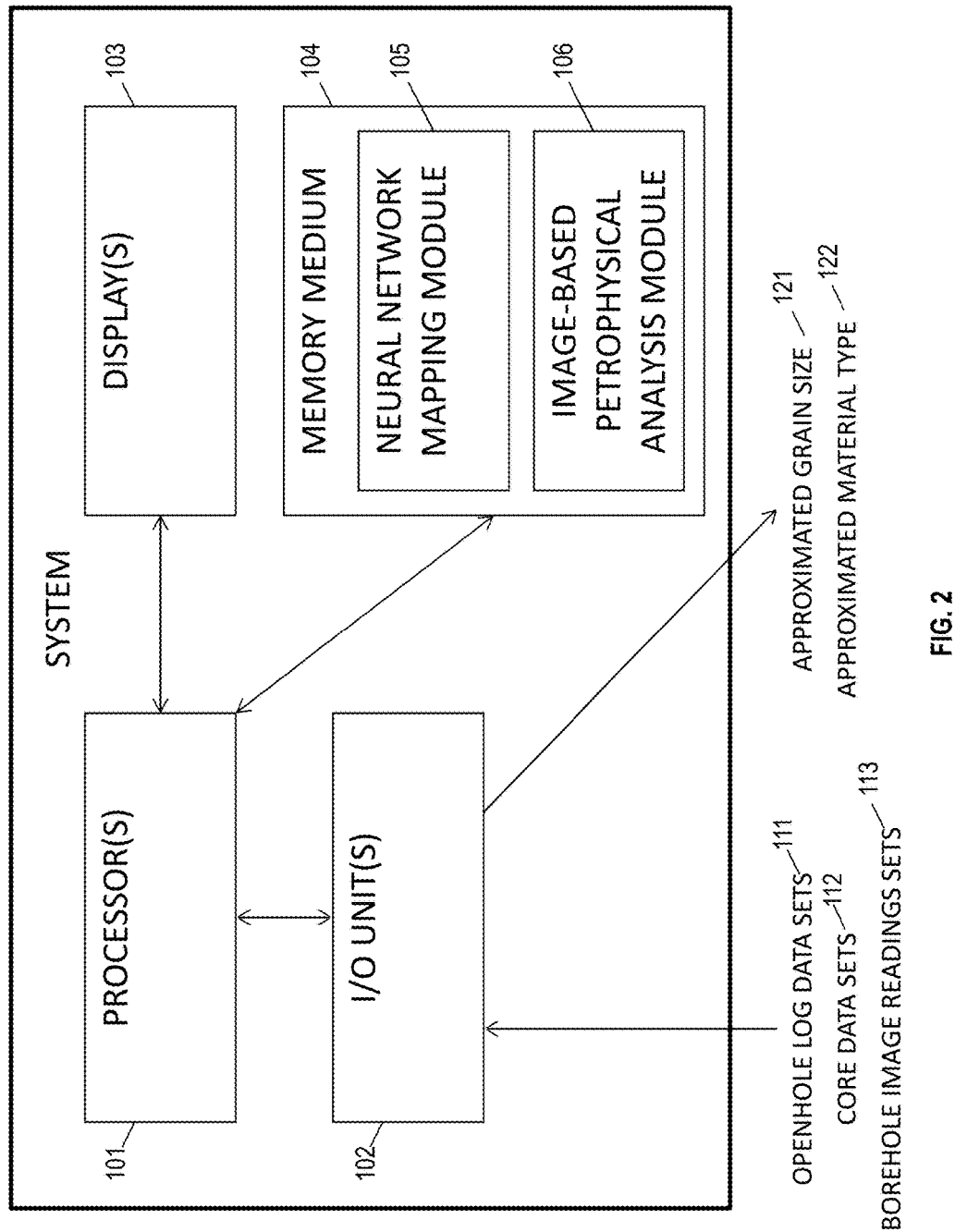
FIG. 2 is a schematic diagram of a system according to an embodiment of the invention.

A system to enhance borehole image analysis, according to an embodiment of the invention, for example, can include one or more processors 101, one or more input and output units 102 in communication with the one or more processors 101, and one or more displays 103 in communication with the one or more processors 101, as illustrated in FIG. 2, for example. The one or more input and output units 102 can also be positioned to receive as input a plurality of different openhole log data sets 111, a plurality of different core data sets 112, and a plurality of different borehole image reading sets 113, for example. Each of the plurality of different openhole log data sets 111 can be associated with one or more of a plurality of hydrocarbon wells. Moreover, the plurality of hydrocarbon wells, for instance, can be associated with a hydrocarbon reservoir. Openhole log data can include, for example, density measurement data, neutron measurement data, gamma ray (GR) measurement data, induction log data, lateral log ("laterlog" or "laterolog") data, porosity log data, photoelectric (PE) curve data, and petrophysical calculations (e.g., water saturation). Each of the plurality of different core data sets 112 can also be associated with one or more of the plurality of hydrocarbon wells. Core data, for example, can include core grain size. Grain size, in turn, can refer to particle size of individual components that make up subsurface material and can relate to the relative amounts of, for example, sand, silt, and clay within a core sample. Each of the plurality of different borehole image reading sets 113 can also be associated with one or more of the plurality of hydrocarbon wells. More specifically, one or more of the plurality of different borehole image reading sets 113 can be associated with each of the plurality of hydrocarbon wells. Further, each of the plurality of different borehole image reading sets 113 can include a plurality of borehole image readings. The one or more input and output units 102 can further be positioned to output an approximated grain size 121 and an approximated material type 122 for each borehole image reading. A system can also include non-transitory memory medium 104 in communication with the one or more processors 101. The memory medium 104, in turn, can include a neural network mapping module 105 and an image-based petrophysical analysis module 106, for example.

Figure 3:
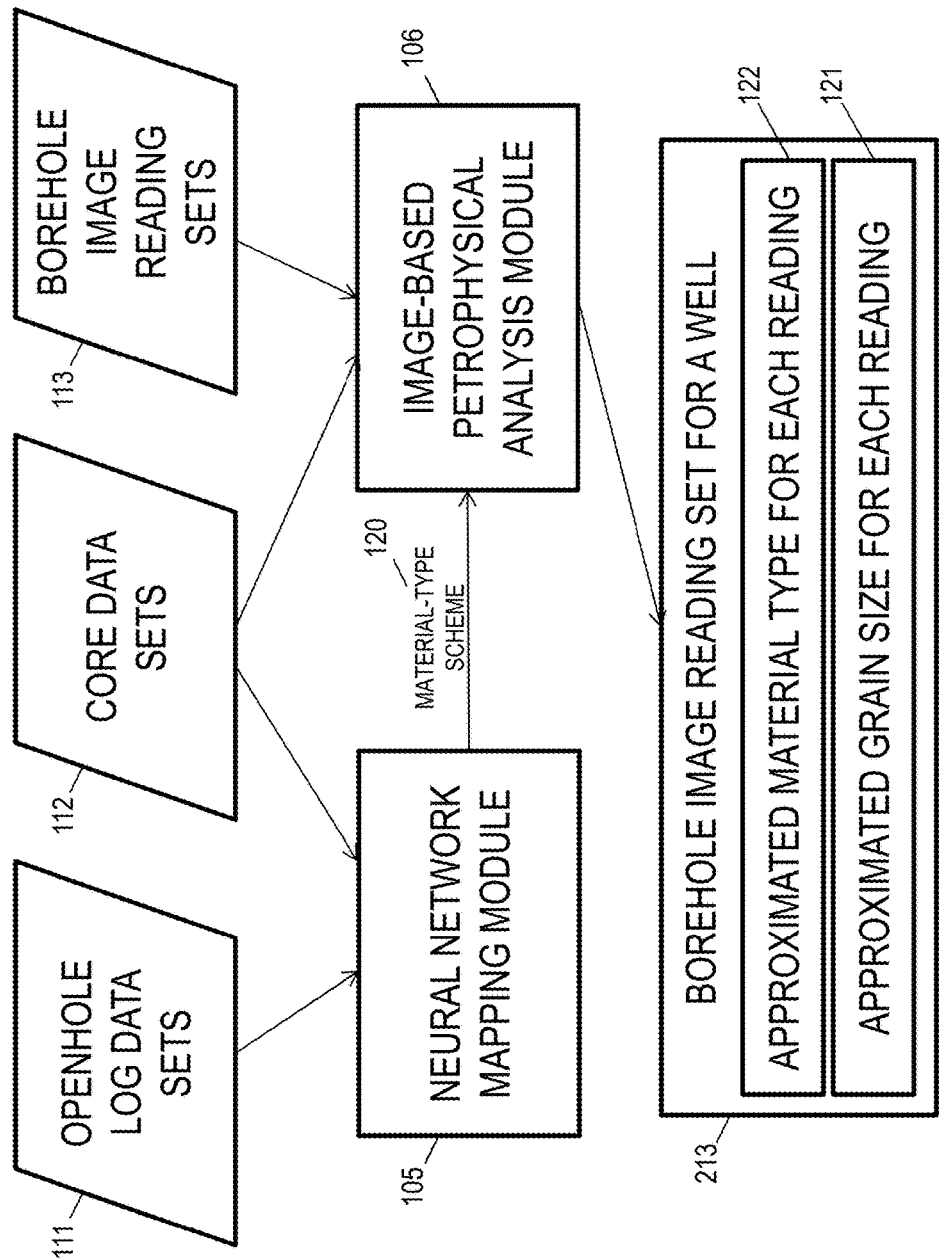
FIG. 3 is a schematic diagram of a system according to an embodiment of the invention.

The neural network mapping module 105, for example, can include computer-readable instructions stored therein that when executed cause the system to perform a series of steps. The steps can include, for example, comparing the plurality of different openhole log data sets 111 to the plurality of different core data sets 112. For example, clustering of openhole log data can be analyzed and compared to core data by use of a correlation panel on the one or more displays 103. The steps can also include performing iteratively an unsupervised neural network map, responsive to the plurality of different openhole log data sets 111 and the plurality of different core data sets 112. A neural network, as will be understood by those skilled in the art, can consist of interconnected nodes or neurons that are capable of "learning" relationships between different sets of data, for example. After repeated processing, a neural network can produce a "trained" neural network map. Neural networks can be supervised or unsupervised. A supervised neural network utilizes example relationships between data sets, whereas an unsupervised neural network does not use example relationships as a starting point. Consequently, a neural network map can be unsupervised when no input curve (e.g., a numerical core grain-size curve) is chosen to guide neural network calculations. An unsupervised neural network map can be advantageous because an input curve, such as a numerical core grain-size curve, that has been created from a visual inspection of a core can be biased and possibly inconsistent if more than one core interpreter created such a curve, for example. Unsupervised neural network calculations can later be fine-tuned, for example, by use of correlation panels or on the map. An unsupervised—sometimes called "fuzzy"—neural network map can thus calibrate the openhole log data with the core data. As a result, performing iteratively an unsupervised neural network map can thereby identify one or more material types associated with the plurality of hydrocarbon wells, for example. Identified material types can include, in some circumstances, for example, facies associations or classes. For instance, identified material types can include mudstone, siltstone, argillaceous ("muddy") sandstone, sandstone ("clean"), or heterolithics. The one or more material types can be identified, for example, by use of variably weighted input curves. The steps performed by the system can further include generating a material-type scheme 120, responsive to the neural network map, as illustrated, for example, in FIG. 3. The material-type scheme 120 can associate each of the identified one or more material types with a plurality of material characteristics, including one or more of the following: material resistivity value and material grain size. Consequently, the neural network map can calibrate openhole log-based material classes with core grain-size data. Further, the material-type scheme 120—sometimes described as a "constrained gross facies scheme" or a "constrained gross scheme"—can include trained, core-calibrated curves that can then be used by the image-based petrophysical analysis module.

The image-based petrophysical analysis module 106, for example, can also include computer-readable instructions stored therein that when executed cause the system to perform a series of steps. The steps, for example, can include distributing each of the plurality of borehole image readings of each of the plurality of different borehole image reading sets 113 into one of a plurality of resistivity classes, responsive to the material-type scheme 120. Each of the plurality of resistivity classes can have one or more predetermined associated material resistivity values, for example. For instance, an individual resistivity class can have a range of predetermined associated material resistivity values. Consequently, distributing each borehole image reading can thereby associate each borehole image reading with an approximated material type 122. Approximated material type 122 can include, for example, facies, rock types, and units. The steps can also include calibrating each borehole image reading responsive to the plurality of different core data sets 112 and the material-type scheme 120. Calibrating each borehole image reading can thus produce an approximated grain size 121 associated with each borehole image reading. An approximated grain size 121 can be one of one or more approximated grain size classes. Further, an approximated grain size 121 can in some instances be described as a "pseudo" grain size because it can indicate an artificial, quasi-, or substitute grain size measurement for an actual grain size measurement. That is, approximated grain size 121 can be a best estimate of the grain-size distribution that can be made as derived from electrical responses in relation to their empirical calibration with actual observed or measured grain sizes from a core. Because borehole image data can include measurements in the micro-resistivity range, for example, micro-resistivity can be used in the image-based petrophysical analysis module 106 to generate approximated grain size 121 according to some embodiments, as will be understood by those skilled in the art. The steps can further include, for example, depicting information on the one or more displays 103, for each hydrocarbon well. The depicted information can include, for example, the associated one or more borehole image reading sets 213 of the plurality of different borehole image reading sets 113, the approximated material type 122 for each borehole image reading of the associated one or more borehole image reading sets 213 of the plurality of different borehole image reading sets 113, and the approximated grain size 121 for each borehole image reading of the associated one or more borehole image reading sets 213 of the plurality of different borehole image reading sets 113. The data can be depicted as a histogram, for example, in which different categories of data are depicted side by side. Depicting this data can thereby increase consistency in categorizing subsurface material associated with the plurality of hydrocarbon wells by material type. Further, depicting this data can enhance interpretation of subsurface material texture, fabric, and features to predict subsurface material composition of the hydrocarbon reservoir.

In some circumstances, one or more approximated grain sizes 121 each associated with a borehole image reading can have a core-equivalent resolution, for example. Core-equivalent resolution, for example, can be a high resolution. Further, the memory medium 104 of a system according to an embodiment can further include computer-readable instructions stored therein that when executed cause the system to perform the step of generating a high resolution electrofacies, responsive to the approximated material types 122, the approximated grain sizes 121, and user identification of one or more of the following: image texture data, image feature data, image fabric data, and image orientation data. Generating a high resolution electrofacies can thereby enhance characterization of subsurface material composition of the hydrocarbon reservoir. A high-resolution electrofacies can include, for example, cross-bedded argillaceous sandstone. Advantageously, generating a high resolution electrofacies can obviate a determination of lithotype from openhole log data.

Borehole image readings can, for example, include high resolution micro-resistivity image log data. Further, the memory medium 104 of a system according to an embodiment can also include computer-readable instructions stored therein that when executed cause the system to perform a series of steps. The steps can include performing data quality control on the plurality of different openhole log data sets 111, the plurality of different core data sets 112, and the plurality of different borehole image reading sets 113, for example. The steps can also include reprocessing the plurality of different openhole log data sets 111, the plurality of different core data sets 112, and the plurality of different borehole image reading sets 113. Further, the steps can include depth matching the plurality of different openhole log data sets 111, the plurality of different core data sets 112, and the plurality of different borehole image reading sets 113 to thereby enhance input to the system. A comprehensive data quality control, reprocessing, and depth-matching procedure can help to assure high data quality.

Quality control can include various aspects and steps. For example, in some instances, quality control can include checking: (1) for the presence of all curves in the raw and processed data, i.e., for completeness; (2) that the formatting and packaging of curves is in a manner acceptable by industry standard application software, as will be understood by those skilled in the art; (3) that the raw data was not inappropriately modified, e.g., by incorrect filtering of orientation curves; and (4) that the vendor-processed data (e.g., field print/cgm) are in agreement with internally processed images. Further, steps involved in quality control can include: (1) loading the raw and processed data into industry standard software, as will be understood by those skilled in the art, for verification and to check the data accuracy; (2) quality checking—and analyzing for any data problems—a tool magnetometer and accelerometer data; (3) calculating orientation data from the delivered magnetometer and accelerometer data and verifying the orientation data against an in-house directional survey and vendor-provided data; and (4) archiving the raw and processed data in a database for potential interpretation.

In some circumstances, the plurality of borehole image readings of each of the plurality of different borehole image reading sets can be non-normalized. Normalization, as will be understood by those skilled in the art, can include a statistical process applied to BHI resistivity values within a histogram analysis. As an example to illustrate normalization in this context, if the lowest measured resistivity value over a logged interval of BHI data is 10 ohm/m and the highest value is 20,000 ohm/m, normalization will assign— if the normalization scale is chosen to be from 1 to 100-1 to the lowest value (here, 10 ohm/m) and 100 to the highest value (here, 20,000 ohm/m). Then, all other resistivity values can be forced into classes between 1 and 100. BHI data is often provided as normalized data, either normalized over the whole logged interval, or over a moving, short fixed interval (e.g., a four-foot window). Non-normalized data, however, can maintain a true resistivity range better than normalized data. The steps can also include flattening each borehole image reading before distributing each borehole image reading into one of a plurality of resistivity classes, for example. Flattening a borehole image reading, for example, can include using a manual dip dataset from borehole image log analysis. A borehole image reading can benefit from flattening, for example, when the top and base of a sandstone layer are not plotted as straight lines across all BHI pads in a vertical well. In this example case, the sandstone layer is likely inclined. Calculating the resistivity histogram of this inclined sandstone layer close to the top or base can compute a resistivity histogram that contains only parts of the resistivity values from the sandstone layer. That is, the computed histogram can contain resistivity values from the formation above or below the sandstone layer. Therefore, the sandstone layer can be flattened, i.e., the top and base can be forced to plot as a straight line on all pads at the same depth, to calculate a true resistivity distribution in the sandstone layer, parallel to the top and base.

In some systems, the neural network mapping module 105 can further include computer-readable instructions stored therein that when executed cause the system to perform the step of modifying one or more neural network nodes of the neural network map responsive to variably-weighted input curves and user action, for example. The neural network map—sometimes described as a self-organizing map—can, for example, visualize clustering of openhole log data curves in a representative set of nodes of the neural network map. The neural network map can then be interactively edited to further enhance a log-to-core correlation, for example, and to produce a "trained," core-calibrated neural network map. Consequently, modifying the one or more neural network nodes can thereby enhance identification of the one or more material types associated with the plurality of hydrocarbon wells. Further, one or more trained and core-calibrated neural network curves can be associated with the material-type scheme 120, and the neural network curves can thereby define a constrained gross facies scheme. The one or more material types identified in the neural network mapping module, for example, can be identified by use of variably weighted input curves.

In some circumstances, the plurality of hydrocarbon wells can be associated with a clastic environment. A clastic environment, for example, as will be understood by those skilled in the art, can include subsurface material that is itself composed of fragments of rock or other material. In addition, the one or more material types associated with the plurality of hydrocarbon wells identified in the neural network mapping module 105 can therefore include one or more of the following: mudstone, siltstone, argillaceous sandstone, sandstone, and heterolithics.

The petrophysical analysis module 106, in a system according to an embodiment, can further include computer-readable instructions stored therein that when executed cause the system to perform additional steps. The steps can include, for example, identifying one or more zones of fluid phase change, responsive to the plurality of different open-hole log data sets 111 and the plurality of different borehole image reading sets 113. The steps can further include modifying the plurality of resistivity classes responsive to the identified one or more zones of fluid phase change, a plurality of measurements of water saturation associated with one or more of the plurality of hydrocarbon wells, the material-type scheme 120, the approximated material types 122, and the approximated grain sizes 121. Measurements of water saturation can include, for example, Sw and Sxo, as will be understood by those skilled in the art. More specifically, Sw can indicate total water saturation, and Sxo can include saturation of a flushed (mud invasion) zone. Modifying the plurality of resistivity classes thereby can compensate for fluid phase changes associated with the identified one or more zones of fluid phase change. Resistivity thus can be used in a fluid phase compensation portion of the image-based petrophysical analysis module 106 as well, according to some embodiments.

Fluid phase can vary within a hydrocarbon reservoir between oil phase, gas phase, and water phase, for instance. Zones of transition between different phases can produce anomalous resistivity readings. As a result, compensation for phase changes within those zones can be desirable so as to produce more accurate resistivity measurements. For example, sandstone can in some circumstances be "water-wet." Water-wet sandstone prefers contact with a water phase over other phases, for example.

For instance, a well can be called "water wet" if, in a clastic reservoir, for example, the sandstone is filled with formation water instead of hydrocarbons. Formation water resistivity in sandstone can be dependent upon its saturation with electrically conductive minerals. But a resistivity response, on the other hand, can be dependent upon the porosity of the sandstone, i.e., the amount of fluid with electrically conductive minerals, and the sand grains themselves. The relationship can be that the lower the amount of conductive minerals in the water, at the same porosity and sand resistivity, the more resistive the response of the sandstone on the BHI will be. Alternatively, the relationship can be that the lower the porosity of the sandstone, with the same amount of electrically conductive minerals in the water, the more resistive the response of the sandstone on the BHI will be.

Claystones, or so-called shales or mudstones, can contain clay minerals, which are electrically conductive. There can be a variety of different clay mineral types, some of which can have more bound water—i.e., they are more conductive—than others. The relationship can be that the lower the amount of clay minerals with bound waters in the claystone, the more resistive the response of the claystone on the BHI will be.

Further, in a water-wet well with sandstones and claystones, there can be a more resistive response from the claystone than from the sandstone, simply because there is more conductive fluid in the sandstone than bound water in the clay minerals of the claystone. But porosities can vary a lot in sandstones, both horizontally and vertically, and they can vary generally more than the amount of electrically conductive minerals in the fluid.

In addition, mud filtrate with a known, constant resistivity can be used in the drilling process. This drilling mud can infiltrate permeable formations more than others, i.e., drilling mud can infiltrate sandstones more than claystones. Typically, drilling mud can be more conductive than the formation water, i.e., sandstones with mud filtrate invasion can be more conductive than sandstones without invasion.

Geologically, the porosity and permeability of a clastic rock can depend strongly on the grain-size and cementation, i.e., the filling of the matrix between the grains. The matrix filling can be one or more of the following: (a) water or hydrocarbon, (b) cement, and (c) clay minerals. For (a) and (b), the variations in fluid resistivities, i.e., the amount of bound water, porosity and fluid invasion, can be quantified in the Sxo (saturation of flushed zone) and Sw (total saturation) calculations. The (c) amount of clay minerals in the sandstone matrix can be estimated in the volume of shale (VShale) calculation from a gamma ray (GR) or a spontaneous potential (SP) curve.

Taking all these curve responses (BHI resistivity, GR, Sxo, Sw, laterlog or induction log, and others, like the Pe curves) into account in the petrophysical analysis module can help to find (a) zones with fluid phase changes (hydrocarbon vs. water), (b) zones with more invasion than others, (c) variations in grain-sizes, and (d) variations in clay content.

Another general, geological assumption can be that the amount of clay minerals in hydrocarbon formations increases with overall decreasing grain-sizes, i.e., an increase in GR values indicates both lower grain-sizes and higher clay mineral content, for example.

As an illustrative example of fluid phase compensation, two cases can be compared: (1) two similar, water-wet sandstones, intercalated by a claystone, and (2) two similar sandstones, one hydrocarbon (oil) bearing and one water wet, intercalated by a claystone. The following image-based petrophysical interpretations can be made to obtain "pseudo" grain-size distributions from the BHI resistivity readings. For (1), the "water wetness" of the sandstones and their similar porosity can be indicated by similar Sw and neutron porosity curve values. The sandstones' Sxo curve values can be consistent with the Sw values (e.g., Sxo=Sw=1, i.e., water saturated). Assuming the BHI resistivity, GR, and bulk density curve values are the same, a similar grain-size—which can be further calibrated with core data—and clay mineral content can be interpreted. Furthermore, BHI resistivity curve values do not require fluid phase compensation before they can be calibrated with core grain-sizes. For (2), on the other hand, Sw, Sxo, and bulk density curve values for the sandstones can be different, but the porosity and the GR curves can have similar values.

BHI resistivity values can be higher for the hydrocarbon bearing sandstone compared to the claystone (as indicated by significantly higher gamma ray, bulk density, and neutron porosity curve values). Another observation can be that the claystone has higher GR curves values than the water-wet (as indicated by Sw curve values, or the low laterlog/induction log resistivities) sandstone. To use both sandstones' BHI resistivity values for the grain-size calibration with core, BHI resistivity values can be lowered over a hydrocarbon interval to match those of the water-wet sandstone. If one of the sandstones of the above examples has higher GR curve values—which can still be lower than that of the claystone—the sandstone with the higher GR curve values can have higher clay mineral content and can be assumed to have a lower grain-size. This can be described as a fluid phase compensation according to an embodiment of the invention.

For instance, if sandstone is hydrocarbon-bearing, fluid compensation can transform sandstone, which was less conductive than mudstone previously, to appear now more conductive than mudstone classes of material, for instance. Assuming that no significant density variations exist—i.e., assuming that no cementation exists—an increased resistivity in the water-wet sandstone, after compensation, may correlate with an increase in clay content.

The steps can also include, for example, matching the number of the plurality of resistivity classes with the number of the one or more material types associated with the plurality of hydrocarbon wells identified in the neural network mapping module 105. The memory medium 104 of a system according to an embodiment can further include computer-readable instructions stored therein that when executed cause the system to perform a series of steps. The steps can include, for example, determining one or more projected material types associated with each of one or more uncored intervals of one or more of the plurality of hydrocarbon wells, responsive to the approximated material type 122 associated with each of one or more of the plurality of borehole image readings 113. Uncored intervals can include, for example, sections of a borehole from which no core has been taken. The steps can further include determining one or more projected grain sizes associated with each of the one or more uncored intervals of the hydrocarbon reservoir associated with the plurality of hydrocarbon wells, responsive to the approximated grain size 121 associated with each of one or more of the plurality of borehole image readings 113. Determining one or more projected material types or one or more projected grain sizes can thereby produce a high-resolution characterization of the hydrocarbon reservoir, for example.

In some circumstances, before operation of the neural network mapping module, borehole image features can first be identified and manually classified (e.g., bedding or cross-bedding) based on dip magnitudes, orientation trends, and borehole image character, as will be understood by those skilled in the art, by an experienced image interpreter. Further, mean structural dip can be determined from stratified units. Structural dip can include, for instance, a tilt in a layer of subsurface material that resulted from structural uplifting or downwarping after sediment has been deposited. In some circumstances, the stratified units can be assumed to be deposited palaeo-horizontally, such as, for example, mudstone, heterolithic, or siltstone bedding surfaces. Original sedimentary dips, however, can be restored in some circumstances, such as where a significant structural dip (e.g., greater than three degrees) is determined.

Exemplary Embodiment

Figure 4:
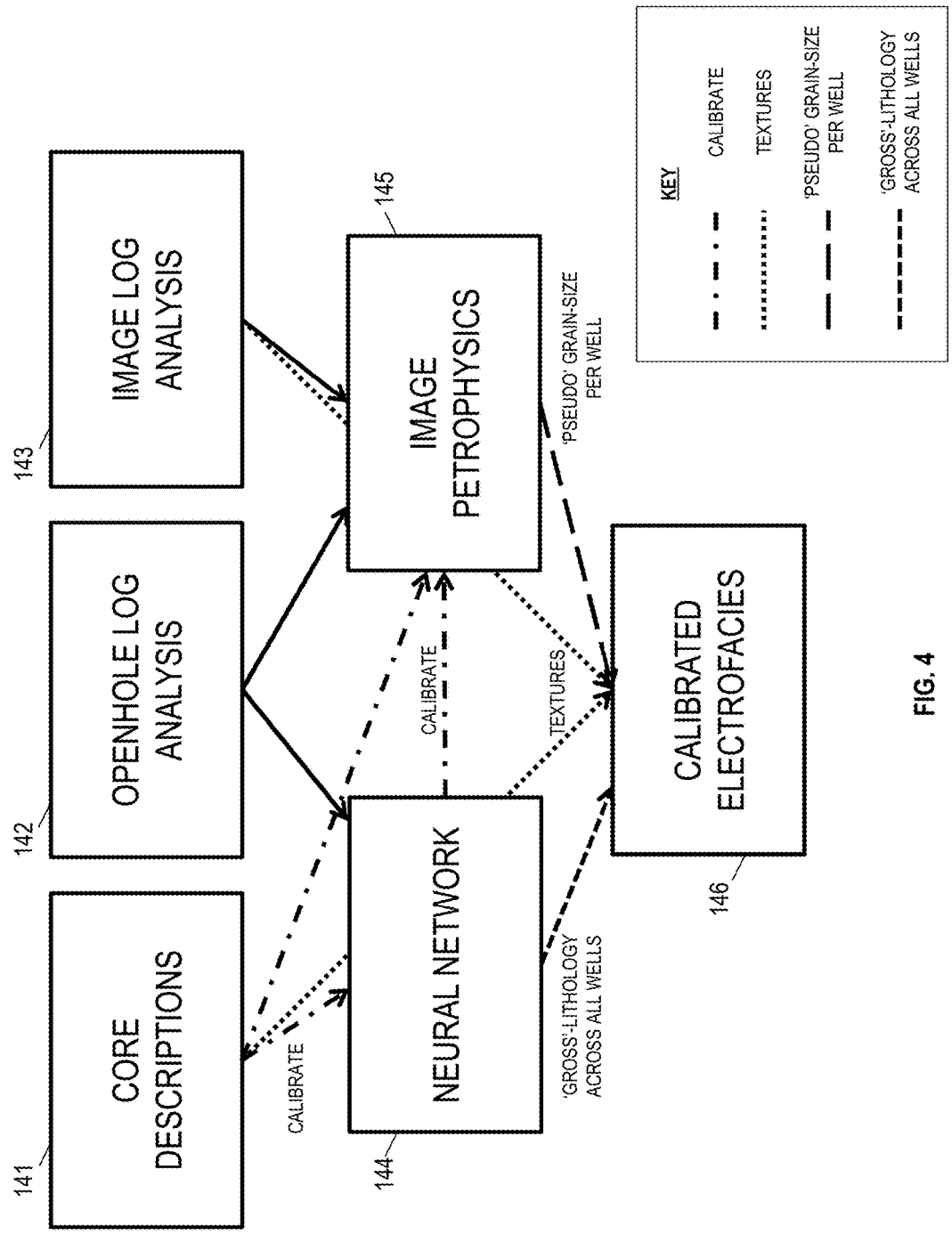
FIG. 4 is a schematic method diagram according to an embodiment of the invention.
Figure 5:
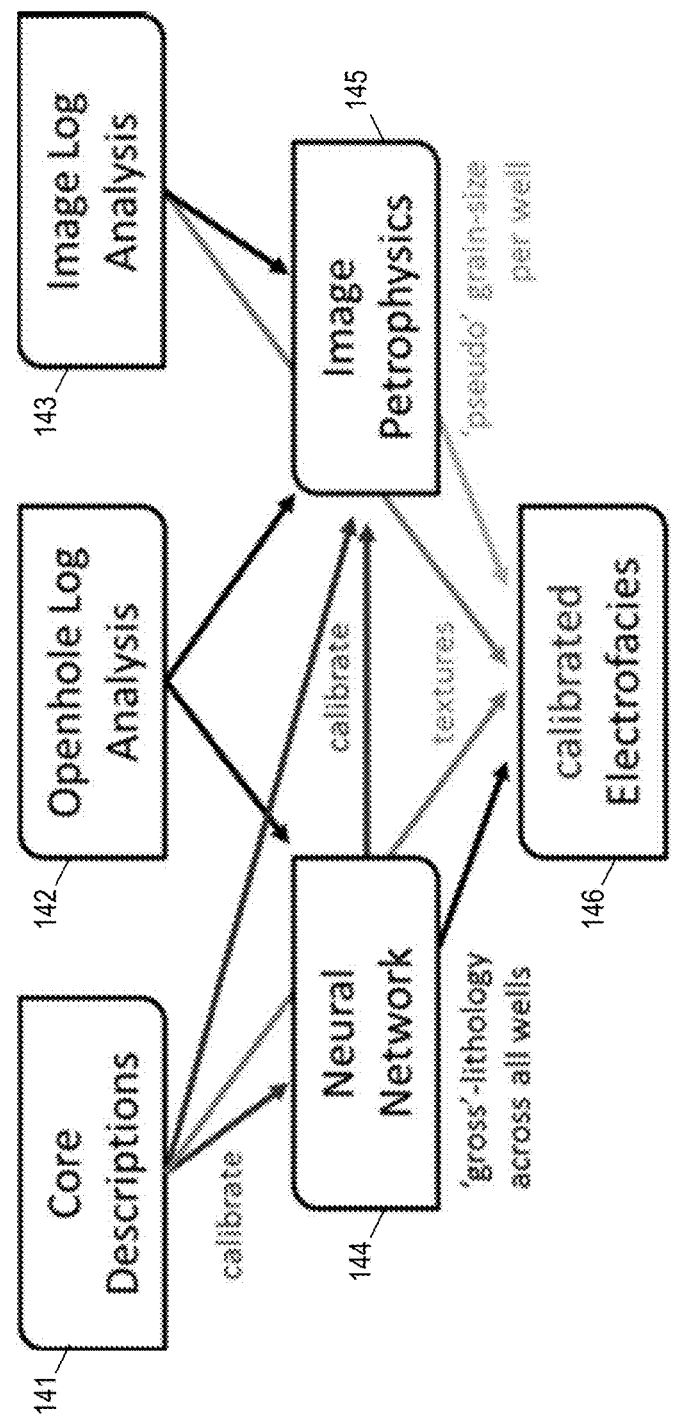
FIG. 5 is a schematic method diagram according to an embodiment of the invention.
Figure 21:
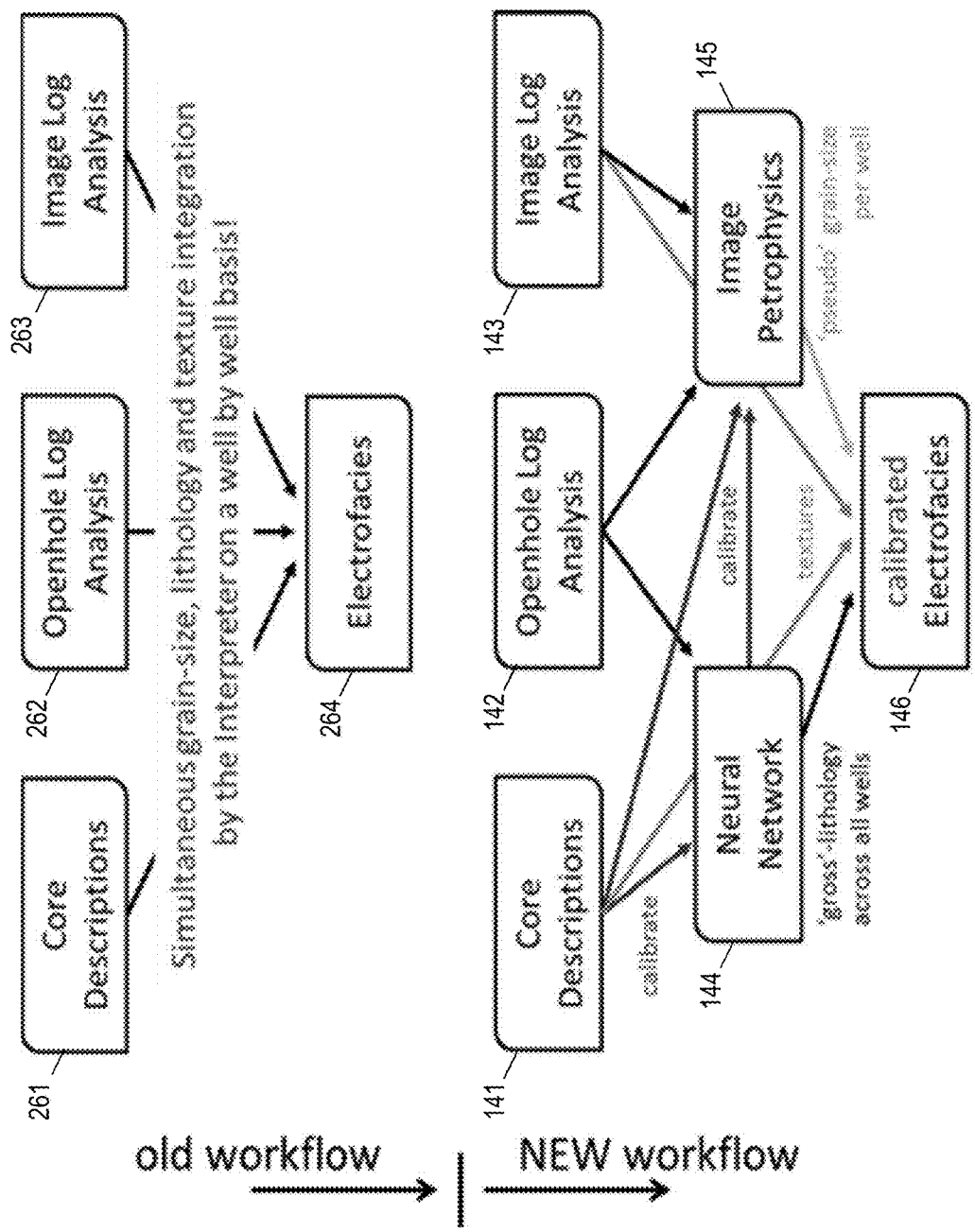
FIG. 21 is schematic method diagrams according to the prior art and to an embodiment of the invention.

To further illustrate an embodiment, an experimental case is described. Initially, four wells were selected for the deployment of the workflow in a case study (GLTSD project 2013-43) detailed below. The workflow was subsequently applied to two additional wells, which were added after the interpretation of the four initial wells. Core, openhole, and borehole image log (BHI) data were loaded to an interpretation software and passed through a comprehensive data quality control, reprocessing, and depth-matching procedure to assure high data quality for the following, manual image log based dip analysis coupled with neural network mapping and image-based petrophysics. An example of the workflow is illustrated, for example, in FIG. 4 and FIG. 5. That is, an exemplary new workflow for efficient, consistent, and high confidence advanced image-based electrofacies analysis in stratigraphic interpretations across multiple wells is depicted in FIG. 4, for instance. Alternatively, as shown in FIG. 5 and FIG. 21, for example, the dash dot, square dot, long dash, and dash lines can be depicted as solid lines each having a different color. For example, the dash dot lines, which can represent calibration in FIG. 4, can be depicted as solid red lines, as in FIG. 5 and FIG. 21. Similarly, the square dot lines, which can represent textures in FIG. 4, can be depicted as solid black lines in FIG. 5 and FIG. 21, for example. In addition, the long dash line, which can represent "pseudo" grain-size per well in FIG. 4, for example, can be depicted as a solid blue line in FIG. 5 and FIG. 21. Likewise, the dash line, which can represent "gross"-lithology across all wells in FIG. 4, can be depicted as solid black lines in FIG. 5 and FIG. 21, for example.

In this example, image log analysis 143 was performed, as depicted in FIG. 4 and FIG. 5, for example. The BHI features were identified and manually classified (e.g., bedding or cross-bedding) based on dip magnitudes, orientation trends, and BHI character by an experienced image interpreter. The mean structural dip was determined from stratified units that were assumed to be deposited palaeo-horizontally, i.e., mudstone, heterolithic and/or siltstone bedding surfaces. The original sedimentary dips were restored where a significant structural dip (>3°) was determined.

A neural network 144 then analyzed data. An unsupervised (fuzzy) neural network mapping procedure was selected to calibrate openhole log-based rock classes with core grain-size data. Through reiterative learning processes, it was established that five rock classes could be consistently identified using variably weighted input curves. These variably weighted neural network input curves are depicted, for example, in FIG. 6(c). A self-organizing neural network map, for example, is illustrated in FIG. 6(a). The self-organizing map, which visualizes the clustering of the openhole log curves in a down-sampled but representative set of nodes, was interactively edited to further enhance the log-to-core correlation, as illustrated by red circles within FIG. 6(a) and FIG. 6(b), for example. An interactive edit on a well correlation panel is illustrated in FIG. 6(b), for example. This "trained," core-calibrated neural network was subsequently successfully applied to two additional wells, which were added after the interpretation of the four initial wells. The self-organizing map, as illustrated, includes different types of nodes. The illustrated nodes, for example, include neural network nodes of a medium grained sand class 301, neural network nodes of a fine grained sand class 305, and neural network nodes of a very fine grained sand class 303. The illustrated nodes further include neural network nodes of a silt class 306, which indicate a strong bulk density and neutron porosity response, and neural network nodes of a silt class 309, which indicate a strong bulk density and a medium neutron porosity response. A red square around one of the nodes can indicate a cursor resting position, for example. The illustrated nodes also include neural network nodes of a shale class 307. Each node can further include a radar spectrum (or "rose diagram") showing the proportion of the well log response associated with the node. For example, radar spectrum 302 shows the proportion of the well log response associated with a neural network node of a medium grained sand class 301. Similarly, radar spectrum 304 shows the proportion of the well log response associated with a neural network node of a very fine grained sand class 303. A node selection area can be highlighted to focus viewers' attention by use of, for example, a circle 308, which can be interactively selected. The nodes depicted with a radar spectrum against a white background in FIG. 6(a) have been interactively selected to be displayed in a correlation panel. A correlation panel can include correlation panels for one or more wells, for example, as illustrated in FIG. 6(b). For instance, the illustrated correlation panel includes Well 1 correlation panel 311, Well 2 correlation panel 312, Well 3 correlation panel 313, Well 4 correlation panel 314, Well 5 correlation panel 315, and Well 6 correlation panel 316. Further, a correlation panel can include a depiction of a set of intervals 318 with well log responses and a very fine sand class from the core description that correspond to interactively selected class nodes (i.e., very fine sand) from the neural network map using several calibration points for a core-to-log correlation, for example. Similarly, a correlation panel can include a depiction of another set of intervals 319, for example, with well log responses and a very fine sand class from the core description that correspond to interactively selected class nodes (i.e., very fine sand) from the neural network map using fewer calibration points for a core-to-log correlation.

Image petrophysics 145 were then performed. The neural network mapping of the core and openhole relationship was followed by the zonation, fluid phase compensation, and core calibration of the image data. The BHI flattening option was selected where applicable. Openhole logs, i.e., induction or lateral logs, porosity logs, and petrophysical calculations (e.g., Sxo and Sw), were then used to identify zones of fluid phase changes that affected the BHI resistivity, as illustrated, for example, in FIG. 7(a). That is, an image-based petrophysics analysis plot to determine fluid phase changes is illustrated, for example, in FIG. 7(a). An image-based petrophysics analysis plot can include a well correlation panel that includes openhole log data measurements 320, neural network rock types 321, static image measurements (with high resistivity in a light color) and image threshold rock types 322, core description data 323, and image facies and tadpoles 324. More specifically, openhole log data measurements 320 can include gamma ray (GR) measurements 325 and density (DENS), neutron porosity (NEUT), and photoelectric effect (Pe) measurements 326. Further, openhole log data measurements 320 can include spectral gamma ray measurements 327 (such as Uranium (U), Thorium (TH), and Potassium (K)) and water saturation measurements (with fluid change highlighted in red) 328. Openhole log data measurements 320 can still further include induction log resistivity measurements at medium depth of investigation (ILM), induction log resistivity measurements at deep depth of investigation (ILD), and micro-spherically focused log resistivity (MSFL) measurements 329. Likewise, neural network rock types 321 can include neural network-based lithotypes, such as sand (coarse, medium, and fine), silt, and shale classes, and class probability 330. Additionally, static image measurements (with high resistivity in a light color) and image threshold rock types 322 can include image petrophysics-based "pseudo" grain-size classes 331, such as sand (coarse, medium, and fine), silt, and shale (or clay) classes. Further, image facies and tadpoles 324 can include image facies (or electrofacies) 332. The column on the far right in FIG. 7(a), for example, represents image facies and tadpoles. Tadpoles can be an industry standard or common name for indictors of dip magnitude and dip azimuth of a planar feature identified from a borehole image on a log plot. The magnitude or steepness of the feature can be represented by a tadpole body, a small colored circle, plotted on a display, which typically reads left to right from 0° (flat-lying) to 90° (vertical). The dip azimuth can be shown by a short tick that radiates from the center of the tadpole body towards the direction of the dip azimuth. These can typically be plotted on a 360° scale radiating around the tadpole body with 0° (or North) at the top, 90° (or East) on the right, 180° (or South) to the bottom and 270° (or West) to the left. The combination of the circular body and short tail have been likened to the appearance of a tadpole (young frog), for example.

The BHI data were then zoned, and the resistivity spectrum was compensated for the fluid phase changes. The effect of this compensation is best illustrated by considering an interval where sandstone classes were identified by the neural network mapping. In these intervals, if for reference the sandstones are assumed to be "water-wet," then the fluid compensation transforms all sandstones classes to appear more conductive than mudstone classes. Assuming no significant variations in density (i.e., "cementation"), increases in BHI resistivity in these fluid-compensated sandstone classes could be inferred to correlate with an increase in clay content. The fluid-compensated BHI histogram can then be divided into "pseudo"-grain-size classes, as illustrated in FIG. 7(b), FIG. 7(c), and FIG. 7(d), for example, and correlated with core grain-size classes in an interactive thresholding process, simultaneously across all BHI zones. Binned BHI resistivity histograms, for example, are illustrated in FIG. 7(b), FIG. 7(c), and FIG. 7(d). Intervals with core data were used to set histogram class cut-offs, and the neural network results guided the overall sandstone mapping.

Manual image texture interpretation was then performed. Once the match between core, neural network map, and image-based petrophysics was established, the obtained rock classes were modified in terms of their geological significance through integrating the image log analysis results. The integration of geological textures identified from the BHI and core with the "constrained gross facies scheme" created a high resolution electrofacies 146 (e.g., cross-bedded argillaceous sandstone). The methodology still relies heavily on the experience of the BHI interpreter to correctly identify image textures and orientation trends, but it removes the need to simultaneously determine the "lithotype" from openhole logs. Removing this element accelerated the manual interpretation process, allowed the interpreter to focus on his or her key objective—feature and fabric identification—and increased the overall "lithotype" consistency.

As a result of this example case, the neural network and image-based petrophysics BHI analysis separated five facies associations ("classes"): mudstone [M], siltstone [MS], argillaceous ("muddy") sandstone [SM], sandstone ("clean") [S] and heterolithics [H]. The image texture interpretation produced a total of 24 individual electrofacies (e.g., cross-bedded, pebbly sandstone [Sxp]) types. The resulting electrofacies were further used to identify depositional environments and sediment dispersal directions within the stratigraphic reservoir model of the Unayzah in Saudi Arabia.

Experiments Related to Embodiments

In light of the identified problems and sources of problems in the prior art, experiments were performed. For example, GLTSD's Technology Application-1: Rapid Reservoir Quality Assessment (Borehole Image Based) project goal was to assess whether the manual methodology could be replaced by an automatic or semi-automatic workflow. Six clastic reference wells with core, openhole, and high quality image log data were selected and manually interpreted. The same data was independently used for image-based rock typing (facies) using software driven image-based petrophysics applications: the image data was calibrated, zoned, and compensated for fluid phase changes prior to binning into image-based petrophysics facies using various thresholding techniques.

Comparison of the results showed that the semi-automatic processes could not reliably match either the manual image or core-based interpretations without considerable manipulation. Fluid (oil and water) contact zones were particularly difficult to resolve, requiring many reiterations, whereas an experienced interpreter could compensate for the ambiguity faster and more reliably. Analysis of geological fabrics and textures, especially non-planar image fabrics like cross-bedding, bio- or pedo-turbation, could not be reliably reproduced using automated processes. Tests with neural network applications in 2012 suggested, however, that pre-binning of the facies, rock types, and units, based upon the openhole log's response and image resistivity, can effectively provide a faster and more repeatable standard gross lithological unit. (A gross lithological unit can include a generic or general subsurface material type within an individual interval or footage, for example.) It was therefore suggested that the most effective methodology for rapid, high resolution reservoir characterization is an image-based petrophysical interpretation followed by facies interpretation of the image texture/fabric by an experienced BHI interpreter.

The workflow of combining neural networks and image-based petrophysics with the manual image texture interpretation was refined in a GLTSD's project 2013-42, a multi-well study. The refined workflow was finally applied in GLTSD's project 2013-43, in another multi-well study in 2013.

Figure 9:
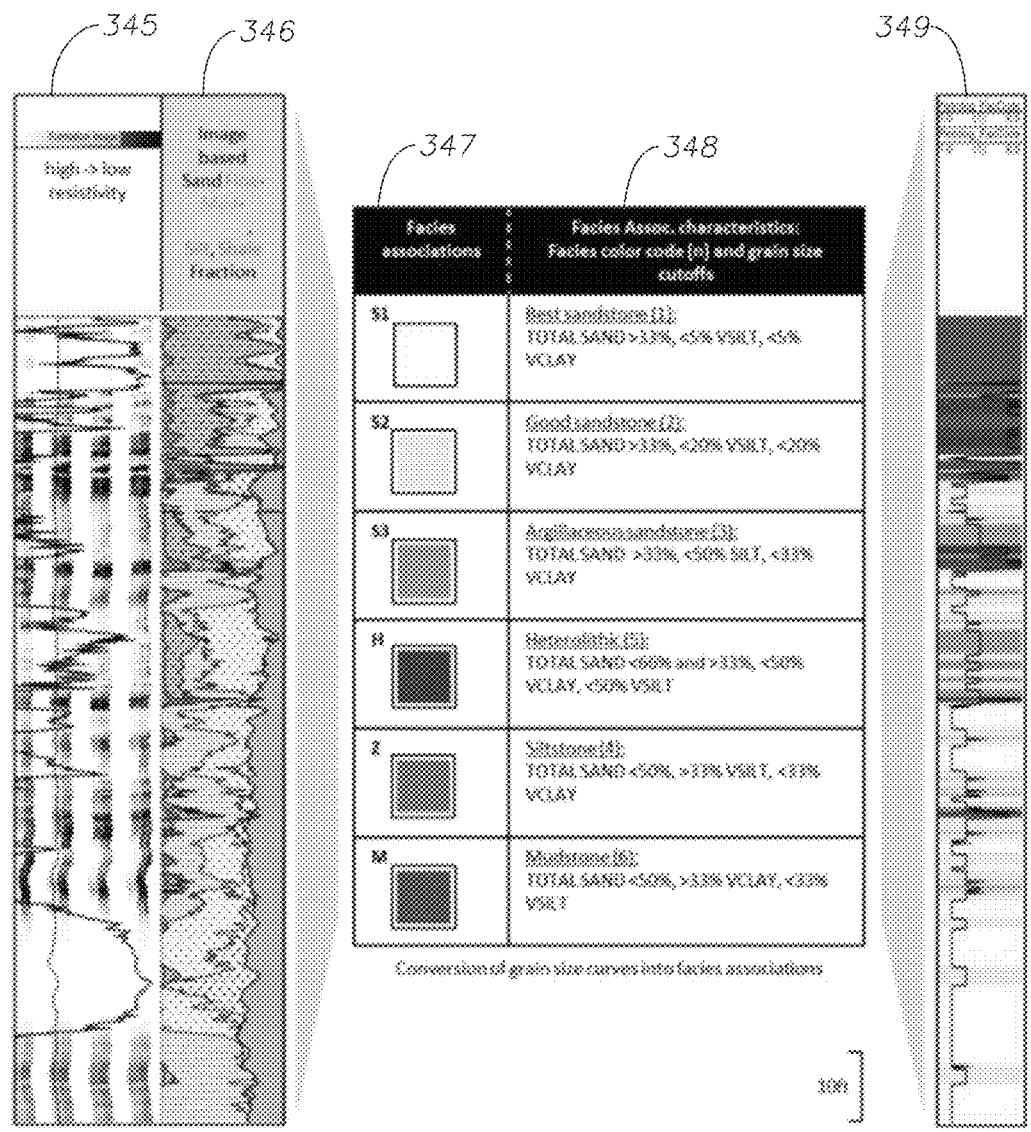
FIG. 9 is a schematic diagram of semi-automatic electrofacies association generation according to an embodiment of the invention.

The project assessed if the manual borehole electrofacies interpretation can be replaced by an automatic or semi-automatic borehole electrofacies interpretation to reduce the time required for image log facies interpretations in multi-well studies. Six reference wells with core, openhole, and high quality image log data were selected and manually interpreted. The same data was then used for image-based rock typing in specialized image-based petrophysics software. Several calibration steps were required (e.g., SW compensation) to convert the data into a format that was suitable to apply image resistivity thresholding and data binning techniques. The binning process was a reiterative process until a compatible scheme to the manual electrofacies scheme was developed (FIG. 9). Semi-automatic electrofacies association generation is illustrated, for example, in FIG. 9. As depicted, semi-automatically generated facies associations 349 can result from formation image data 345 (with high resistivity readings to the left in a lighter color); image-based fractional measurements of sand (fine, medium, and coarse), silt, and shale 346; facies associations 347; and facies association characteristics, facies color codes, and grain size cutoffs 348. The results of this semi-automatic image-based petrophysics facies scheme were then compared with the manual facies interpretation.

Figure 10:
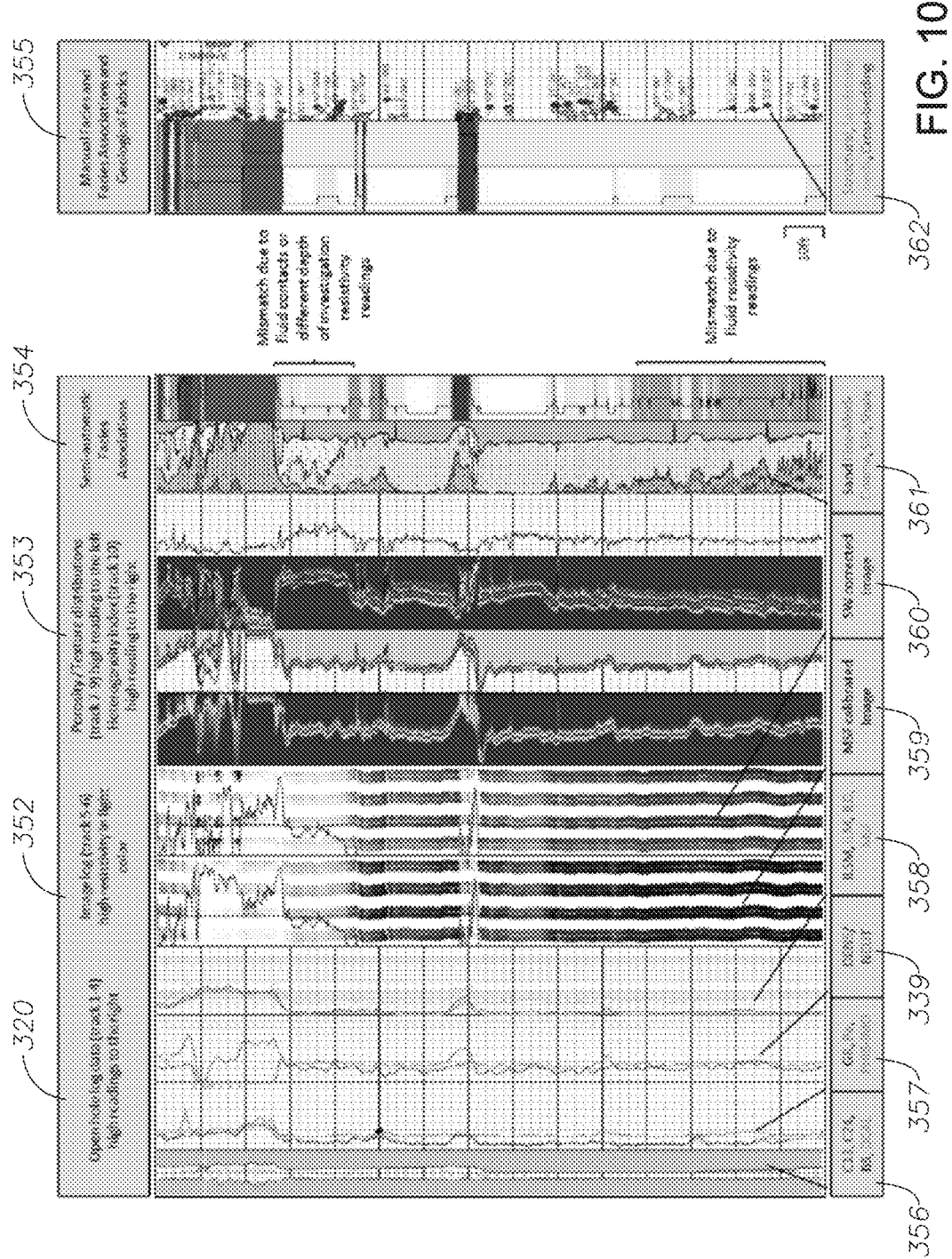
FIG. 10 is a schematic diagram of a comparison of image-based petrophysics analysis plots according to an embodiment of the invention.

Although the data was calibrated and fluid saturation compensated for, it was not possible to match the manual interpretation. A comparison of semi-automatic and manual electrofacies interpretation is illustrated, for example, in FIG. 10. As depicted, openhole log data measurements 320, image log measurements (with high resistivity in a light color) 352, porosity/texture distributions (with high readings to the left) and a heterogeneity index (with high readings to the right) 353, and the corresponding semi-automatic facies associations 354 can be plotted alongside representations of manual facies, facies associations, and geological fabrics 355. More specifically, plotted openhole log data measurements 320 can include: indications of the caliper from arm 1 and 3 (C13), caliper from arm 2 and 4 (C24), bit size (BS), and differential caliper (DCAL) 356; indications of gamma ray (GR), photoelectric effect (Pe), and image-derived porosity (PHIS-IMG) 357; density and neutron measurements, e.g., bulk density and neutron porosity (NEUT) 339; and indications of induction log resistivity at shallow-to-medium depth of investigation (ILSM), induction log resistivity at medium depth of investigation (ILM), induction log resistivity at deep depth of investigation (ILD), and micro-spherically focused log resistivity (MSF) 358. Further, image log measurements (with high resistivity in a light color) 352 can include MSF calibrated image log data 359. Image log measurements (with high resistivity in a light color) 352 can also include SW compensated (hydrocarbon effect removed) image log data 360. Semi-automatic facies associations 354 can include image petrophysics-based "pseudo" grain-size classes, such as sand (fine, medium, and coarse), silt, and shale (or clay) classes 361. Conversely, representations of manual facies, facies associations, and geological fabrics 355 can include indications of structural, sandstone beds, and cross-bedding conditions 362. Fluid (oil and water) contact zones were especially difficult to correct for in the image-based petrophysical analysis (FIG. 10). These are areas where an experienced interpreter compensates the image and openhole log readings and can create a more reliable, manual electrofacies interpretation. The project has also shown, so far, that it is not possible to reduce the time spent for the analysis of geological fabrics and textures. Non-planar image fabrics like cross-bedded sandstones or dispersed patchy conductive (porous) carbonate intervals are especially difficult to consistently identify. Well stratified intervals of sand/silt or sand/shale with good image contrasts (light and dark image coloring) are suitable for automatic dip analysis.

Different acquisition companies can have slightly different logging tools (differences in the number or arrangement of the sensors) but can all have same basic set-up in that a series of sensors (or "buttons") can simultaneously record the micro-resistivity (or inverse conductivity) of a formation around the surface of a borehole wall. Minor differences in subsurface material type, layering, fabric, grain-size, fluid content, or mineralogy of the formation can lead to very slight differences in recorded values, both along the borehole by a single button and also around the borehole between different sensors. Further, these differences in resistivity can reflect the heterogeneity of the formation and can be one reason for using techniques related to image contrasts, i.e., light and dark image coloring. Typically, resistivity data can be scaled on a logarithmic scale, and the maximum and minimum range can be given colorations based upon an industry standard "brown" color template. In a brown color template, high resistivity can be light yellow (or white) in color, and low resistivity (conductivity) can be dark brown or black. Values between these maximum and minimum values can typically be assigned colors with increasing intensity from white through yellow through orange to brown to black. However, it can be impossible to visually distinguish these infinitesimally small changes in coloration based upon absolute recorded values, so typically—for visual purposes—the entire data range can be "binned" into a number of classes, usually 64, 128, or 256. The classes can then be colored white through yellow through orange to brown to black, while the underlying data can still retain absolute values.

Figure 11:
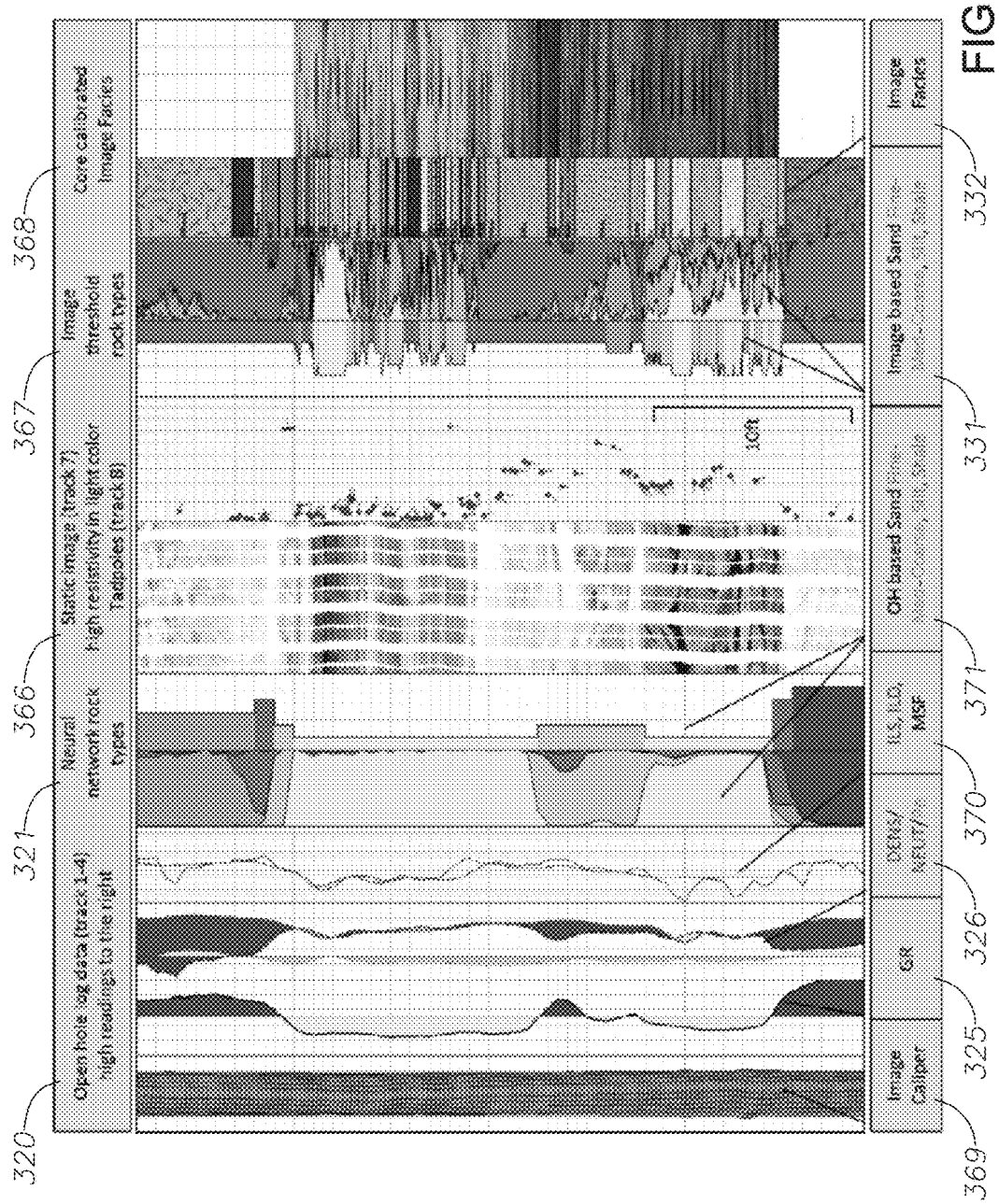
FIG. 11 is a schematic diagram of an image-based petrophysics analysis plot according to an embodiment of the invention.

The manual electrofacies interpretation using openhole log, image log, and core is a workflow that works in clastic environments. Its advantages can include allowing the interpreter to correct image irregularities, such as breakouts and fluid influence on the borehole image, and incorporating field knowledge. It is a slow process that heavily relies on the interpreters' experience. Recent tests with neural network applications suggest, however, that pre-binning of facies, rock types, and units, based upon the openhole log's response and image resistivity, can effectively provide a faster and more repeatable standard gross lithological unit (FIG. 11). Openhole neural network based rock typing combined with image-based threshold rock typing for electrofacies interpretations is illustrated, for example, in FIG. 11. As depicted, openhole log data measurements 320 and neural network rock types 321 are plotted alongside static image measurements (with resistivity in a light color) and tadpoles 366, image threshold rock types 367, and core-calibrated image facies 368. The depicted openhole log data measurements 320 include image caliper measurements 369; gamma ray (GR) measurements 325; density (DENS), neutron porosity (NEUT), and photoelectric effect (Pe) measurements 326; and indications of induction log resistivity at shallow depth of investigation (ILS), induction log resistivity at deep depth of investigation (ILD), and microspherically focused log resistivity (MSF) 370. The depicted neural network rock types data 321 includes neural network-based lithotypes, such as sand (fine, medium, and coarse), silt, and shale classes, and class probability 371. The depicted image threshold rock types 367 include image petrophysics-based "pseudo" grain-size classes 331. The depicted core-calibrated image facies 368 include image facies (or electrofacies) 332.

Embodiments can provide numerous advantageous features. For example, the neural network mapping can significantly improve the consistency of the "gross facies scheme" through the simultaneous calibration of the openhole with core data interactively across all wells. Subsequent use of image-based petrophysical analysis techniques within this "constrained gross scheme" can also provide robust high resolution electrofacies at each well. Utilization of these steps prior to interpreting the images can allow an interpreter to concentrate more effectively on the identification of image fabrics and texture rather than fabric plus "lithotype." This new approach of combining the best of the image-based petrophysics with the manual image texture interpretation in a unified workflow can provide an efficient, consistent, and high confidence advanced image-based electrofacies analysis for stratigraphic interpretations across multiple wells. Embodiments can provide stratigraphic interpretations that integrate confidential (internal) core descriptions, petrophysical interpretations, and image log interpretations.

A gross facies scheme can be an overall scheme that provides a broad framework for a preliminary segregation of individual facies within appropriate ranges for their grain-size estimate (i.e., approximated grain size), log responses, and depositional environment. Further, a gross facies scheme can allow, for instance, aeolian muds, silts, and sands to be segregated from fluvial types without defining them in any detail as a particular mud, silt, or sand type, for example. A constrained gross facies scheme (or constrained gross scheme), furthermore, can be similar to the overall scheme but can have some interpretative input to control how individual facies are identified. As a result, a constrained gross facies scheme can be more consistent than a typical gross facies scheme. Rather than an open-ended gross facies scheme, the range of individual facies and the tolerance allowed for their overlap can be controlled or "constrained" by interpretation procedures. Additionally, image-based petrophysics can indicate that borehole image data is used as a primary dataset in conjunction with other wireline and core datasets to produce high-resolution petrophysical evaluations.

Further, embodiments can advantageously provide increased efficiency and consistency of high resolution electrofacies reservoir characterizations in clastic successions. For example, embodiments can provide up to a twenty-five percent (25%) time saving for electrofacies interpretations, per well, within multi-well studies. Further, embodiments can provide grain-size distribution projection from cored to un-cored intervals. Embodiments can also advantageously use core and image log data more effectively for high resolution reservoir characterizations and operational support.

Figure 8:
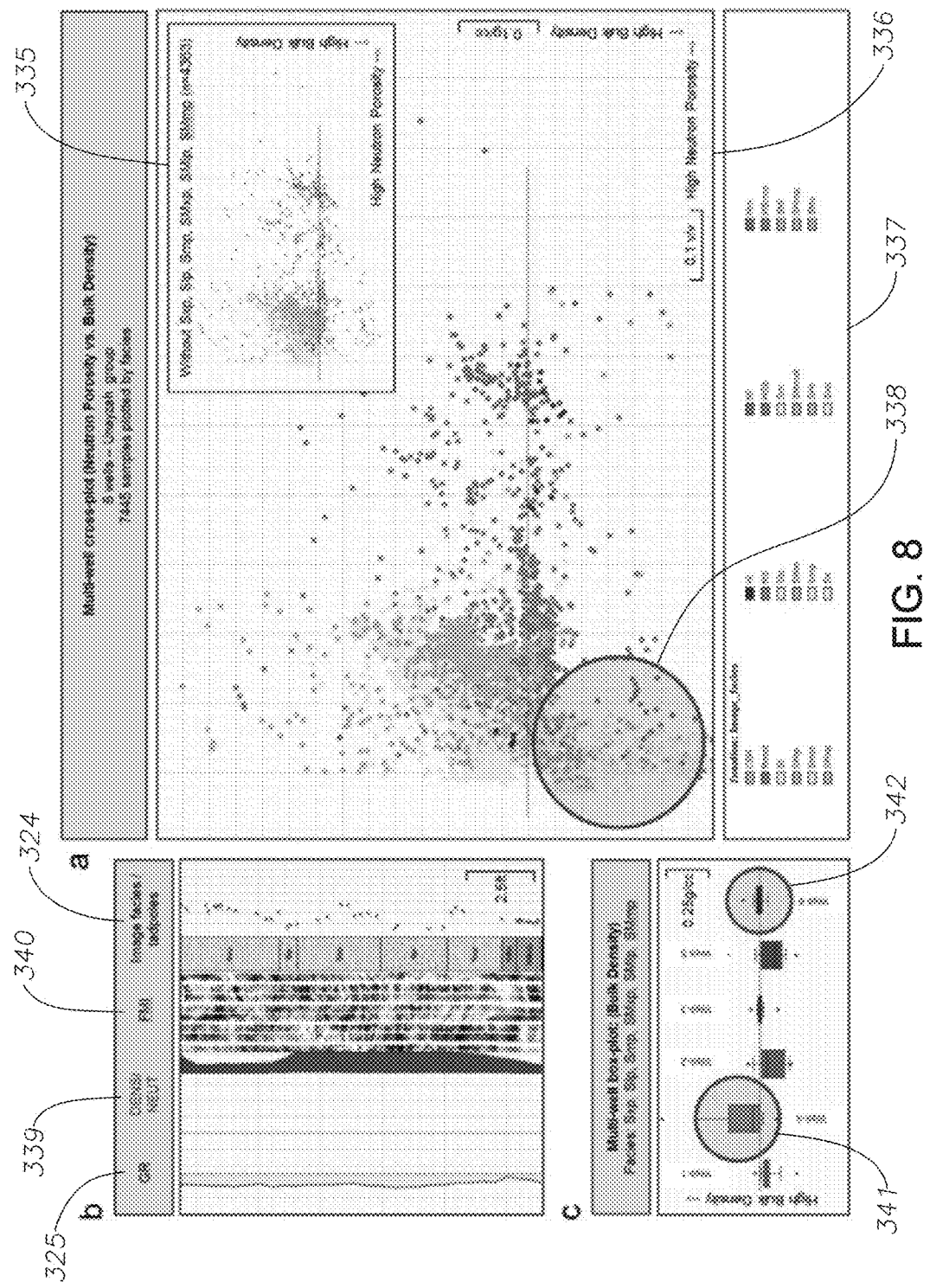
FIG. 8(a) is a schematic diagram of a multi-well density-neutron cross-plot by electrofacies according to an embodiment of the invention.
FIG. 8(b) is a schematic diagram of texture and openhole log responses of pebbly facies according to an embodiment of the invention.
FIG. 8(c) is a schematic diagram of a multi-well bulk density box-plot for sandstone facies according to an embodiment of the invention.

Additionally, the application of this high resolution, image-texture based facies scheme can help to clarify some previously poorly understood log responses, for example, through identifying and separating a pebbly sandstone facies from "other" sandstone facies in density-neutron cross-plots and box-plots (FIG. 8). For example, a multi-well density-neutron cross-plot by electrofacies, with and without pebbly facies, for instance, is illustrated in FIG. 8(a). A multi-well density-neutron cross-plot by electrofacies can include a multi-well density-neutron cross plot without pebbly facies 335 and a multi-well density-neutron cross plot with pebbly facies 336. A multi-well density-neutron cross plot with pebbly facies 336 can also include an indication of image facies or electrofacies determined in a study 338, where lithotypes are differentiated by color. A multi-well density-neutron cross-plot by electrofacies can also include an image facies key for multi-well density-neutron cross plots 337. Density-neutron cross plots, beside other cross plots, can help to differentiate sandstones from siltstone and shales and can be one of the earliest cross plots. Moreover, density-neutron cross plots can be used in log analysis for determination of porosity and lithology from neutron porosity and bulk density. In addition, typical image texture and openhole log responses of pebbly facies, for example, are illustrated in FIG. 8(b). As depicted, the image texture and openhole log responses of pebbly facies include gamma ray measurements 325, density and neutron measurements 339, formation micro imager (FMI) measurements 340, and indications of image facies and tadpoles 324. Further, a multi-well bulk density box-plot for lower Unayzah sandstone facies is illustrated in FIG. 8(c), for example. The multi-well bulk density box-plot highlights a high bulk density response in Well 4, as indicated by circle 341, and an elevated density response in Well 6, as indicated by circle 342.

Figure 16:
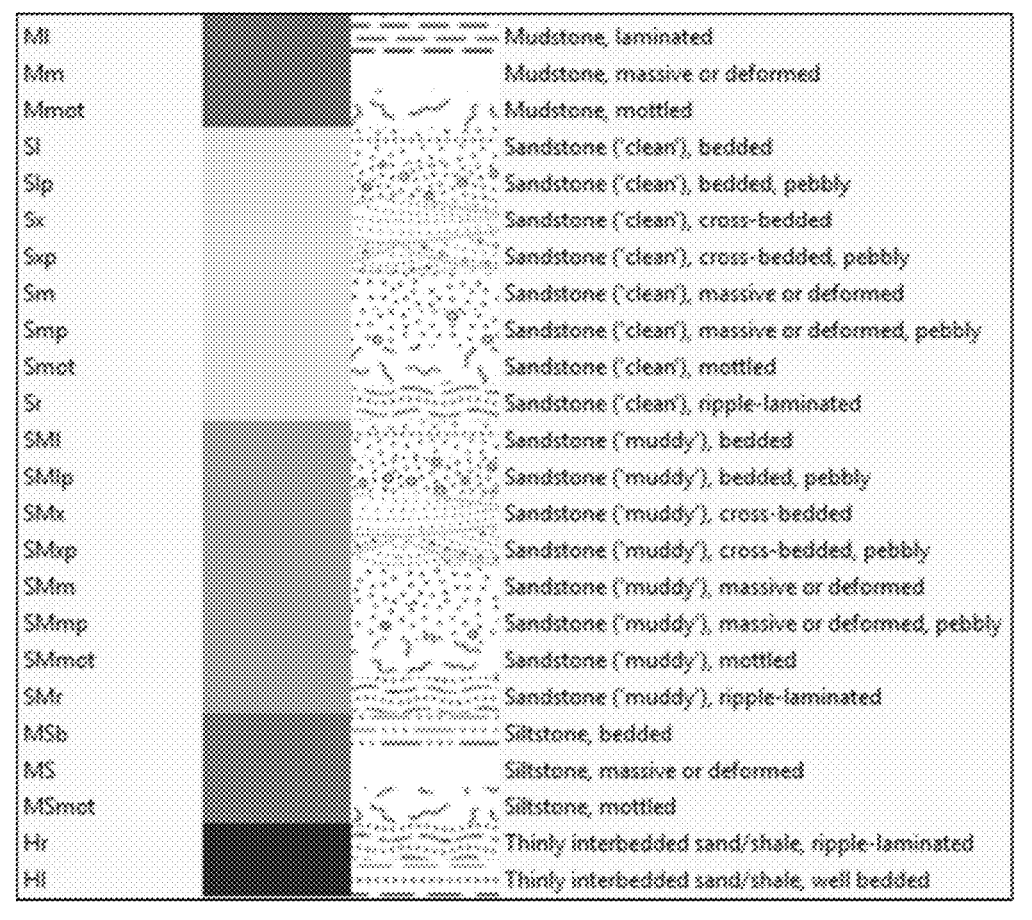

Features of embodiments can have significant advantages when compared to the prior art. For example, Samantray may use the "old" manual image interpretation technique with core integration. Neural networks (FIG. 6(a)) and image-based petrophysics (FIG. 7) may not have been available to create a "gross facies scheme" (FIG. 1c(i)) before starting the manual texture interpretation (FIG. 1c(i) and FIG. 16) on a well-by-well basis. For example, an electrofacies scheme used in two projects is depicted in FIG. 16. Typically, during the "old" manual interpretation (FIG. 1d), when multiple wells and reservoir intervals are involved, spurious variations in reservoirs rock properties from similar facies may be generated due to the introduction of minor inconsistencies in "lithotype" classes by the manual interpreter. Electrofacies (old workflow) used for depositional environment and sediment dispersal analysis in Oman by MacPherson et al., (2005) in Samantray, is depicted in FIG. 1d, for example. Newberry et al., (2004) may extract texture information (e.g., conglomerate) directly from the BHI data by analyzing the resistivity spectrum (e.g., FIG. 7(b)-(d)) variation. It may integrate the open log analysis afterwards. A neural network-based "gross facies scheme" (FIG. 6(a)) therefore may not be established before a high resolution electrofacies (FIG. 9) is generated. As before, when multiple wells and reservoir intervals are involved, spurious variations in reservoirs' rock properties from similar facies may be generated due to the introduction of minor inconsistencies in "lithotype" classes. SandSpect (Techlog) is based on the paper from Newberry et al., (2004) and may therefore have the same weaknesses when multiple wells and reservoir intervals are involved. A comparison of the old and new workflows is depicted in FIG. 21, for example. Grain size cutoffs, as depicted in FIG. 9, for example, can represent the sorting of the relative distribution of the computed grain-sizes (i.e, VSILT, VCLAY and TOTAL SAND (sum of fine, medium and coarse)) as shown in their ratios in the table (e.g., S2=TOTAL SAND>33%, <20% SILT, <20% VCLAY).

Figure 12:
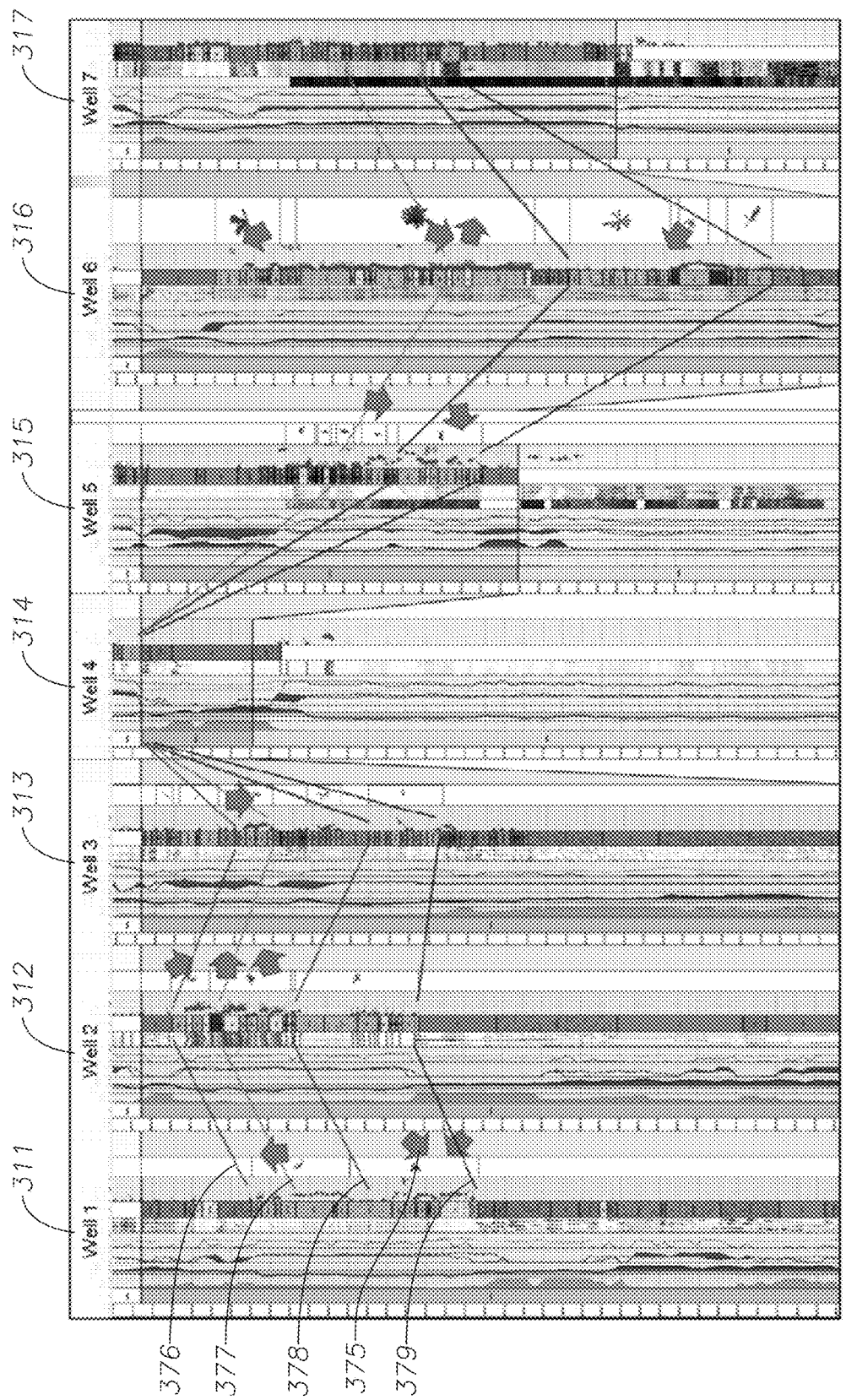
FIG. 12 is a schematic diagram of stratigraphic interpretation and sediment dispersal plots according to an embodiment of the invention.
Figure 13:
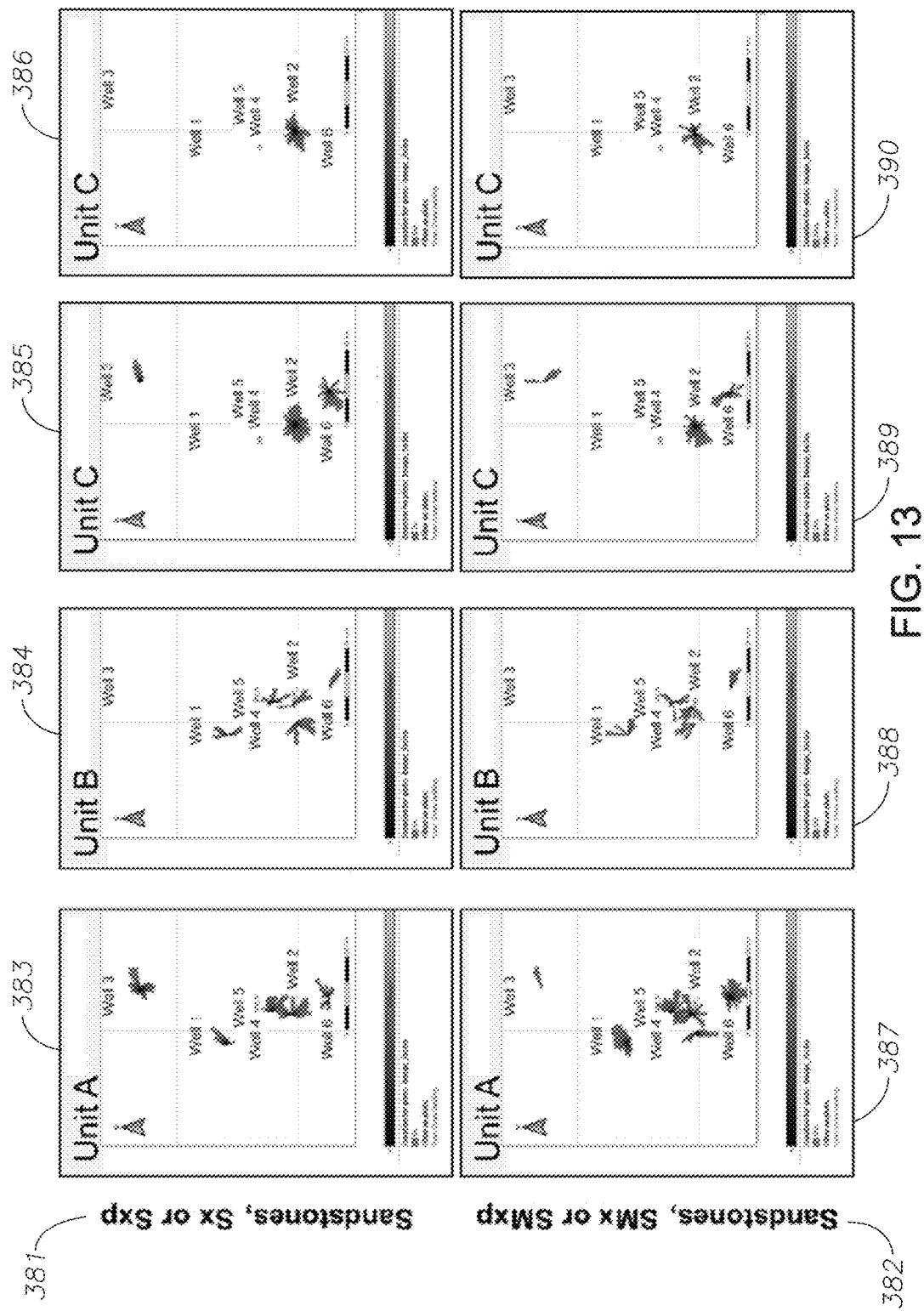
FIG. 13 is a schematic diagram of sediment transport trend plots by sedimentary units according to an embodiment of the invention.
Figure 14:
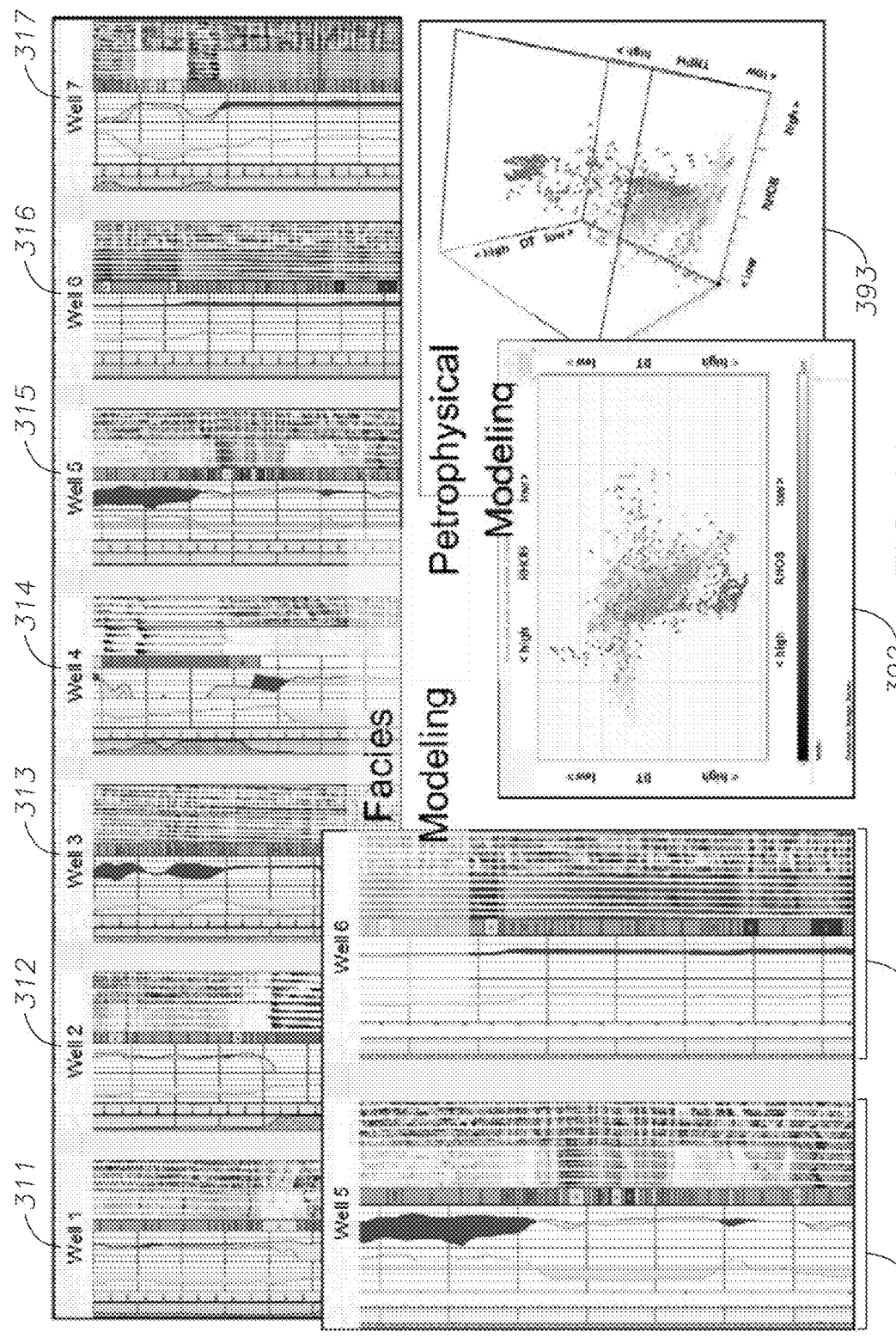
FIG. 14 is a schematic diagram of transfer of two-dimensional electrofacies into a three-dimensional modeling environment according to an embodiment of the invention.

Further, the "Newberry" workflow may rely heavily on the VShale curve, and internal tests with applications following a similar, semi-automated workflow have shown (FIG. 10) that the outcome may be strongly dependent on a good VShale (quantitative volume of shale) curve and the right Sw or Sxo curve for fluid phase compensations. Core calibration (FIG. 6 and FIG. 7) is of subordinate importance in the suggested process. The use of neural network mapping (FIG. 6) can significantly improve the consistency of the "gross facies scheme" through the simultaneous calibration of the openhole logs with core interactively across all wells. Subsequent use of image-based petrophysical analysis techniques (FIG. 7) within this "constrained gross scheme" can provide robust high resolution electrofacies at each well (FIG. 12, FIG. 17, FIG. 18, FIG. 19, and FIG. 20). This approach of combining the best of the image-based petrophysics with the manual image textural analysis in a unified workflow can provide an efficient, consistent, and high confidence advanced image-based facies analysis for stratigraphic interpretations across multiple wells. This calibrated high resolution electrofacies can be an essential element for stratigraphic interpretations (FIG. 12 and FIG. 13), 3D reservoir models, and rock physics models (FIG. 14). This new workflow was used for stratigraphic interpretations and sediment dispersal analysis of individual sandstone units (blue arrows indicating interpreted sediment dispersal direction), as illustrated, for example, in FIG. 12. The depicted stratigraphic interpretations and sediment dispersal analysis includes Well 1 correlation panel 311, Well 2 correlation panel 312, Well 3 correlation panel 313, Well 4 correlation panel 314, Well 5 correlation panel 315, Well 6 correlation panel 316, and Well 7 correlation panel 317. The depicted stratigraphic interpretations and sediment dispersal analysis further includes representations of interpreted sediment dispersal direction across multiple well correlation panels 375. For example, line 376 illustrates the correlation of a marker bed across Wells 1, 2, and 3. Similarly, line 377, line 378, and line 379 illustrate the correlation of marker beds across Wells 1, 2, 3, 5, 6, and 7. As further illustrated in FIG. 13, for example, GLTSD electrofacies study 2013-43 (new workflow) was used for stratigraphic sediment dispersal analysis. The depicted stratigraphic sediment dispersal analysis includes plots related to Sx or Sxp sandstones 381 and plots related to SMx or SMxp sandstones 382. The plots related to Sx or Sxp sandstones 381 include a stratigraphic sediment dispersal analysis for facies Sx for Unit A 383, a stratigraphic sediment dispersal analysis for facies Sx for Unit B 384, a stratigraphic sediment dispersal analysis for facies Sx for Unit C 385, and a stratigraphic sediment dispersal analysis for facies Sxp for Unit C 386. The plots related to SMx or SMxp sandstones 382 include a stratigraphic sediment dispersal analysis for facies SMx for Unit A 387, a stratigraphic sediment dispersal analysis for facies SMx for Unit B 388, a stratigraphic sediment dispersal analysis for facies SMx for Unit C 389, and a stratigraphic sediment dispersal analysis for facies SMxp for Unit C 390. The application of high resolution electrofacies allowed separation of sediment transport trends by sedimentary units (e.g., electrofacies Sx represents dunes whereas SMx represents interdunes). In addition, as illustrated in FIG. 14, for example, GLTSD Technology Application-1 project established the transfer of 2D based electrofacies (from GLTSD project 2013-42) into the 3D modeling environment. For example, electrofacies can typically be interpreted in a two-dimensional-based software environment (wellbore-focused) and stored in a digital format, with its top in measured depth, as will be understood by those skilled in the art, and its electrofacies code (e.g., SMx), to generate a two-dimensional petrophysical modeling plot 392. These tops and electrofacies codes can subsequently be exported as a file (e.g., ASCII) and loaded into a three-dimensional software environment. In the three-dimensional software environment, the electrofacies can be correlated with variable references (TVDT, TVT) and modeled, e.g., through vertical and horizontal variogram analysis (3D modeling), for instance, to produce a three-dimensional petrophysical modeling plot 393.

Figure 17:
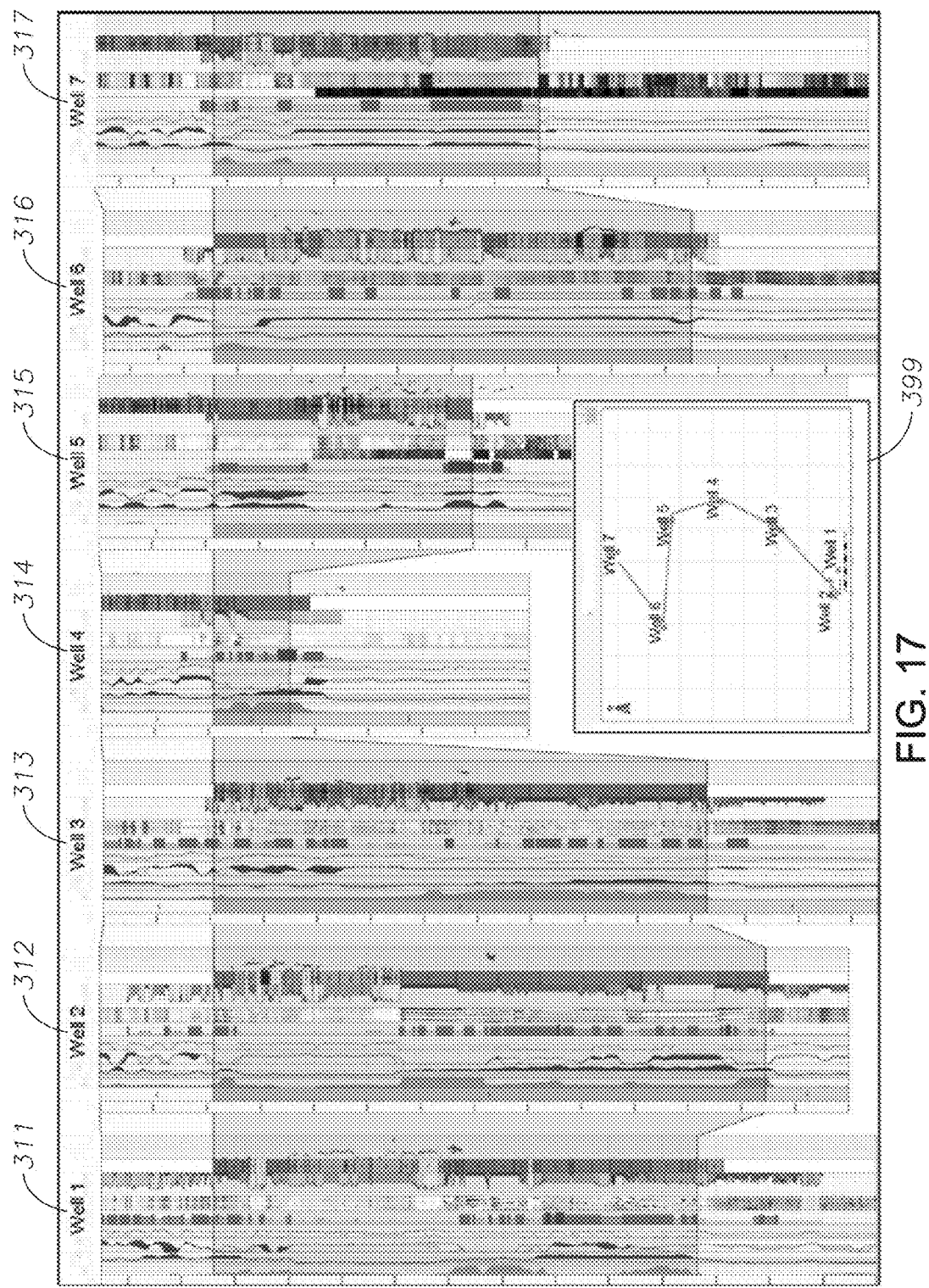
FIG. 17 is a schematic diagram of multi-well image-based petrophysics analysis plots according to an embodiment of the invention.
Figure 18:
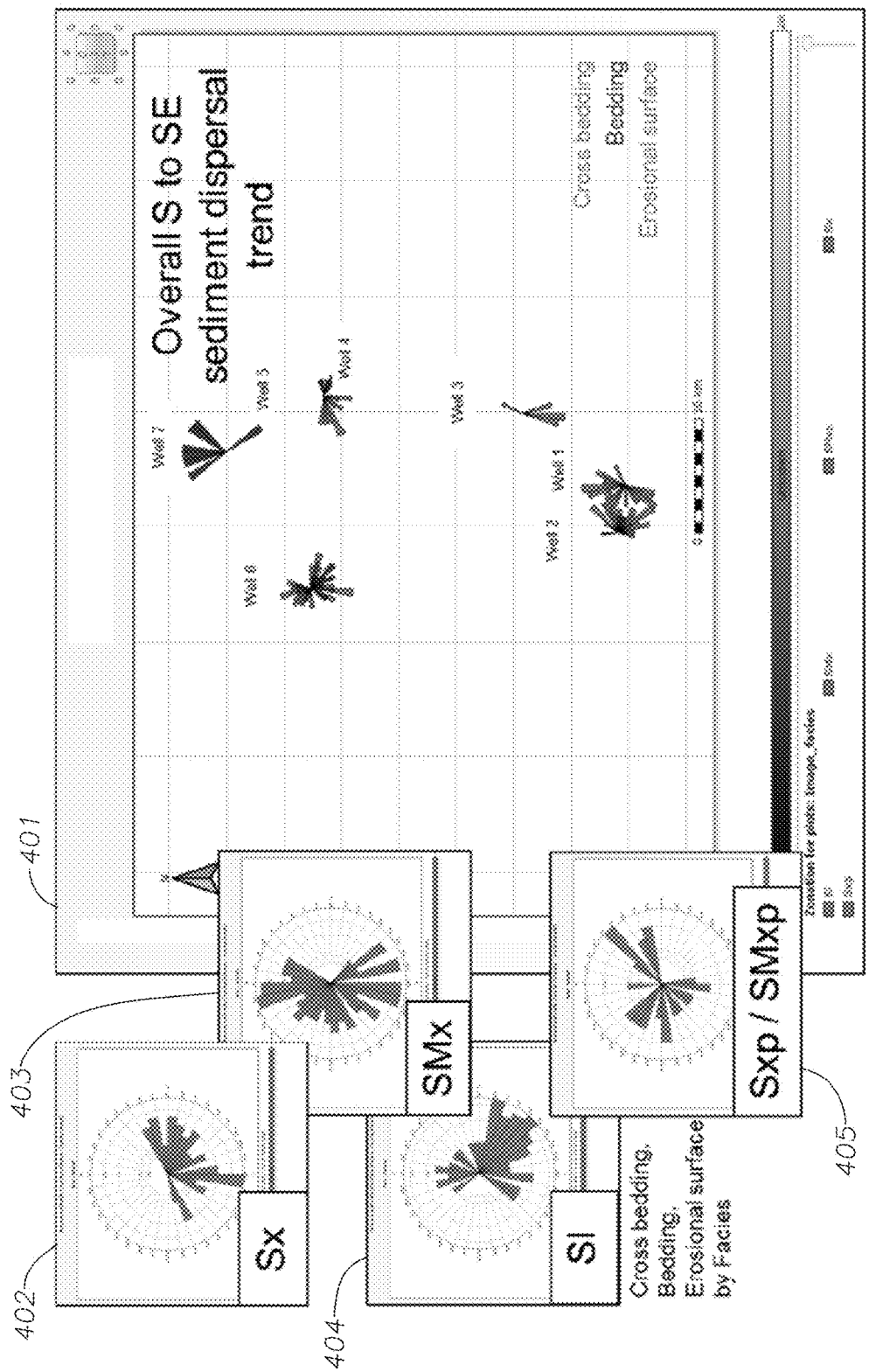
FIG. 18 is a schematic diagram of sediment transport trend plots according to an embodiment of the invention.
Figure 19:
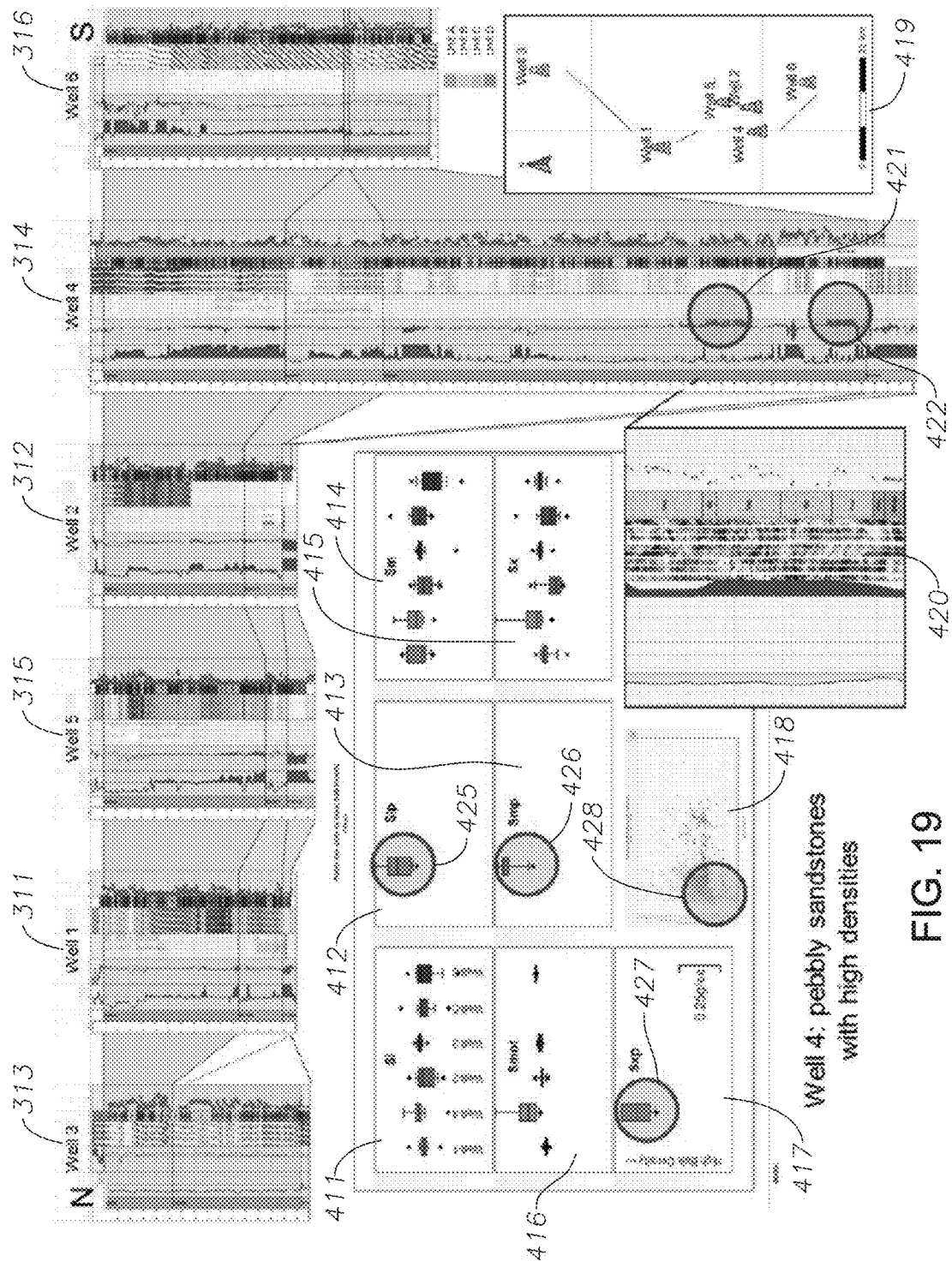
FIG. 19 is a schematic diagram of multi-well image-based petrophysics analysis plots, density box-plots, and density-neutron cross-plots according to an embodiment of the invention.
Figure 20:
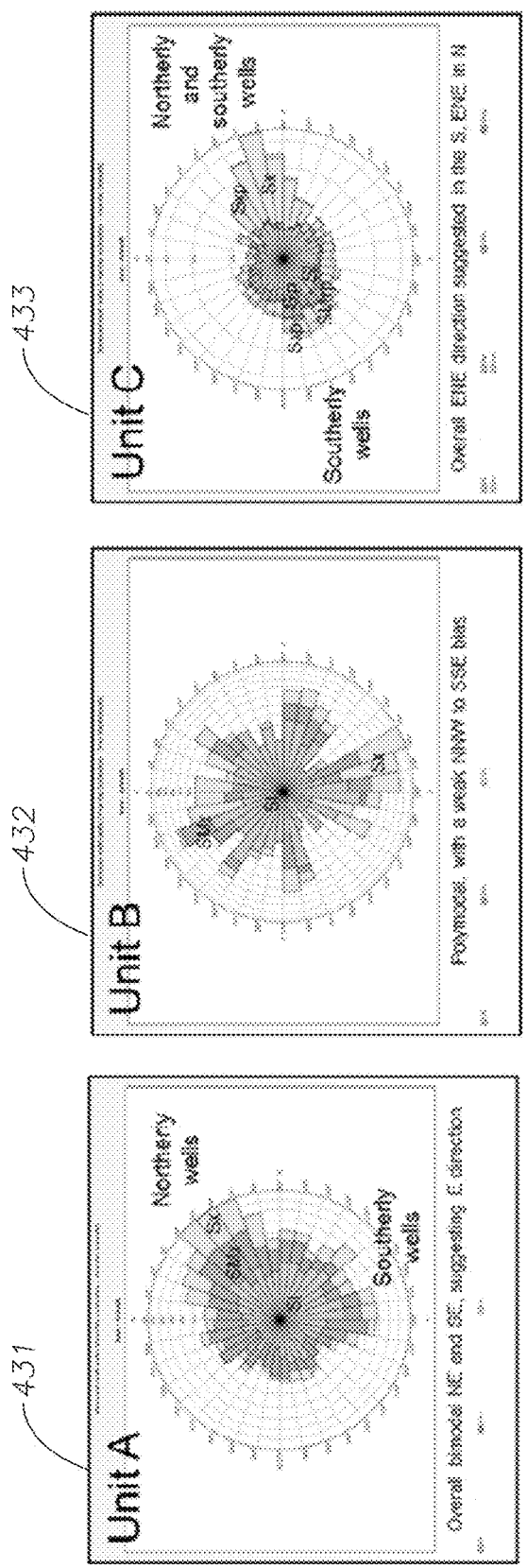
FIG. 20 is a schematic diagram of sediment transport trend plots according to an embodiment of the invention.

The high resolution electrofacies can be further used to establish a rock physics facies model. A rock physics facies model can associate a "cluster" in acoustic p-wave (Vp) and bulk density log cross plots with a geological electrofacies (e.g., SMx) because rock physic properties (e.g., acoustic p-wave (Vp) and bulk density variations) can be linked with various geological parameters, including sorting (grain size), cement volume, clay content, lithofacies, and compaction. Several rock physics models (e.g., for grain contacts) can exist for these correlations. Combining neural network analysis and image-based petrophysics with manual texture interpretation to build electrofacies for a sediment dispersal analysis of fluvial channels (GLTSD study 2013-42) is illustrated, for example, in FIG. 17. As depicted in FIG. 17, for example, a map view of a cross-section 399—i.e., a map of the physical locations of Wells 1-7—is illustrated in the center of the figure, and the aqua-colored portions of the figure represent the reservoir interval analyzed in a given study. Application of high resolution electrofacies allowed to separate sediment transport trends by genetic units (GLTSD study 2013-42) is depicted in FIG. 18, for example. In addition to an overall sediment transport trend plot 401, an Sx sediment transport trend plot 402, an SMx sediment transport trend plot 403, an S1 sediment transport trend plot 404, and an Sxp/SMxp sediment transport trend plot 405 are depicted in FIG. 18. As illustrated in FIG. 19, for example, the application of a high resolution electrofacies in GLTSD Study 2013-43 helped clarify some previously poorly understood log responses through identifying and separating a pebbly sandstone facies from "other" sandstone facies in density box-plots and density-neutron cross-plot (see FIG. 8 for more details to the density-neutron cross-plot and image texture). For instance, an S1 density box plot 411, an Slp density box plot 412, an Smp density box plot 413, an Sm density box plot 414, an Sx density box plot 415, an Smot density box plot 416, an Sxp density box plot 417, and a density-neutron cross plot 418 are depicted. Further, a map of the physical location of wells 419 is depicted along with an FMI image log 420 and well correlation plots (i.e., Well 1 correlation panel 311, Well 2 correlation panel 312, Well 3 correlation panel 313, Well 4 correlation panel 314, Well 5 correlation panel 315, and Well 6 correlation panel 316). The Well 4 correlation plot 314, as depicted, also includes indications of high bulk density response represented by circle 421 and circle 422. Similarly, circle 425 indicates a high bulk density response for image facies Slp in Well 4 on the Slp density box plot 412. Circle 426 indicates a high bulk density response for image facies Smp in Well 4 on the Smp density box plot 413, and circle 427 indicates a high bulk density response for image facies Sxp in Well 4 on the Sxp density box plot 417. Further, circle 428 indicates image facies with high bulk density response in density-neutron cross plot 418. The application of a high resolution electrofacies in GLTSD Study 2013-43 allowed separation of sediment transport trends by genetic units and reservoirs, as illustrated in FIG. 20, for example, including a representation of sediment transport trends by genetic Unit A 431, a representation of sediment transport trends by genetic Unit B 432, and a representation of sediment transport trends by genetic Unit C 433. Sedimentary units and/or genetic units can include groups or packages of facies or facies associations that are related by a shared or common sediment dispersal direction.

A VShale curve can represent the quantitative volume of shale in a hydrocarbon formation and can be determined by, for example, a gamma ray (GR) curve. For instance, naturally occurring gamma ray radioactivity of subsurface material can be measured. Because different subsurface materials can be associated with different gamma ray intensity levels, a gamma ray detector can measure gamma ray radiation from subsurface material. Gamma ray measurements can then be used to distinguish shale versus non-shale and can be used to quantify a volume fraction of shale. For instance, shale can be associated with high GR values, whereas non-shale can often be associated with low GR values. Further, partly shaly formations can have GR values somewhere in between shale and non-shale. Moreover, volume fraction of shale can be proportional to gamma ray measurements. As a result, gamma ray measurements can often be a good and reliable indicator of shale.

Embodiments of Computer-Implemented Methods

A computer-implemented method to enhance borehole image analysis, according to an embodiment, can include comparing a plurality of different openhole log data sets 111 to a plurality of different core data sets 112, for example. Each of the plurality of different openhole log data sets 111 can be associated with one or more of a plurality of hydrocarbon wells. The plurality of hydrocarbon wells can be associated with a hydrocarbon reservoir. Further, each of the plurality of different core data 112 sets can also be associated with one or more of the plurality of hydrocarbon wells. Core data can include core grain size, for example. A method can also include performing iteratively an unsupervised neural network map, responsive to the plurality of different openhole log data sets 111 and the plurality of different core data sets 112. Performing iteratively an unsupervised neural network map can thereby identify one or more material types associated with the plurality of hydrocarbon wells, for example. A method can further include, for instance, generating a material-type scheme 120, responsive to the neural network map. The material-type scheme 120 can associate each of the identified one or more material types with a plurality of material characteristics, including one or more of the following: material resistivity value and material grain size. A method can also include distributing each of a plurality of borehole image readings of each of a plurality of different borehole image reading sets 113 into one of a plurality of resistivity classes, responsive to the material-type scheme 120. Each of the plurality of different borehole image reading sets 113 can include a plurality of borehole image readings and can further be associated with one or more of the plurality of hydrocarbon wells. Additionally, one or more of the plurality of different borehole image reading sets 113 can be associated with each of the plurality of hydrocarbon wells. Each of the plurality of resistivity classes can have one or more predetermined associated material resistivity values, for example. Distributing the borehole image readings can thereby associate each borehole image reading with an approximated material type 122. A method can also include calibrating each borehole image reading, responsive to the plurality of different core data sets 112 and the material-type scheme 120. Calibrating each borehole image reading can produce an approximated grain size 121 associated with each borehole image reading. A method can further include, for example, depicting—for each hydrocarbon well—the associated one or more borehole image reading sets 213 of the plurality of different borehole image reading sets 113, the approximated material type 122 for each borehole image reading of the associated one or more borehole image reading sets 213 of the plurality of different borehole image reading sets 113, and the approximated grain size 121 for each borehole image reading of the associated one or more borehole image reading sets 213 of the plurality of different borehole image reading sets 113. Depicting this data can thereby increase consistency in categorizing subsurface material associated with the plurality of hydrocarbon wells by material type. Further, depicting this data can enhance interpretation of subsurface material texture, fabric, and features to predict subsurface material composition of the hydrocarbon reservoir.

In some circumstances, one or more approximated grain sizes 121 each associated with a borehole image reading can have a core-equivalent resolution, for example. A method according to an embodiment can also include generating a high resolution electrofacies, responsive to the approximated material types, the approximated grain sizes, and user identification of one or more of the following: image texture data, image feature data, image fabric data, and image orientation data. Generating a high resolution electrofacies can thereby enhance characterization of subsurface material composition of the hydrocarbon reservoir. Further, borehole image readings can include, for example, high resolution micro-resistivity image log data, according to some embodiments, as will be understood by those skilled in the art. A method can also include performing data quality control on the plurality of different openhole log data sets 111, the plurality of different core data sets 112, and the plurality of different borehole image reading sets 113. Further, a method can include reprocessing the plurality of different openhole log data sets 111, the plurality of different core data sets 112, and the plurality of different borehole image reading sets 113. A method can also include depth matching the plurality of different openhole log data sets 111, the plurality of different core data sets 112, and the plurality of different borehole image reading sets 113. Performing data quality control, reprocessing, and depth matching can thereby enhance input data. In some circumstances, the plurality of borehole image readings of each of the plurality of different borehole image reading sets can be non-normalized. A method according to an embodiment can also include flattening each borehole image reading, before distributing each borehole image reading into one of a plurality of resistivity classes. A method can also include modifying one or more neural network nodes of the neural network map, responsive to variably-weighted input curves and user action. Modifying the one or more neural network nodes can thereby enhance identification of the one or more material types associated with the plurality of hydrocarbon wells. In some circumstances, one or more trained and core-calibrated neural network curves can be associated with the material-type scheme 120, and the neural network curves can thereby define a constrained gross facies scheme.

In some circumstances, for example, the plurality of hydrocarbon wells can be associated with a clastic environment; further, the one or more identified material types associated with the plurality of hydrocarbon wells can include one or more of the following: mudstone, siltstone, argillaceous sandstone, sandstone, and heterolithics. A method can also include identifying one or more zones of fluid phase change, responsive to the plurality of different openhole log data sets 111 and the plurality of different borehole image reading sets 113. A method can then include modifying the plurality of resistivity classes responsive to the identified one or more zones of fluid phase change, a plurality of measurements of water saturation associated with one or more of the plurality of hydrocarbon wells, the material-type scheme 120, the approximated material types 122, and the approximated grain sizes 121. Modifying the plurality of resistivity classes can thereby compensate for fluid phase changes associated with the identified one or more zones of fluid phase change. A method can also include, for example, matching the number of the plurality of resistivity classes with the number of the one or more identified material types associated with the plurality of hydrocarbon wells. A method according to an embodiment can also include, for example, determining one or more projected material types associated with each of one or more uncored intervals of one or more of the plurality of hydrocarbon wells, responsive to the approximated material type 122 associated with each of one or more of the plurality of borehole image readings. A method can further include determining one or more projected grain sizes associated with each of the one or more uncored intervals of the hydrocarbon reservoir associated with the plurality of hydrocarbon wells responsive to the approximated grain size 121 associated with each of one or more of the plurality of borehole image readings. Determining one or more projected material types and one or more projected grain sizes can thereby produce a high-resolution characterization of the hydrocarbon reservoir, for example.

More specifically, a step-by-step illustration of an exemplary method according to an embodiment is described below. A generic step-by step manual is chosen since more than one software application (e.g., Techlog, Petrolog, or Geolog) can be used for the workflow shown in FIG. 4 and FIG. 5, for example.

(1) Openhole logs (e.g., density, neutron, and gamma ray (GR)) can be selected and loaded together with the core data to the neural network application.

(2) The clustering of the openhole data can be analyzed using one or more neural networks (e.g., self-organizing map ISPOM from Techlog) and compared to the core data in a correlation panel.

Figure 6:
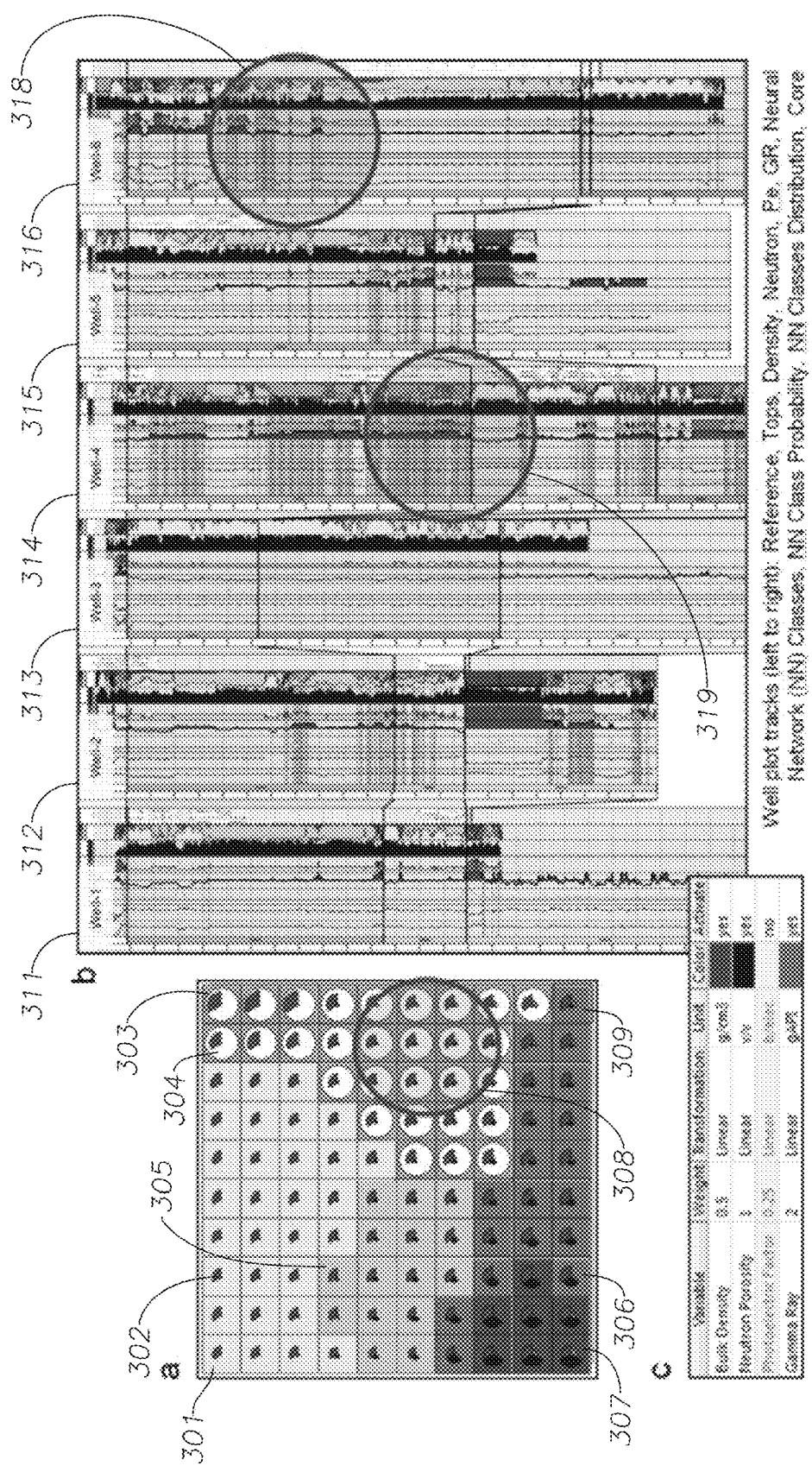
FIG. 6(a) is a schematic diagram of a self-organizing neural network map according to an embodiment of the invention.
FIG. 6(b) is a schematic diagram of a well-correction panel according to an embodiment of the invention.
FIG. 6(c) is a schematic diagram of neural network input curves according to an embodiment of the invention.

(3) Through a reiterative learning processes, a certain amount of rock classes can be consistently identified using variably weighted input curves and interactive editing of the neural network nodes to enhance the log-to-core correlation, as illustrated in FIG. 6, for example.

(4) Once one is satisfied with the results, the "trained," core-calibrated neural network (the "constrained gross facies scheme") curves can be transferred to the image-based petrophysics process.

(5) Non-normalized BHI data can then be flattened using a manual dip dataset from the image log analysis 143.

(6) Flattened BHI data, core descriptions 141, and petrophysical curves from the openhole log analysis 142 can then be loaded into the image-based petrophysical analysis module (e.g., Techlog Sand Counting or Petrolog Image Petrophysics).

(6a) The number of BHI resitivity classes can then be matched with that from the neural network analysis. For example, a match can be done visually by plotting them side-by-side along measured depth. By comparing them side-by-side, it can be easier to establish a correlation between the neural network results and the image-based petrophysical results.

(7) BHI readings can then be manually compared with laterlog or induction log readings. The laterlog or induction log can be used to indicate formation invasion (difference between shallow and deep resistivity). Further, an invasion of conductive mud in a hydrocarbon bearing sandstone can result in a conductive appearance of the sand.

Figure 7:
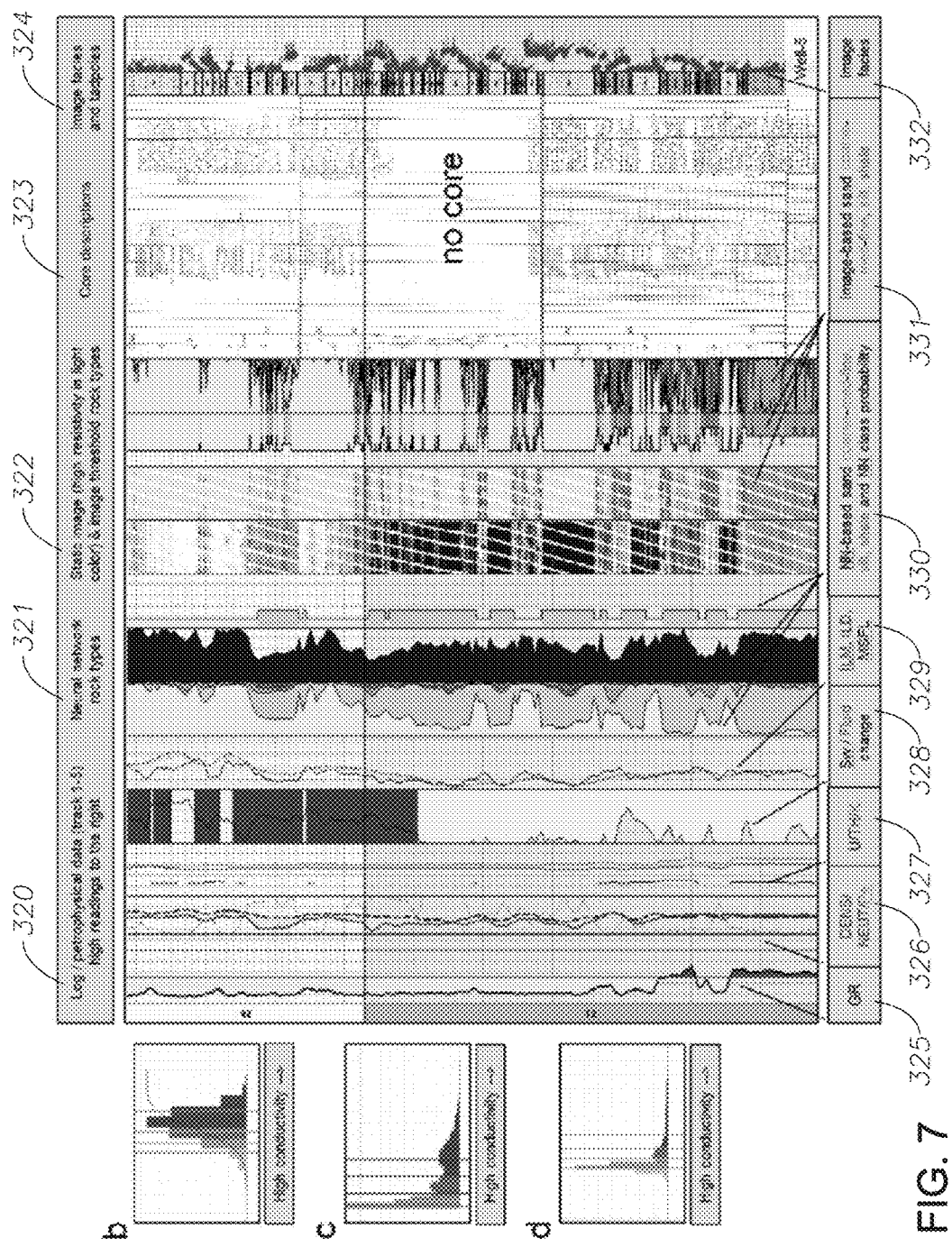
FIG. 7(a) is a schematic diagram of an image-based petrophysics analysis plot according to an embodiment of the invention.
FIG. 7(b) is a schematic diagram of a borehole image resistivity histogram according to an embodiment of the invention.
FIG. 7(c) is a schematic diagram of a borehole image resistivity histogram according to an embodiment of the invention.
FIG. 7(d) is a schematic diagram of a borehole image resistivity histogram according to an embodiment of the invention.

(7a) BHI color reversal can then be activated if necessary. The color reversal can be used to create a consistent resistivity histogram distribution along a well. For example, all sands can be made to appear conductive or "water wet," depending on the volume of shale in the sand. Essentially, the influence of hydrocarbon, or areas where sand appears more resistive than the shale, can thus be removed. All sands can be made to be light yellow colored and all shales can be dark green colored (as illustrated in FIG. 7, track 11, for instance). The correlation can be that as the sand becomes a lighter yellow, the sand grains become coarser, and fewer clay minerals are in the sand. Once this "standardization" or fluid compensation step is done, it can be easier to compare, visually, all sand distributions with each other and with the core for grain-size calibration. At a certain color, which corresponds to a bin in a resistivity histogram or histograms, if more than one zone exists, the core can indicate grain-size changes. These can be calibration points for the conversion of BHI resistivity bins into "pseudo" grain-sizes. Further, an anticipated correlation can be that the same color (resistivity bin) can indicate the same petrophysical response (e.g., GR) and the same core grain-size, for example.

(8) BHI readings can then be further compared with Sxo and Sw readings. For example, comparison can include a visual comparison followed by a manual zonation because automatic Sxo and Sw corrections to avoid manual zoning can be insufficient.

(8a) Data can then be zoned if localized reversal of the BHI readings occurs. For example, sands can change color, i.e., BHI resistivity values, over very short intervals (10 feet or less). It can be up to an interpreter to identify these reversals in "color" through a thorough comparison of BHI and petrophysical log values, e.g. GR, Sw, or else. Once a color reversal of a sand is identified from BHI data, a new zone can be created. In some circumstances, all sands need to be visually comparable to calibrate them with core grain-sizes.

(9) An interactive BHI resistivity histogram analysis can then be started.

(9a) Then, BHI readings can be compared against neural network rock types using neural network classes as overall guide ("framework").

(9b) BHI readings can be compared against core grain-size using core grain-size changes as calibration points for the "pseudo"-grain-size curve computation.

(9c) Steps 7 to 9b can then be reiterated until an acceptable match is found.

(9d) Once one is satisfied with the results, "pseudo"-grain-size curves can be transferred to the image texture interpretation module (e.g., Techlog WBI).

Figure 15:
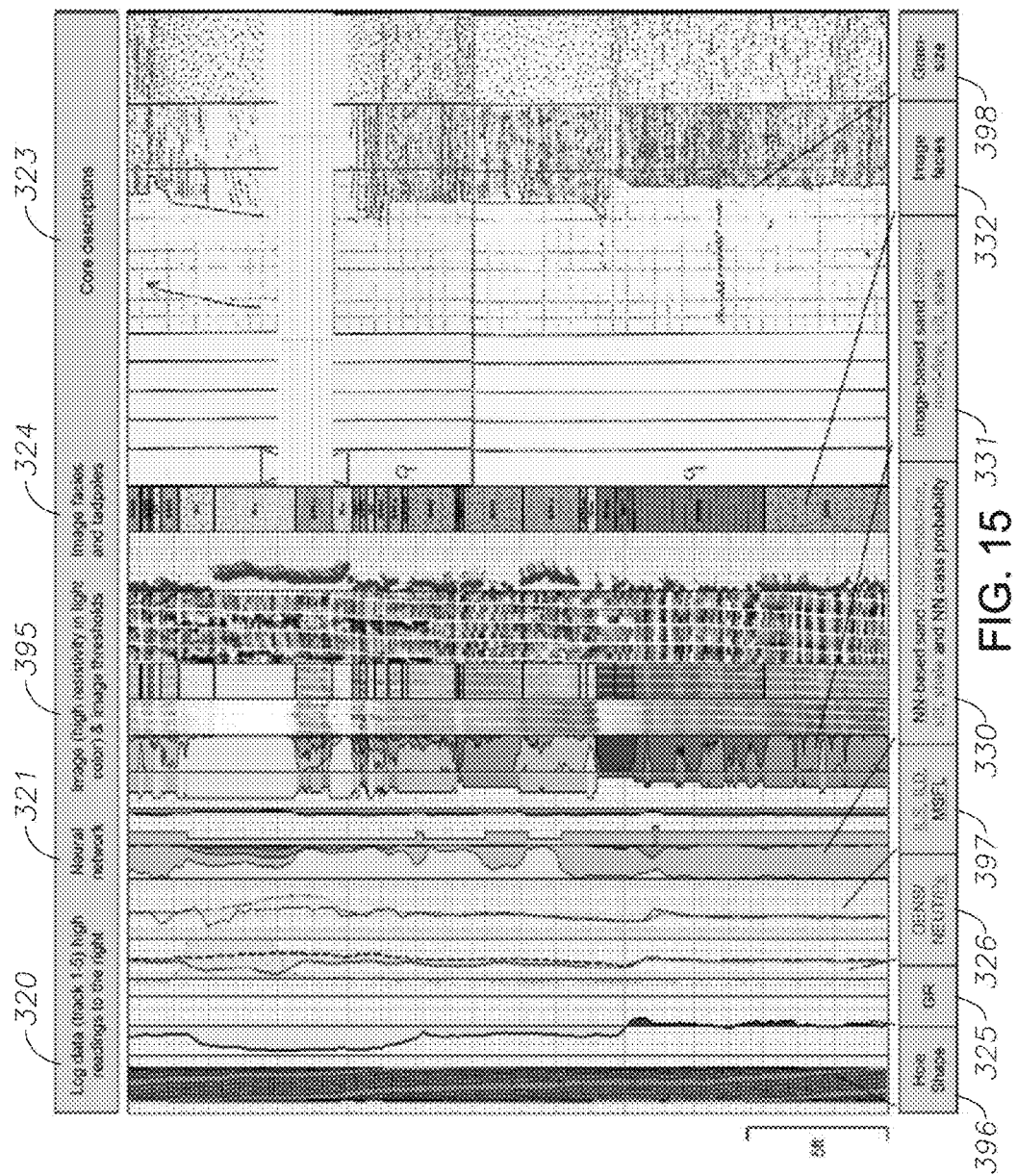
FIG. 15 is a schematic diagram of an image-based petrophysics analysis plot according to an embodiment of the invention.

(10) The image texture interpretation layout can be set up similarly to the layout shown in FIG. 15, for example. An example well from GLTSD electrofacies study 2013-43 (new workflow) shows the excellent match between electrofacies and core descriptions, as illustrated in FIG. 15, for example. The example well also highlights that the grain-size can be projected from cored to un-cored intervals. The depicted image texture interpretation layout includes openhole log data measurements 320, neural network rock types 321, image measurements (with high resistivity in a light color) and image thresholds 395, image facies and tadpoles 324, and core description data 323. Openhole log data measurements 320, as depicted, include hole shape measurements 396; gamma ray (GR) measurements 325; density (DENS), neutron porosity (NEUT), and photoelectric effect (Pe) measurements 326; and indications of induction log resistivity at shallow depth of investigation (ILS), induction log resistivity at deep depth of investigation (ILD), and microspherically focused log resistivity (MSFL) 397. As depicted, neural network rock types 321 include neural network-based lithotypes and class probability 330. Similarly, depicted image measurements (with high resistivity in a light color) and image thresholds 395 include image petrophysics-based "pseudo" grain-size classes 331. Further, image facies and tadpoles 324 include image facies (or electrofacies) 332. Additionally, core description data 323 include grain-size measurements 398.

Figure 1A:
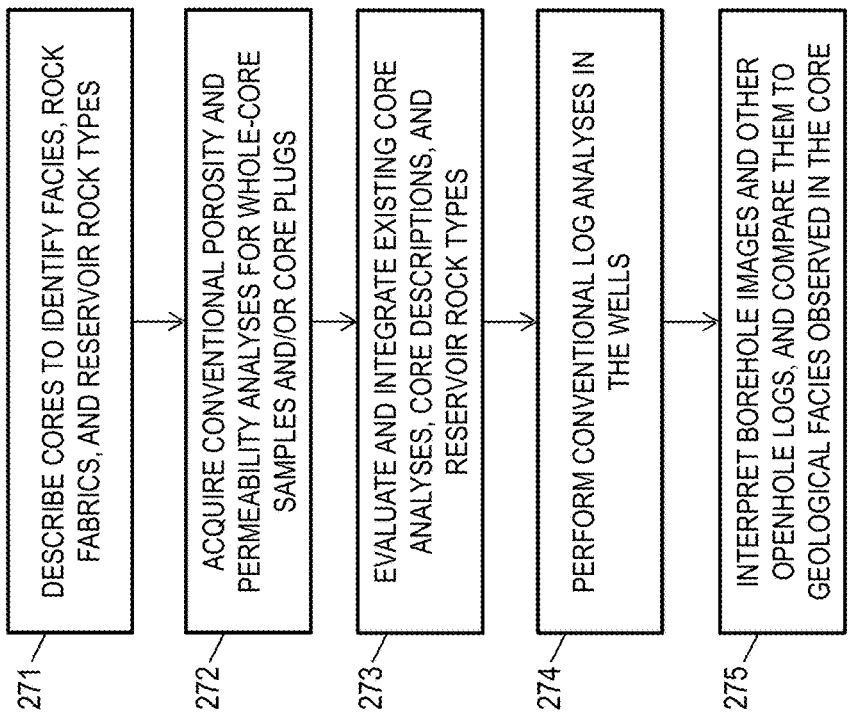
FIG. 1a is a schematic method flow diagram according to the prior art, as described in U.S. Patent Application Publication No. 2012/0221306 (Hurley et al.).
Figure 1B:
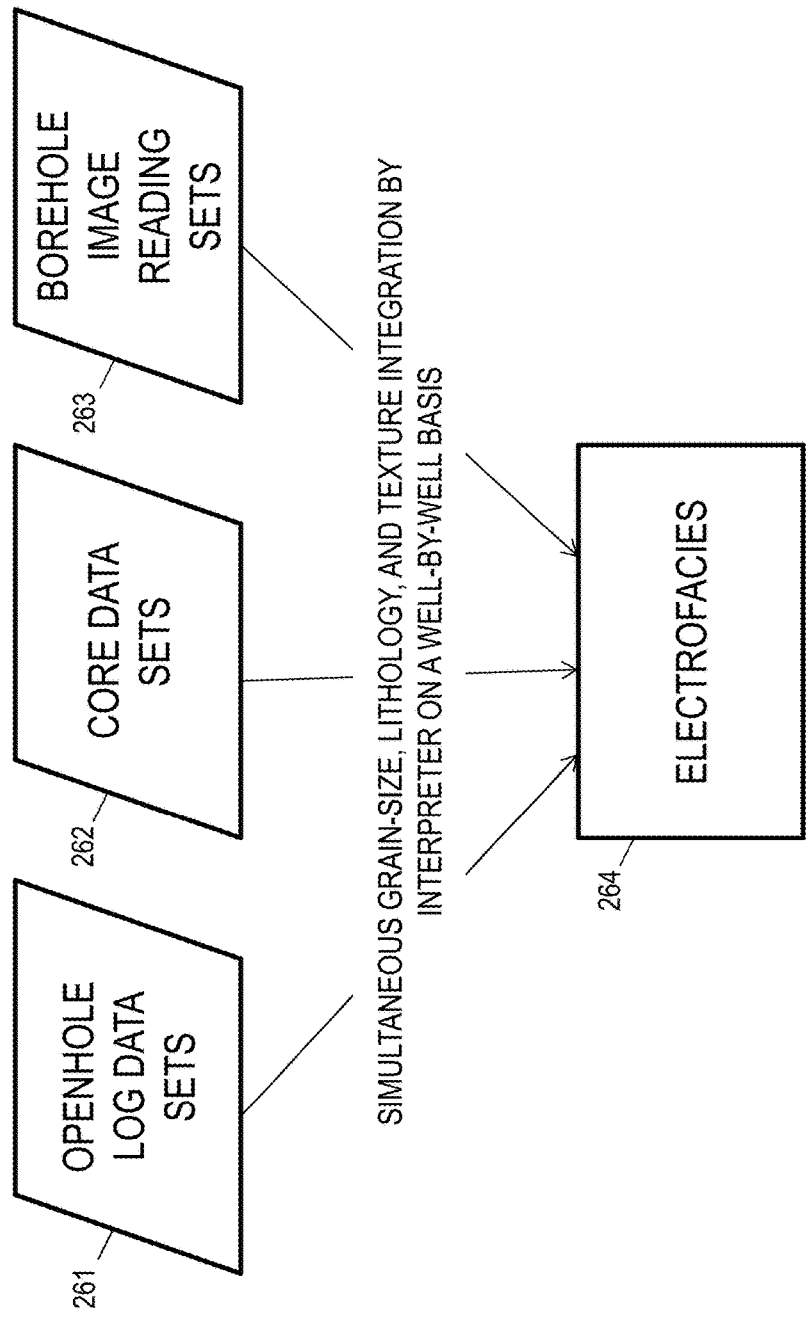
FIG. 1b is a schematic method flow diagram according to the prior art.
Figure 1C:
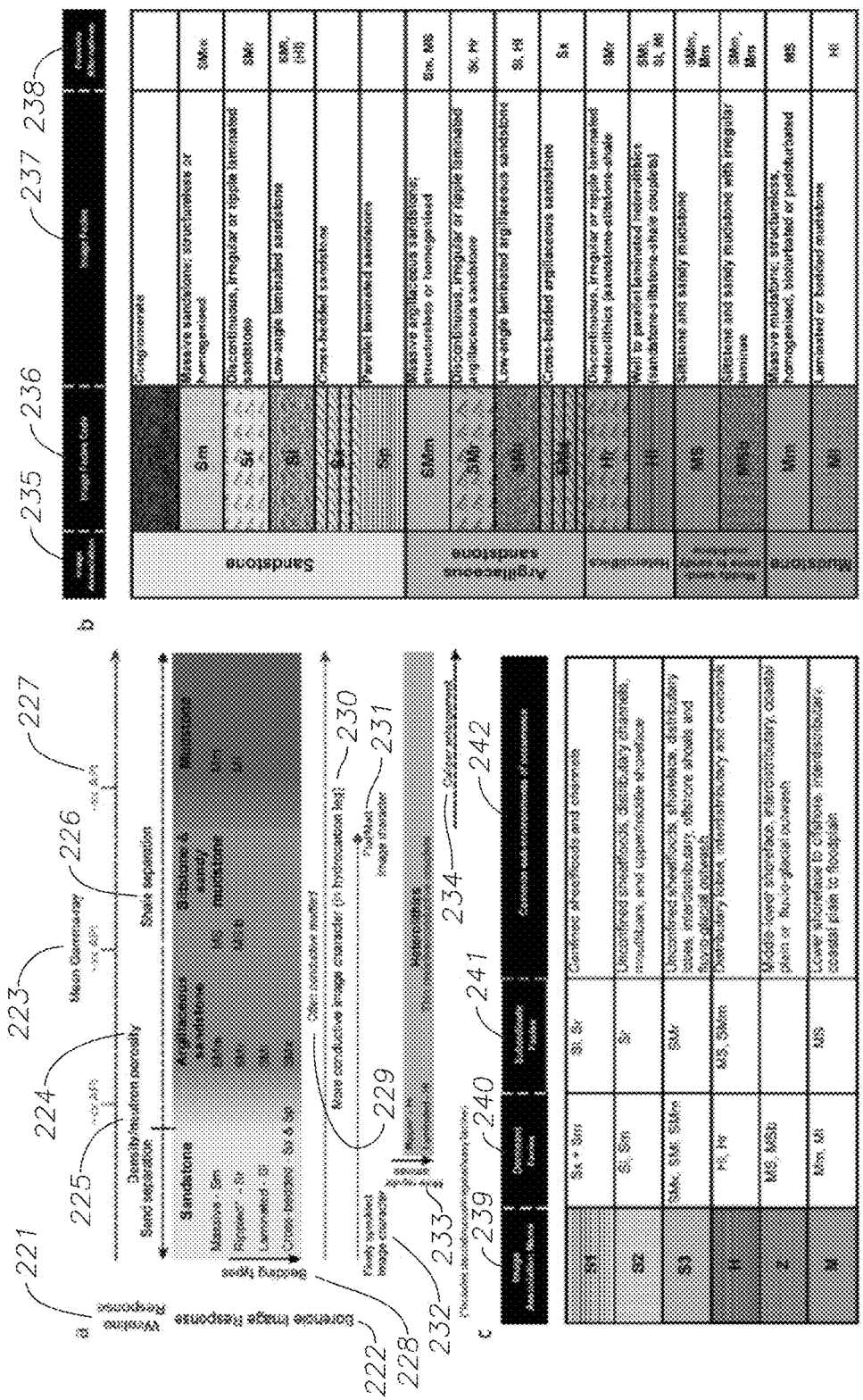
FIG. 1c(i) is a schematic diagram of an electrofacies scheme according to the prior art.
Figure 1D:
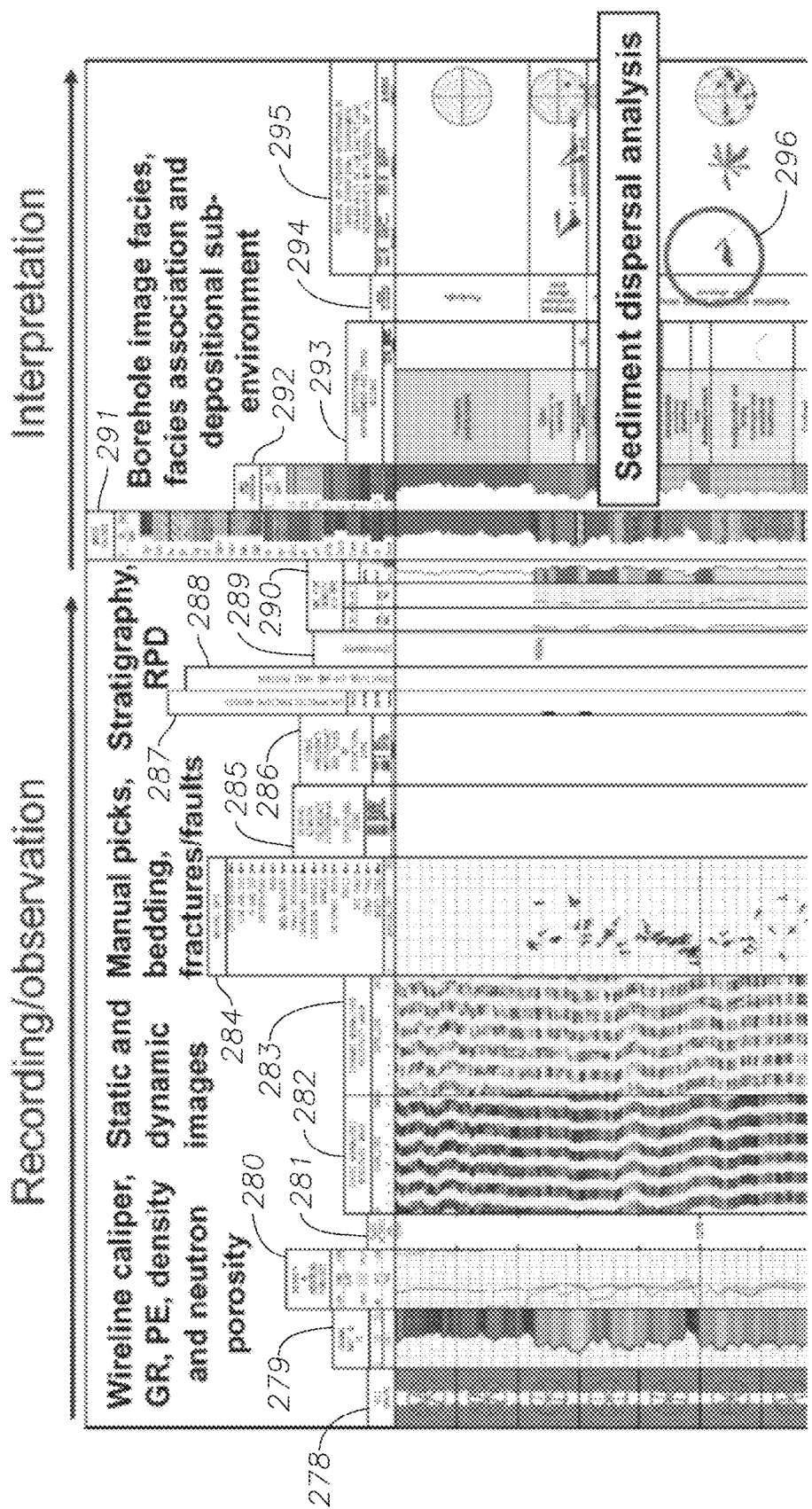
FIG. 1d is a schematic diagram of electrofacies according to the prior art.
Figure 1E:
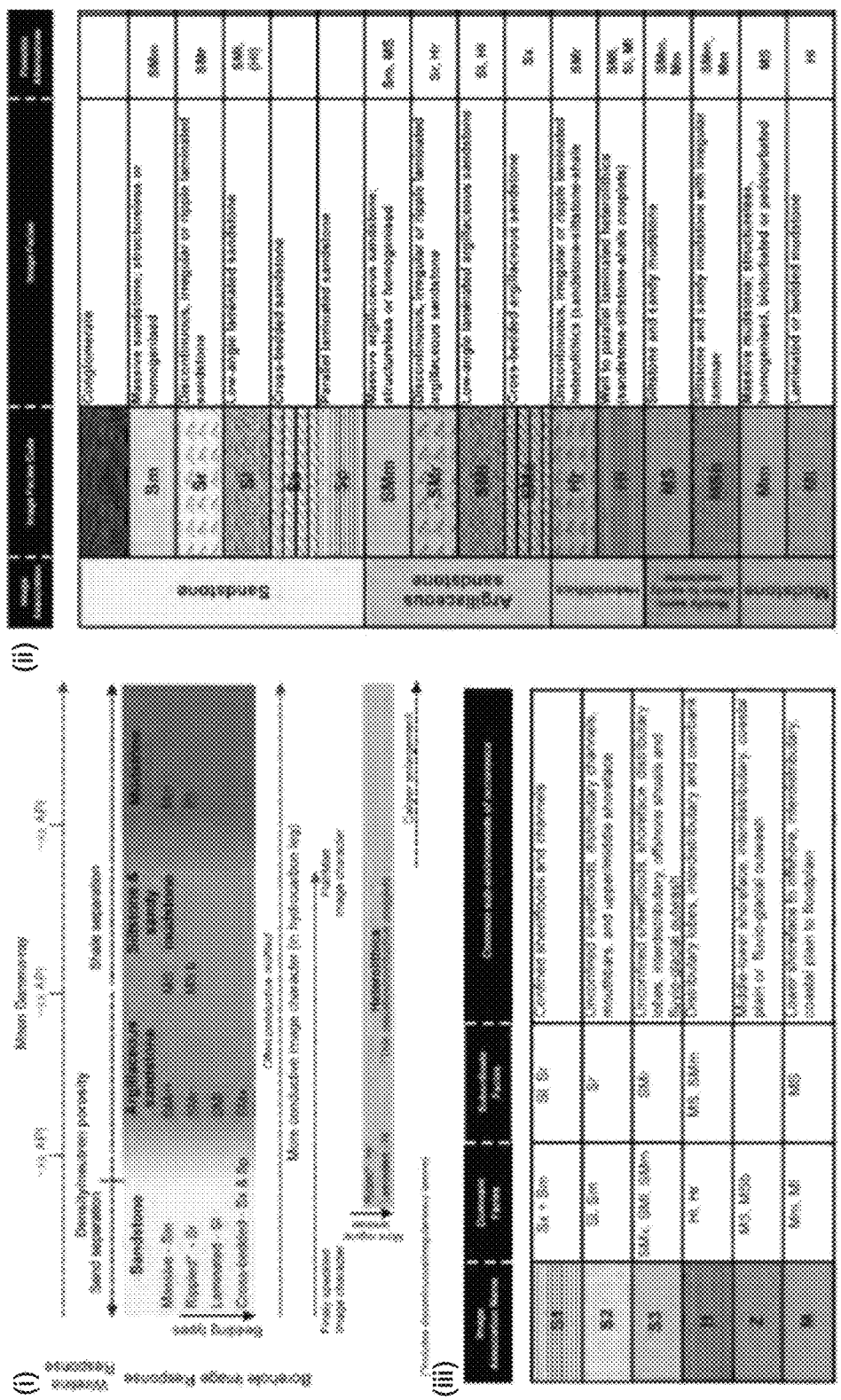
FIG. 1e(i) is a schematic diagram of an electrofacies scheme according to the prior art.

(11) Results from the image log analysis 143 and the "pseudo" grain-size can then be integrated with core and image textures following a scheme similar to the one shown in FIG. 1c(ii) or FIG. 18, for example.

Embodiments of Non-Transitory
Computer-Readable Medium Having One or More
Computer Programs Stored Therein An embodiment can also include non-transitory computer-readable medium having one or more computer programs stored therein operable by one or more processors to enhance borehole image analysis, for example. The one or more computer programs can include a set of instructions that, when executed by the one or more processors, cause the one or more processors to perform a series of operations. For example, the operations can include comparing a plurality of different openhole log data sets 111 to a plurality of different core data sets 112. Each of the plurality of different openhole log data sets 111 can be associated with one or more of a plurality of hydrocarbon wells. The plurality of hydrocarbon wells, in turn, can be associated with a hydrocarbon reservoir. In addition, each of the plurality of different core data sets 112 can be associated with one or more of the plurality of hydrocarbon wells, and core data can include core grain size, for example. The operations can further include performing iteratively an unsupervised neural network map, responsive to the plurality of different openhole log data sets 111 and the plurality of different core data sets 112. Performing iteratively an unsupervised neural network map can thereby identify one or more material types associated with the plurality of hydrocarbon wells, for example. The operations can also include generating a material-type scheme 120, responsive to the neural network map. The material-type scheme 120 can associate each of the identified one or more material types with a plurality of material characteristics, including, for example, one or more of the following: material resistivity value and material grain size.

The operations can further include, for example, distributing each of a plurality of borehole image readings of each of a plurality of different borehole image reading sets 113 into one of a plurality of resistivity classes, responsive to the material-type scheme 120. Each of the plurality of different borehole image reading sets 113 can include a plurality of borehole image readings and be associated with one or more of the plurality of hydrocarbon wells. Further, one or more of the plurality of different borehole image reading sets 113 can be associated with each of the plurality of hydrocarbon wells. In addition, each of the plurality of resistivity classes can have one or more predetermined associated material resistivity values. Consequently, distributing the borehole image readings can thereby associate each borehole image reading with an approximated material type 122. The operations can further include calibrating each borehole image reading, responsive to the plurality of different core data sets 112 and the material-type scheme 120. Calibrating each borehole image reading can consequently produce an approximated grain size 121 associated with each borehole image reading. The operations can also include depicting on one or more displays—for each hydrocarbon well—the associated one or more borehole image reading sets 213 of the plurality of different borehole image reading sets 113, the approximated material type 122 for each borehole image reading of the associated one or more borehole image reading sets 213 of the plurality of different borehole image reading sets 113, and the approximated grain size 121 for each borehole image reading of the associated one or more borehole image reading sets 213 of the plurality of different borehole image reading sets 113. Depicting this information can thereby increase consistency in categorizing subsurface material associated with the plurality of hydrocarbon wells by material type. Further, depicting the information can enhance interpretation of subsurface material texture, fabric, and features to predict subsurface material composition of the hydrocarbon reservoir.

In some circumstances, one or more approximated grain sizes 121 each associated with a borehole image reading can have a core-equivalent resolution. In some non-transitory computer-readable medium having one or more computer programs stored therein, according to an embodiment, the set of instructions, when executed by the one or more processors, can further cause the one or more processors to perform additional operations. The operations can include, for example, generating a high resolution electrofacies, responsive to the approximated material types 122, the approximated grain sizes 121, and user identification of one or more of the following: image texture data, image feature data, image fabric data, and image orientation data. Generating a high resolution electrofacies can thereby enhance characterization of subsurface material composition of the hydrocarbon reservoir. Further, borehole image readings can include, for example, high resolution micro-resistivity image log data, according to some embodiments, as will be understood by those skilled in the art. The operations can also include, for example, performing data quality control on the plurality of different openhole log data sets 111, the plurality of different core data sets 112, and the plurality of different borehole image reading sets 113. The operations can further include reprocessing the plurality of different openhole log data sets 111, the plurality of different core data sets 112, and the plurality of different borehole image reading sets 113. The operations can still further include depth matching the plurality of different openhole log data sets 111, the plurality of different core data sets 112, and the plurality of different borehole image reading sets 113. The performing data quality control, reprocessing, and depth matching operations can thereby enhance input data. In some circumstances, the plurality of borehole image readings of each of the plurality of different borehole image reading sets can be non-normalized. The operations can further include, for example—before distributing each borehole image reading into one of a plurality of resistivity classes—flattening each borehole image reading.

The operations can also include, for example, modifying one or more neural network nodes of the neural network map, responsive to variably-weighted input curves and user action. Modifying the one or more neural network nodes can thereby enhance identification of the one or more material types associated with the plurality of hydrocarbon wells. In some circumstances, one or more trained and core-calibrated neural network curves can be associated with the material-type scheme 120, and the neural network curves can thereby define a constrained gross facies scheme. In addition, the plurality of hydrocarbon wells can be associated with a clastic environment, for example, and the one or more identified material types associated with the plurality of hydrocarbon wells can include one or more of the following: mudstone, siltstone, argillaceous sandstone, sandstone, and heterolithics. The operations can also include identifying, responsive to the plurality of different openhole log data sets 111 and the plurality of different borehole image reading sets 113, one or more zones of fluid phase change. The operations can then include modifying the plurality of resistivity classes responsive to the identified one or more zones of fluid phase change, a plurality of measurements of water saturation associated with one or more of the plurality of hydrocarbon wells, the material-type scheme 120, the approximated material types 122, and the approximated grain sizes 121. Modifying the plurality of resistivity classes can thereby compensate for fluid phase changes associated with the identified one or more zones of fluid phase change. The operations can also include matching the number of the plurality of resistivity classes with the number of the one or more identified material types associated with the plurality of hydrocarbon wells. Further, the operations can include determining one or more projected material types associated with each of one or more uncored intervals of one or more of the plurality of hydrocarbon wells, responsive to the approximated material type 122 associated with each of one or more of the plurality of borehole image readings. The operations can also include determining one or more projected grain sizes associated with each of the one or more uncored intervals of the hydrocarbon reservoir associated with the plurality of hydrocarbon wells, responsive to the approximated grain size 121 associated with each of one or more of the plurality of borehole image readings. Determining one or more projected material types and one or more projected grain sizes can thereby produce a high-resolution characterization of the hydrocarbon reservoir.

Further Description Related to Embodiments:
Example Study

An example study related to accelerated borehole image log facies interpretation has been conducted, for example. During this study, a goal was to assess whether the manual methodology could be replaced by an automatic or semi-automatic workflow. Six clastic reference wells with core, open hole, and high quality image log data were selected and manually interpreted. The same data was independently used for image-based rock typing (facies) using software-driven image-based petrophysics applications: the image data was calibrated, zoned, and compensated for fluid phase changes prior to binning into image-based petrophysics facies using various thresholding techniques. Comparison of the results showed that the semi-automatic processes could not reliably match either the manual image or core-based interpretations without considerable manipulation. Fluid (oil and water) contact zones were particularly difficult to resolve, requiring many reiterations, whereas an experienced interpreter could compensate for the ambiguity faster and more reliably. Analysis of geological fabrics and textures, especially nonplanar image fabrics like cross-bedding, bio- or pedo-turbation, could not be reliably reproduced using automated processes. Tests with neural network applications suggest, however, that pre-binning of the facies, rock types and units, based upon the open hole log's response and image resistivity, can effectively provide a faster and more repeatable standard gross lithological unit. It is therefore suggested that, at present, an effective methodology for rapid reservoir characterization can be an image-based petrophysical interpretation followed by facies interpretation of the image texture/fabric by an experienced BHI interpreter.

This study assessed whether the manual borehole image facies interpretation can be replaced by an automatic or semi-automatic borehole image facies interpretation to reduce the time required for image log facies interpretations in multi-well studies. Six reference wells with core, open hole, and high quality image log data were selected and manually interpreted. The same data were then used for image-based rock typing in specialized image-based petrophysics software. Several calibration steps were required (e.g., SW compensation) to convert the data into a format that was suitable to apply image resistivity thresholding and data binning techniques. The binning process was a reiterative process until a compatible scheme to the manual image facies scheme was developed, as illustrated, for example, in FIG. 9. That is, semi-automatic image facies association generation is illustrated in FIG. 9, for example. The results of this semi-automatic image-based petropyhsics facies scheme were then compared with the manual facies interpretation.

Although the data was calibrated and fluid saturation compensated for, it was not possible to match the manual interpretation. Fluid (oil and water) contact zones were especially difficult to correct for in the image-based petrophysical analysis, as illustrated in FIG. 10, for example. That is, a comparison of semi-automatic and manual image facies interpretation is illustrated, for example, in FIG. 10. These are areas where an experienced interpreter can compensate the image and open hole log readings and can create a more reliable, manual image facies interpretation.

The study indicated that it was not possible to reduce the time spent for the analysis of geological fabrics and textures. Nonplanar image fabrics like cross-bedded sandstones or dispersed patchy conductive (porous) carbonate intervals can be especially difficult to consistently identify. Well stratified intervals of sand/silt or sand/shale with good image contrasts (light and dark image coloring) can be suitable for automatic dip analysis.

The manual image facies interpretation using open hole log, image log, and core can be a method that works in clastic environments. Its advantages can include allowing the interpreter to correct image irregularities, such as breakouts and fluid influence on the borehole image, and incorporating field knowledge. It can be a slow process that heavily relies on the interpreters' experience. Recent tests with neural network applications suggest, however, that pre-binning of facies, rock types, and units, based upon the open hole log's response and image resistivity, can effectively provide a faster and more repeatable standard gross lithological unit, as illustrated in FIG. 11, for example. That is, open hole neural network based rock typing combined with image-based threshold rock typing for image facies interpretations is illustrated, for example, in FIG. 11. It is therefore suggested that, at present, an effective methodology for rapid reservoir characterization can be an image-based petrophysical interpretation followed by facies interpretation of the image texture/fabric by an experienced BHI interpreter.

Additional Description Related to Embodiments: Another Example Study

Another example study was conducted that related to combining image-based petrophysics and neural network analysis to build electrofacies. Core-calibrated borehole image log facies interpretations can be time intensive and rely heavily on the experience of the image interpreter to provide consistent results for extrapolation into uncored intervals. A goal of this study was to increase both the efficiency and consistency of the interpretation results through combining image-based petrophysics, neural network mapping, and manual feature identification. The unified workflow can include: (i) core-calibrated open hole log neural network mapping; (ii) zonation, fluid phase compensation, and core calibration of the image prior to the image-based petrophysics facies analysis; and (iii) manual image textural interpretation. The study, which included a total of 3750 ft of image data and 1105 ft of core from six wells, showed that the use of neural network mapping can significantly improve the consistency of the "gross facies scheme" through the simultaneous calibration of the open hole logs with core interactively across all wells. Subsequent use of image-based petrophysical analysis techniques within this "constrained gross scheme" can provide robust high resolution electrofacies at each well. This approach of combining the best of the image-based petrophysics with the manual image textural analysis in a unified workflow can provide an efficient, consistent, and high confidence advanced image-based facies analysis for sequence stratigraphic interpretations across multiple wells.

In the first example study described above, the inventors have suggested a more effective methodology for rapid reservoir characterizations: utilizing an image-based petrophysical analysis followed by a manual facies interpretation of the image texture/fabric by an experienced BHI interpreter. This second study applied this methodology in six wells with a total of 3750 ft of image data and 1105 ft of core. Both the efficiency and consistency of BHI-based facies interpretations through the combination of manual image fabric and texture identification with an image-based petrophysical log analysis and neural network map can be desired, for example. For such instances, initially, only four wells, for example, were selected for a study. Core, open hole, and image log data were loaded and passed through a comprehensive data quality control, reprocessing and depth-matching procedure to assure high data quality for the following manual dip analysis coupled with neural network mapping and image-based petrophysics.

The study first included a manual dip interpretation process. The BHI features were identified and manually classified (e.g., bedding or fractures) based on dip magnitudes, orientation trends, and BHI character by an experienced image interpreter. The mean structural dip was determined from stratified units that were assumed to be deposited palaeo-horizontally, i.e., mudstone, heterolithic, and/or siltstone bedding surfaces. The original sedimentary dips were restored where a significant structural dip (>3°) was determined.

The study then utilized neural network and image-based petrophysics. An unsupervised (fuzzy) neural network mapping procedure was used to calibrate open hole log-based rock classes with core grain-size data. Through reiterative learning processes, it was established that five rock classes could be consistently identified using three variably weighted input curves, as illustrated, for example, in FIG. 6(*c*). That is, neural network input curves are illustrated in FIG. 6(*c*), for example. A self-organizing map, as illustrated in FIG. 6(*a*), for example, and which visualizes the clustering of the open hole log curves in a down-sampled but representative set of nodes, was used to further enhance the log-to-core correlation, as illustrated by red circled portions of FIG. 6(*a*)-(*b*). That is, a self-organizing neural network map is illustrated in FIG. 6(*a*), for example, and an interactive edit on a well correlation panel is illustrated in FIG. 6(*b*), for example. This "trained," core-calibrated neural network was subsequently successfully applied to two additional wells, which were added after the interpretation of the four initial wells.

The neural network mapping of the core and open hole relationship was followed by the zonation, fluid phase compensation, and core calibration of the image data. Open hole logs, i.e., induction or lateral logs, porosity logs, and petrophysical calculations (e.g., Sxo and Sw), were used to identify zones of fluid phase changes that affected the BHI resistivity, as illustrated, for example in FIG. 7(a). That is, an image-based petrophysics analysis plot to determine fluid phase changes is illustrated, for example, in FIG. 7(a). The BHI data were then zoned, and the resistivity spectrum was compensated for the fluid phase changes. The effect of this compensation is best illustrated by considering an interval where sandstone classes were identified by the neural network mapping. In these intervals, if for reference the sandstones are assumed to be "water-wet," then the fluid compensation transforms all sandstones classes to appear more conductive than mudstone classes. Assuming no significant variations in density (i.e., "cementation"), increases in BHI resistivity in these fluid-compensated sandstone classes could be inferred to correlate with an increase in clay content. The fluid-compensated BHI histogram can then be divided into "pseudo"-grain size classes, as illustrated, for example, in FIG. 7(b)-(d), and correlated with core grain-size classes in an interactive thresholding process, simultaneously across all BHI zones. That is, binned BHI resistivity histograms are illustrated in FIG. 7(b)-(d), for example. Intervals with core data were used to set histogram class cut-offs and the neural network results guided the overall sandstone mapping.

Once the match between core, neural network map and image-based petrophysics was established, the obtained rock classes were modified in terms of their geological significance through integrating the manual dip interpretation results. The integration of geological textures identified from the BHI and core with the "constrained gross facies scheme" created a high resolution electrofacies (e.g., cross-bedded argillaceous sandstone). The methodology can still rely heavily on the experience of the BHI interpreter to correctly identify image textures and orientation trends, but it removes the need to simultaneously determine the "lithotype" from open hole logs. Removing this element can accelerate the manual interpretation process, allow the interpreter to focus on the interpreter's key objective, feature and fabric identification, and increase the overall "lithotype" consistency.

The neural network and image-based petrophysics BHI analysis separated five facies associations ("classes")—mudstone [M], siltstone [MS], argillaceous ("muddy") sandstone [SM], sandstone ("clean") [S], and heterolithics [H]—and produced a total of 24 individual image facies (e.g., cross-bedded, pebbly sandstone [Sxp]) types. The application of this high resolution, image-texture based facies scheme also helped clarify some previously poorly understood log responses through identifying and separating a pebbly sandstone facies from "other" sandstone facies in density-neutron cross-plots and box-plots, as illustrated in FIG. 8, for example. That is, a multi-well density-neutron cross-plot by electrofacies, with and without pebbly facies, is illustrated, for example, in FIG. 8(a). Further, typical image texture and open hole log responses of pebbly facies are illustrated, for example, in FIG. 8(b). In addition, a multi-well bulk density box-plot for lower Unayzah sandstone facies is illustrated in FIG. 8(c), for example. The resulting electrofacies were further used to identify depositional environments and sediment dispersal directions within the sequence stratigraphic reservoir model of the Unayzah in Saudi Arabia. Future studies in the Unayzah that are only based on open hole logs can use these image texture-based electrofacies log cut-offs to correlate from "imaged" to "un-imaged" wells and to constrain palaeotransport trends.

This study showed that the use of neural network mapping can significantly improve the consistency of the "gross facies scheme" through the simultaneous calibration of the open hole with core data interactively across all wells. Subsequent use of image-based petrophysical analysis techniques within this "constrained gross scheme" can provide robust high resolution electrofacies at each well. Utilization of these steps prior to interpreting the images can thus allow the interpreter to concentrate more effectively on the identification of image fabrics and texture rather than fabric plus "lithotype." This approach of combining the best of the image-based petrophysics with the manual image texture interpretation in a unified workflow can provide an efficient, consistent, and high confidence advanced image-based facies analysis for sequence stratigraphic interpretations across multiple wells.

In the various embodiments of the invention described herein, a person having ordinary skill in the art will recognize that various types of memory are readable by a computer, such as the memory described herein in reference to the various computers and servers, e.g., computer, computer server, web server, or other computers with embodiments of the present invention. Examples of computer readable media include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, memory sticks, and other newer types of memories, and transmission type media such as digital and analog communication links. For example, such media can include operating instructions, as well as instructions related to the system and the method steps described above and can operate on a computer. It will be understood by those skilled in the art that such media can be at other locations instead of, or in addition to, the locations described to store computer program products, e.g., including software thereon. It will be understood by those skilled in the art that the variously the software modules or electronic components described above can be implemented and maintained by electronic hardware, software, or a combination of the two, and that such embodiments are contemplated by embodiments of the present invention.

This application is related and claims priority to U.S. Provisional Patent Application No. 61/943,867, filed Feb. 24, 2014, titled "Systems, Methods, and Computer Medium to Produce Efficient, Consistent, and High-Confidence Image-Based Electrofacies Analysis in Stratigraphic Interpretations Across Multiple Wells," and U.S. Provisional Patent Application No. 61/949,558, filed Mar. 7, 2014, titled "Systems, Methods, and Computer Medium to Produce Efficient, Consistent, and High-Confidence Image-Based Electrofacies Analysis in Stratigraphic Interpretations Across Multiple Wells," the contents both of which are hereby incorporated herein by reference in their entireties.

In the drawings and specification, there have been disclosed embodiments of methods, systems, and non-transitory computer-readable medium having computer program stored therein of the present invention, and although specific terms are employed, the terms are used in a descriptive sense only and not for purposes of limitation. The embodiments of methods, systems, and non-transitory computer-readable medium having computer program stored therein of the present invention have been described in considerable detail with specific reference to these illustrated embodiments. It will be apparent, however, that various modifications and That claimed is:

1. A system to enhance borehole image analysis, the system comprising:
one or more processors;
one or more input and output units in communication with the one or more processors and positioned to receive as input a plurality of different openhole log data sets, a plurality of different core data sets, and a plurality of different borehole image reading sets, and to output an approximated grain size and an approximated material type for each of a plurality of borehole image readings,
each of the plurality of different openhole log data sets associated with one or more of a plurality of hydrocarbon wells, each of the plurality of different core data sets associated with one or more of the plurality of hydrocarbon wells, each of the plurality of different borehole image reading sets including the plurality of borehole image readings and associated with one or more of the plurality of hydrocarbon wells, each of the plurality of different core data sets associated with one or more of the plurality of hydrocarbon wells, the core data of each of the different core data sets including core grain size, the plurality of hydrocarbon wells associated with a hydrocarbon reservoir;
one or more displays in communication with the one or more processors; and
non-transitory memory medium in communication with the one or more processors, the memory medium including:
a neural network mapping module including computer-readable instructions stored therein that when executed cause the system to perform the steps of:
comparing the plurality of different openhole log data sets to the plurality of different core data sets,
performing iteratively an unsupervised neural network map, responsive to the plurality of different openhole log data sets and the plurality of different core data sets, to identify one or more material types associated with the plurality of hydrocarbon wells, and
generating, responsive to the neural network map, a material-type scheme, the material-type scheme associating each of the identified one or more material types with a plurality of material characteristics, the material characteristics including one or more of the following: material resistivity value and material grain size, and
an image-based petrophysical analysis module including computer-readable instructions stored therein that when executed cause the system to perform the steps of:
distributing each of the plurality of borehole image readings of each of the plurality of different borehole image reading sets into one of a plurality of resistivity classes responsive to the material-type scheme to associate each borehole image reading with an approximated material type, each of the plurality of resistivity classes having one or more predetermined associated material resistivity values,
calibrating each borehole image reading responsive to the plurality of different core data sets and the material-type scheme to produce an approximated grain size associated with each borehole image reading, and
depicting on the one or more displays, for each hydrocarbon well, the associated one or more of the plurality of different borehole image reading sets, the approximated material type for each borehole image reading of the associated one or more of the plurality of different borehole image reading sets, and the approximated grain size for each borehole image reading of the associated one or more of the plurality of different borehole image reading sets to increase consistency in categorizing subsurface material associated with the plurality of hydrocarbon wells by material type and enhance interpretation of subsurface material texture, fabric, and features to predict subsurface material composition of the hydrocarbon reservoir.

2. A system as defined in claim 1, wherein one or more approximated grain sizes each associated with a borehole image reading have a core-equivalent resolution.

3. A system as defined in claim 1, wherein the memory medium further includes computer-readable instructions stored therein that when executed cause the system to perform the step of:
generating a high resolution electrofacies to enhance characterization of subsurface material composition of the hydrocarbon reservoir, responsive to the approximated material types, the approximated grain sizes, and user identification of one or more of the following: image texture data, image feature data, image fabric data, and image orientation data.

4. A system as defined in claim 1, wherein borehole image readings include high resolution micro-resistivity image log data, and wherein the memory medium further includes computer-readable instructions stored therein that when executed cause the system to perform the steps of:
performing data quality control on the plurality of different openhole log data sets, the plurality of different core data sets, and the plurality of different borehole image reading sets;
reprocessing the plurality of different openhole log data sets, the plurality of different core data sets, and the plurality of different borehole image reading sets; and
depth matching the plurality of different openhole log data sets, the plurality of different core data sets, and the plurality of different borehole image reading sets to enhance input to the system.

5. A system as defined in claim 4, wherein the plurality of borehole image readings of each of the plurality of different borehole image reading sets are non-normalized, and wherein the petrophysical analysis module further includes computer-readable instructions stored therein that when executed cause the system to perform the step of, before distributing each borehole image reading into one of a plurality of resistivity classes, flattening each borehole image reading.

6. A system as defined in claim 1, wherein the neural network mapping module further includes computer-readable instructions stored therein that when executed cause the system to perform the step of:
modifying one or more neural network nodes of the neural network map responsive to variably-weighted input curves and user action to enhance identification of the one or more material types associated with the plurality of hydrocarbon wells.

7. A system as defined in claim 6, wherein one or more trained and core-calibrated neural network curves are associated with the material-type scheme, the neural network curves defining a constrained gross facies scheme.

8. A system as defined in claim 1, wherein the plurality of hydrocarbon wells are associated with a clastic environment, and wherein the one or more material types associated with the plurality of hydrocarbon wells identified in the neural network mapping module include one or more of the following: mudstone, siltstone, argillaceous sandstone, sandstone, and heterolithics.

9. A system as defined in claim 1, wherein the petrophysical analysis module further includes computer-readable instructions stored therein that when executed cause the system to perform the steps of:
identifying, responsive to the plurality of different openhole log data sets and the plurality of different borehole image reading sets, one or more zones of fluid phase change; and
modifying the plurality of resistivity classes responsive to the identified one or more zones of fluid phase change, a plurality of measurements of water saturation associated with one or more of the plurality of hydrocarbon wells, the material-type scheme, the approximated material types, and the approximated grain sizes, to compensate for fluid phase changes associated with the identified one or more zones of fluid phase change.

10. A system as defined in claim 1, wherein the petrophysical analysis module further includes computer-readable instructions stored therein that when executed cause the system to perform the step of matching the number of the plurality of resistivity classes with the number of the one or more material types associated with the plurality of hydrocarbon wells identified in the neural network mapping module.

11. A system as defined in claim 1, wherein the memory medium further includes computer-readable instructions stored therein that when executed cause the system to perform the steps of:
determining one or more projected material types associated with each of one or more uncored intervals of one or more of the plurality of hydrocarbon wells responsive to the approximated material type associated with each of one or more of the plurality of borehole image readings; and
determining one or more projected grain sizes associated with each of the one or more uncored intervals of the hydrocarbon reservoir associated with the plurality of hydrocarbon wells responsive to the approximated grain size associated with each of one or more of the plurality of borehole image readings to produce a high-resolution characterization of the hydrocarbon reservoir.

12. A computer-implemented method to enhance borehole image analysis, the method comprising:
comparing a plurality of different openhole log data sets to a plurality of different core data sets, each of the plurality of different openhole log data sets associated with one or more of a plurality of hydrocarbon wells, each of the plurality of different core data sets associated with one or more of the plurality of hydrocarbon wells, the core data of each of the different core data sets including core grain size, the plurality of hydrocarbon wells associated with a hydrocarbon reservoir;
performing iteratively an unsupervised neural network map, responsive to the plurality of different openhole log data sets and the plurality of different core data sets, to identify one or more material types associated with the plurality of hydrocarbon wells;
generating, responsive to the neural network map, a material-type scheme, the material-type scheme associating each of the identified one or more material types with a plurality of material characteristics, the material characteristics including one or more of the following: material resistivity value and material grain size;
distributing each of a plurality of borehole image readings of each of a plurality of different borehole image reading sets into one of a plurality of resistivity classes responsive to the material-type scheme to associate each borehole image reading with an approximated material type, each of the plurality of resistivity classes having one or more predetermined associated material resistivity values, each of the plurality of different borehole image reading sets including a plurality of borehole image readings and associated with one or more of the plurality of hydrocarbon wells, one or more of the plurality of different borehole image reading sets associated with each of the plurality of hydrocarbon wells;
calibrating each borehole image reading responsive to the plurality of different core data sets and the material-type scheme to produce an approximated grain size associated with each borehole image reading; and
depicting, for each hydrocarbon well, the associated one or more of the plurality of different borehole image reading sets, the approximated material type for each borehole image reading of the associated one or more of the plurality of different borehole image reading sets, and the approximated grain size for each borehole image reading of the associated one or more of the plurality of different borehole image reading sets to increase consistency in categorizing subsurface material associated with the plurality of hydrocarbon wells by material type and enhance interpretation of subsurface material texture, fabric, and features to predict subsurface material composition of the hydrocarbon reservoir.

13. A computer-implemented method of claim 12, wherein one or more approximated grain sizes each associated with a borehole image reading have a core-equivalent resolution.

14. A computer-implemented method of claim 12, wherein the method further comprises:
generating a high resolution electrofacies to enhance characterization of subsurface material composition of the hydrocarbon reservoir, responsive to the approximated material types, the approximated grain sizes, and user identification of one or more of the following: image texture data, image feature data, image fabric data, and image orientation data.

15. A computer-implemented method of claim 12, wherein borehole image readings include high resolution micro-resistivity image log data, and wherein the method further comprises:
performing data quality control on the plurality of different openhole log data sets, the plurality of different core data sets, and the plurality of different borehole image reading sets;
reprocessing the plurality of different openhole log data sets, the plurality of different core data sets, and the plurality of different borehole image reading sets; and depth matching the plurality of different openhole log data sets, the plurality of different core data sets, and the plurality of different borehole image reading sets to enhance input data.

16. A computer-implemented method of claim 15, wherein the plurality of borehole image readings of each of the plurality of different borehole image reading sets are non-normalized, and wherein the method further comprises, before distributing each borehole image reading into one of a plurality of resistivity classes, flattening each borehole image reading.

17. A computer-implemented method of claim 12, wherein the method further comprises:
    modifying one or more neural network nodes of the neural network map responsive to variably-weighted input curves and user action to enhance identification of the one or more material types associated with the plurality of hydrocarbon wells.

18. A computer-implemented method of claim 17, wherein one or more trained and core-calibrated neural network curves are associated with the material-type scheme, the neural network curves defining a constrained gross facies scheme.

19. A computer-implemented method of claim 12, wherein the plurality of hydrocarbon wells are associated with a clastic environment, and wherein the one or more material types associated with the plurality of hydrocarbon wells identified in the neural network mapping module include one or more of the following: mudstone, siltstone, argillaceous sandstone, sandstone, and heterolithics.

20. A computer-implemented method of claim 12, wherein the method further comprises:
    identifying, responsive to the plurality of different openhole log data sets and the plurality of different borehole image reading sets, one or more zones of fluid phase change; and
    modifying the plurality of resistivity classes responsive to the identified one or more zones of fluid phase change, a plurality of measurements of water saturation associated with one or more of the plurality of hydrocarbon wells, the material-type scheme, the approximated material types, and the approximated grain sizes, to compensate for fluid phase changes associated with the identified one or more zones of fluid phase change.

21. A computer-implemented method of claim 12, wherein the method further comprises matching the number of the plurality of resistivity classes with the number of the one or more material types associated with the plurality of hydrocarbon wells identified in the neural network mapping module.

22. A computer-implemented method of claim 12, wherein the method further comprises:
    determining one or more projected material types associated with each of one or more uncored intervals of one or more of the plurality of hydrocarbon wells responsive to the approximated material type associated with each of one or more of the plurality of borehole image readings; and
    determining one or more projected grain sizes associated with each of the one or more uncored intervals of the hydrocarbon reservoir associated with the plurality of hydrocarbon wells responsive to the approximated grain size associated with each of one or more of the plurality of borehole image readings to produce a high-resolution characterization of the hydrocarbon reservoir.

23. Non-transitory computer-readable medium having one or more computer programs stored therein operable by one or more processors to enhance borehole image analysis, the one or more computer programs comprising a set of instructions that, when executed by the one or more processors, cause the one or more processors to perform the operations of:
    comparing a plurality of different openhole log data sets to a plurality of different core data sets, each of the plurality of different openhole log data sets associated with one or more of a plurality of hydrocarbon wells, each of the plurality of different core data sets associated with one or more of the plurality of hydrocarbon wells, the core data of each of the different core data sets including core grain size, the plurality of hydrocarbon wells associated with a hydrocarbon reservoir;
    performing iteratively an unsupervised neural network map, responsive to the plurality of different openhole log data sets and the plurality of different core data sets, to identify one or more material types associated with the plurality of hydrocarbon wells;
    generating, responsive to the neural network map, a material-type scheme, the material-type scheme associating each of the identified one or more material types with a plurality of material characteristics, the material characteristics including one or more of the following: material resistivity value and material grain size;
    distributing each of a plurality of borehole image readings of each of a plurality of different borehole image reading sets into one of a plurality of resistivity classes responsive to the material-type scheme to associate each borehole image reading with an approximated material type, each of the plurality of resistivity classes having one or more predetermined associated material resistivity values, each of the plurality of different borehole image reading sets including a plurality of borehole image readings and associated with one or more of the plurality of hydrocarbon wells, one or more of the plurality of different borehole image reading sets associated with each of the plurality of hydrocarbon wells;
    calibrating each borehole image reading responsive to the plurality of different core data sets and the material-type scheme to produce an approximated grain size associated with each borehole image reading; and
    depicting on one or more displays, for each hydrocarbon well, the associated one or more of the plurality of different borehole image reading sets, the approximated material type for each borehole image reading of the associated one or more of the plurality of different borehole image reading sets, and the approximated grain size for each borehole image reading of the associated one or more of the plurality of different borehole image reading sets to increase consistency in categorizing subsurface material associated with the plurality of hydrocarbon wells by material type and enhance interpretation of subsurface material texture, fabric, and features to predict subsurface material composition of the hydrocarbon reservoir.

24. Non-transitory computer-readable medium having one or more computer programs stored therein of claim 23, wherein one or more approximated grain sizes each associated with a borehole image reading have a core-equivalent resolution.

25. Non-transitory computer-readable medium having one or more computer programs stored therein of claim 23, wherein the set of instructions, when executed by the one or more processors, further cause the one or more processors to perform the operation of:

generating a high resolution electrofacies to enhance characterization of subsurface material composition of the hydrocarbon reservoir, responsive to the approximated material types, the approximated grain sizes, and user identification of one or more of the following: image texture data, image feature data, image fabric data, and image orientation data.

26. Non-transitory computer-readable medium having one or more computer programs stored therein of claim 23, wherein borehole image readings include high resolution micro-resistivity image log data, and wherein the set of instructions, when executed by the one or more processors, further cause the one or more processors to perform the operations of:

performing data quality control on the plurality of different openhole log data sets, the plurality of different core data sets, and the plurality of different borehole image reading sets;

reprocessing the plurality of different openhole log data sets, the plurality of different core data sets, and the plurality of different borehole image reading sets; and depth matching the plurality of different openhole log data sets, the plurality of different core data sets, and the plurality of different borehole image reading sets to enhance input data.

27. Non-transitory computer-readable medium having one or more computer programs stored therein of claim 26, wherein the plurality of borehole image readings of each of the plurality of different borehole image reading sets are non-normalized, and wherein the set of instructions, when executed by the one or more processors, further cause the one or more processors to perform the operation of, before distributing each borehole image reading into one of a plurality of resistivity classes, flattening each borehole image reading.

28. Non-transitory computer-readable medium having one or more computer programs stored therein of claim 23, wherein the set of instructions, when executed by the one or more processors, further cause the one or more processors to perform the operation of:

modifying one or more neural network nodes of the neural network map responsive to variably-weighted input curves and user action to enhance identification of the one or more material types associated with the plurality of hydrocarbon wells.

29. Non-transitory computer-readable medium having one or more computer programs stored therein of claim 28, wherein one or more trained and core-calibrated neural network curves are associated with the material-type scheme, the neural network curves defining a constrained gross facies scheme.

30. Non-transitory computer-readable medium having one or more computer programs stored therein of claim 23, wherein the plurality of hydrocarbon wells are associated with a clastic environment, and wherein the one or more material types associated with the plurality of hydrocarbon wells identified in the neural network mapping module include one or more of the following: mudstone, siltstone, argillaceous sandstone, sandstone, and heterolithics.

31. Non-transitory computer-readable medium having one or more computer programs stored therein of claim 23, wherein the set of instructions, when executed by the one or more processors, further cause the one or more processors to perform the operations of:

identifying, responsive to the plurality of different openhole log data sets and the plurality of different borehole image reading sets, one or more zones of fluid phase change; and modifying the plurality of resistivity classes responsive to the identified one or more zones of fluid phase change, a plurality of measurements of water saturation associated with one or more of the plurality of hydrocarbon wells, the material-type scheme, the approximated material types, and the approximated grain sizes, to compensate for fluid phase changes associated with the identified one or more zones of fluid phase change.

32. Non-transitory computer-readable medium having one or more computer programs stored therein of claim 23, wherein the set of instructions, when executed by the one or more processors, further cause the one or more processors to perform the operation of matching the number of the plurality of resistivity classes with the number of the one or more material types associated with the plurality of hydrocarbon wells identified in the neural network mapping module.

33. Non-transitory computer-readable medium having one or more computer programs stored therein of claim 23, wherein the set of instructions, when executed by the one or more processors, further cause the one or more processors to perform the operations of:

determining one or more projected material types associated with each of one or more uncored intervals of one or more of the plurality of hydrocarbon wells responsive to the approximated material type associated with each of one or more of the plurality of borehole image readings; and determining one or more projected grain sizes associated with each of the one or more uncored intervals of the hydrocarbon reservoir associated with the plurality of hydrocarbon wells responsive to the approximated grain size associated with each of one or more of the plurality of borehole image readings to produce a high-resolution characterization of the hydrocarbon reservoir.

\* \* \* \* \*